US 6,336,131 B1

(12) United States Patent
Wolfe

(10) Patent No.: US 6,336,131 B1
(45) Date of Patent: *Jan. 1, 2002

(54) SYSTEM AND METHOD FOR COMMUNICATING INFORMATION RELATING TO A NETWORK RESOURCE

(76) Inventor: Mark A. Wolfe, 1076 Tamberwood Ct., Woodbury, MN (US) 55125

( * ) Notice: Subject to any disclaimer, the term of this patent is extended or adjusted under 35 U.S.C. 154(b) by 0 days.

This patent is subject to a terminal disclaimer.

(21) Appl. No.: 09/544,243

(22) Filed: Apr. 5, 2000

Related U.S. Application Data

(63) Continuation of application No. 09/442,193, filed on Nov. 16, 1999, which is a continuation of application No. 08/936,910, filed on Sep. 25, 1997, now Pat. No. 6,006,252
(60) Provisional application No. 60/052,830, filed on Jul. 17, 1997, and provisional application No. 60/028,251, filed on Oct. 8, 1996.

(51) Int. Cl.[7] ...................................................... G06F 15/16
(52) U.S. Cl. .......................................... 709/203; 707/501
(58) Field of Search ..................................... 709/203, 224; 345/115, 333, 760, 733, 738, 781; 707/9, 501, 513, 526, 517, 514

(56) References Cited

U.S. PATENT DOCUMENTS

| | | | |
|---|---|---|---|
| 4,586,035 A | 4/1986 | Baker | |
| 4,723,211 A | 2/1988 | Barker et al. | 364/300 |
| 4,730,252 A | 3/1988 | Bradshaw | 364/403 |
| 4,815,029 A | 3/1989 | Barker et al. | 364/900 |
| 4,850,007 A | 7/1989 | Marino | 379/67 |
| 4,855,725 A | 8/1989 | Fernandez | 345/173 |
| 4,899,292 A | 2/1990 | Montagna | 707/501 |
| 4,945,476 A | 7/1990 | Bodick et al. | 364/413.02 |
| 4,954,969 A | 9/1990 | Tsumura | 364/521 |
| 4,996,642 A | 2/1991 | Hey | 705/27 |
| 5,021,989 A | 6/1991 | Fujisawa et al. | 364/900 |

(List continued on next page.)

OTHER PUBLICATIONS

U.S. application No. 08/936,910, filed Sep. 25, 1997 (inventor: Mark Wolfe).

U.S. application No. 09/442,193, filed Nov. 16, 1999 (Inventor: Mark Wolfe).

Finnie, "The Browser Push Is On," PC Magazine, Sep. 9, 1997, pp. 123–128.

Dragan, "Advice From The Web," PC Magazine, Sep. 9, 1997, pp. 133–144.

Bremser, "HTML Workshop: Making Frames FIt, " Internet World, Sep. 1997, pp. 90–92.

Rapoza, "Alexa's Theory of Relativity," PC Week, Aug. 18, 1997, p. 42.

Finnie, "Not Just Browsing," PC Magazine, Aug. 1997, pp. 45–54.

Alexa Internet Press Release, 1997–1999 (from www.alexa.com).

"Internet 101: Web Rings,"CNET.COM, Jul. 17, 1996 (www.cnet.com).

Lash, "Alexa makes the Web history," NEWS.COM, Jul. 9, 1997 (www.news.com).

Bannan, "Navigating Made Easy," PC Magazine, Jul. 1997, p. 81.

(List continued on next page.)

Primary Examiner—Mehmet B. Geckil

(57) ABSTRACT

In an information retrieval system, a system and method for presentation of information and/or resources that are pertinent to an individual's interests or task. Guiding individuals to places of interest on a network where information is stored, and displaying or otherwise presenting useful information to the user.

8 Claims, 52 Drawing Sheets

U.S. PATENT DOCUMENTS

| | | | |
|---|---|---|---|
| 5,062,074 A | 10/1991 | Kleinberger | 364/900 |
| 5,105,148 A | 4/1992 | Pirani et al. | 340/721 |
| 5,123,088 A | 6/1992 | Kasahara et al. | 395/600 |
| 5,157,783 A | 10/1992 | Anderson et al. | 395/600 |
| 5,206,949 A | 4/1993 | Cochran et al. | 395/600 |
| 5,220,648 A | 6/1993 | Sato | 395/146 |
| 5,235,680 A | 8/1993 | Bijnagte | 395/161 |
| 5,241,671 A | 8/1993 | Reed et al. | 395/600 |
| 5,253,337 A | 10/1993 | Hirose | 395/161 |
| 5,255,386 A | 10/1993 | Prager | 395/600 |
| 5,265,065 A | 11/1993 | Turtle | 395/600 |
| 5,289,569 A | 2/1994 | Taniguchi | 395/145 |
| 5,321,740 A | 6/1994 | Gregorek | 379/67 |
| 5,325,298 A | 6/1994 | Gallant | 364/419.19 |
| 5,335,277 A | 8/1994 | Harvey | 380/20 |
| 5,341,293 A | 8/1994 | Vertelney | 395/600 |
| 5,347,632 A | 9/1994 | Filepp et al. | 395/200 |
| 5,390,281 A | 2/1995 | Luciw et al. | 395/12 |
| 5,392,387 A | 2/1995 | Fitzpatrick et al. | 395/156 |
| 5,404,442 A | 4/1995 | Foster | 395/159 |
| 5,408,655 A | 4/1995 | Oren et al. | 395/600 |
| 5,418,948 A | 5/1995 | Turtle | 395/600 |
| 5,421,008 A | 5/1995 | Banning et al. | 395/600 |
| 5,459,306 A | 10/1995 | Stein et al. | 235/383 |
| 5,471,575 A | 11/1995 | Giansante | 395/144 |
| 5,478,989 A | 12/1995 | Shepley | 235/375 |
| 5,495,581 A | 2/1996 | Tsai | 395/154 |
| 5,524,193 A | 6/1996 | Covington | 707/500 |
| 5,526,520 A | 6/1996 | Krause | 707/104 |
| 5,544,352 A | 8/1996 | Egger | 395/600 |
| 5,572,643 A | 11/1996 | Judson | 395/793 |
| 5,617,526 A | 4/1997 | Oran et al. | 395/326 |
| 5,623,679 A | 4/1997 | Rivette et al. | 395/773 |
| 5,632,022 A | 5/1997 | Warren | 345/350 |
| 5,644,686 A | 7/1997 | Hekmatpur | 706/61 |
| 5,692,107 A | 11/1997 | Simudis | 395/50 |
| 5,696,965 A | 12/1997 | Dedrick | 395/610 |
| 5,706,452 A | 1/1998 | Ivanov | 395/329 |
| 5,706,507 A | 1/1998 | Schloss | 395/615 |
| 5,715,445 A | 2/1998 | Wolfe | 707/5 |
| 5,765,138 A | 6/1998 | Aycock | 705/7 |
| 5,768,578 A | 6/1998 | Kirk | 707/100 |
| 5,778,398 A | 7/1998 | Nagashima | 707/501 |
| 5,781,189 A | 7/1998 | Holleran | 345/335 |
| 5,802,292 A | 9/1998 | Mogul | 395/200.33 |
| 5,822,539 A | 10/1998 | van Hoff | 395/200.66 |
| 5,826,025 A | 10/1998 | Gramlich | 395/200.47 |
| 5,826,267 A * | 10/1998 | McMillan | 707/9 |
| 5,826,269 A | 10/1998 | Hussey | 707/10 |
| 5,860,074 A | 1/1999 | Rowe | 707/526 |
| 5,864,850 A | 1/1999 | Nordman | 707/10 |
| 5,870,770 A | 2/1999 | Wolfe | 707/501 |
| 5,878,421 A | 3/1999 | Ferrel | 707/100 |
| 5,890,172 A | 3/1999 | Borman | 707/501 |
| 5,905,492 A | 5/1999 | Straub | 345/333 |
| 5,913,040 A | 6/1999 | Rakavy | 395/200.62 |
| 5,915,256 A | 6/1999 | Rogers | 707/501 |
| 5,933,811 A * | 8/1999 | Angles et al. | 705/14 |
| 5,946,682 A | 8/1999 | Wolfe | 707/5 |
| 5,948,061 A | 9/1999 | Merriman et al. | 709/219 |
| 5,959,621 A | 9/1999 | Nawaz | 345/329 |
| 5,959,623 A * | 9/1999 | Van Hoff et al. | 345/333 |
| 5,960,409 A | 9/1999 | Wexler | 705/14 |
| 5,963,205 A | 10/1999 | Sotomayor | 345/333 |
| 6,006,252 A * | 12/1999 | Wolfe | 709/203 |
| 6,011,537 A * | 1/2000 | Slotznick | 345/115 |
| 6,023,698 A | 2/2000 | Lavey | 707/10 |
| 6,034,680 A | 3/2000 | Kessenich | 345/329 |
| 6,038,601 A | 3/2000 | Lambert et al. | 709/226 |
| 6,094,675 A | 7/2000 | Sunaga | 709/204 |
| 6,138,128 A | 10/2000 | Perkowitz | 707/501 |
| 6,141,010 A | 10/2000 | Hoyle | 345/356 |
| 6,216,141 B1 | 4/2001 | Straub | 707/513 |

OTHER PUBLICATIONS

Abbott, "Marketing Your Website II: Rings, Banners and Links," Win95 Magazine, Jul. 1997 (from www.win95mag.com).

"And Now, the Webtop," PC Magazine, Jun.24, 1997, p. 9.

"TotalNews, Publishers Settle Suit," NEWS.COM, Jun. 5, 1997.

Blight, ""Annotated Reference List Agents""IEEE 1997 Conference on Communications, Power and Computing WESCANEX97 Proceedings, May 22, 1997, pp. 7–12.

Randal, "Web Central," PC Magazine, Apr. 22, 1997, p. 65.

Clyman, Mendelson, and Nadel, "In Your Face Browsing," PC Magazine, Apr. 22, 1997, pp. 45–48.

Sirapyan, "Pushing Content Along," PC Magazine, Apr. 8, 1997, p. 40.

Munro, "Internet Filtering Utilities," PC Magazine, Apr. 8, 1997, pp. 235–240.

Mendelson, "Internet Off–line Search Utilities," PC Magazine, Apr. 8, 1997, pp. 227–232.

Mendelson, "Internet Off–line Browsers," PC Magazine, Apr. 8, 1997, pp. 207–218.

Intercast Press Releases, Apr. 7–8, 1997 (from www.intercast.com).

Frelechoux, "An Architecture to Support Personalized Web Applications," Apr. 7, 1997 (available at http://www-.scope.gmd.de/info/www6/posters/726/poster726.html).

Robertson, "A Personalized Web," Internet World, Apr. 1997, pp. 32–34.

Lidsky, "The Web Delivers," PC Magazine, Feb. 18, 1997, pp. 128–143.

Resnick, "Marketing Riddle," Internet World, Feb. 1997, pp. 36–38.

Proffit, "Intercast Brings the Web to TV," PC Magazine, Jan. 21, 1997, pp. 203–204.

Zeff & Aronson, Advertising on the Internet (John Wiley & Sons 1997).

Isaacs, Inside Dynamic HTML (Microsoft Press 1997).

Lidsky, "Personal Webcasting," PC Magazine, Dec. 17, 1996, p. 40.

Kornblum, "A Hand–Cranked Engine," CNET NEWS-.COM, Dec. 11, 1996.

Singh and Lidsky, "All–Out Search," PC Magazine, Dec. 3, 1996, pp. 213–249.

Vanhelsuwe, "How to Make Java Applets Start Faster," NetscapeWorld, Dec. 1996 (from www.netscapeworld-.com).

Pulver, "A Personal Cast," Internet World, Dec. 1996, pp. 110–112.

Haskin, "Clearing a Path on the Web," PC Magazine, Nov. 19, 1996, p. 58.

Mendelson, "The Finder of Lost Sites," PC Magazine, Nov. 5, 1996, p. 48.

Roscheisen, "Beyond Browsing: Shared Comments, SOAPs, Trails, and Online Communities," Computer Networks and ISDN Systems, Apr. 10, 1995.

"Netscape's DDE Implementation," (from www.netscape-.com) Mar. 22, 1995.

Grunin, "Publish Without Paper," PC Magazine, Feb. 7, 1995, pp. 110–171.

Ayre & Reichard, "The Web Untangled," PC Magazine, Feb. 7, 1995, pp. 173–196.

Jamsa, Internet Programming (Jamsa Press 1995).

Discovering Westlaw: The Essential Guide (4th ed.) (1995 West Publishing Company).

Denning, OLE Controls Inside Out (Microsoft 1995).

Brown, Using Netscape 2, pp. 773–786 (Que 1995).

Brockschmidt, Inside OLE (2d ed. Microsoft Press 1995).

"More" Product Literature (two pages), (©1995 LEXIS/NEXIS).

Using Mosaic (Que Corporation 1994), pp. 31–44 & 80–85.

Shepard's United States Citations: CD–ROM Edition, © 1994 McGraw–Hill, Inc.

PatentWorks Workbench User's Guide, Waverly Systems, Inc., pp. 1–6, 67–95, and Quick Reference Card, ©1994 Waverly Systems, Inc.

Comer, Internetworking with TCP/IP, vols. 1, 2 & 3 (Prentice Hall 1994–1997).

How to Shepardize, © 1993 McGraw–Hill.

Foss, "Tools for Reading and Browsing Hypertext," Information Processing & Management, vol. 25, No. 4, pp. 405–418, 1988.

* cited by examiner

*Figure 25* server: ABC International, Ltd.; document: widget purchasing

Need help installing and configuring your widget? Configuration Services, Inc.'s low-cost and no-hassle configuration service will save you time and headaches. Call 1-800-4CONFIG.

*ABC International, Ltd.*

Our clearance sale continues! Widgets are $349.99 while supplies last. (Additional charge for shipping is $9.99.)

Quantity: [ ]

Credit Card No. [ ]
Shipping Address: [ ]

Select Shipping Carrier:
○ Federal Courier
○ United Package Carrier

Purchase Now

1806

*Figure 27* server: XYZ Corporation; document: widget purchase page

Need help installing and configuring your widget?
Configuration Services, Inc.'s low-cost and no-hassle
configuration service will save you time and headaches.
Call 1-800-4CONFIG.

XYZ Corporation

XYZ's high-performance and high-reliability Widget product will get the job done for you quickly and accurately every time. XYZ offers a free, one year unconditional money-back guarantee on all Widgets.

Our current price is $389.00 for each widget, including shipping and handling.

Quantity:

Select Shipping Carrier:
○ Federal Courier
○ United Package Carrier

Credit Card No.
Shipping Address:

Purchase Now

Widgets: $349.99, while supplies last.

click here to go to:

*ABC International, Ltd.*

SYSTEM AND METHOD FOR COMMUNICATING INFORMATION RELATING TO A NETWORK RESOURCE

This application is a continuation of application Ser. No. 09/442,193, filed Nov. 16, 1999, which claims the benefit of U.S. Ser. No. 08/936,910, filed Sep. 25, 1997, now U.S. Pat. No. 6,006,252, which claims the benefit of provisional application Ser. No. 60/052,830, filed Jul. 17, 1997, and U.S. Ser. No. 60/028,251, filed Oct. 8, 1996. These applications are hereby fully incorporated by reference.

BACKGROUND OF THE INVENTION

A continuing difficulty in today's information-rich society is effectively communicating pertinent information to those individuals who are most interested in it. A related problem in the art is efficiently and effectively finding pertinent information. Traditionally, methods for finding pertinent information or for guiding the user to information of interest are cumbersome and often ineffective.

BRIEF SUMMARY OF THE INVENTION

The present invention relates to a system and method for communicating information relating to a network resource. Some of the systems and methods disclosed herein can be used for finding, presenting and/or communicating useful and relevant information, including methods relating to guiding individuals to places of interest, and methods relating to the presentation of information that is pertinent to a particular individual's interests or situation.

In one embodiment, the present invention relates to a client computer that is operated by a user and that is connected to a network having a first web server, a second web server, and a supplemental information server. In some embodiments, the client computer is configured to: (a) execute a web browser application, wherein the web browser application has a web browser application window that is displayed on a display screen associated with the computer, wherein the web browser application window includes within it (1) a primary web browser window and also (2) a secondary window, wherein both of these windows are displayed simultaneously and are integrated into the web browser application window; and (b) execute a supplemental information program, wherein the supplemental information program interfaces with the web browser application that is executing on the client computer, and wherein the supplemental information program is configured to interface with the web browser application. Additional embodiments and features, and the nature of the present invention may be more clearly understood by

BRIEF DESCRIPTION OF THE DRAWINGS

FIG. 25 illustrates the display screen of FIG. 24 after the user selects the supplemental information presented to the user in FIG. 24.

FIG. 27 illustrates a browser or document viewing program having an area in which supplemental information may be displayed.

FIG. 38b illustrates supplemental information being displayed in the window of FIG. 38a.

FIG. 42 illustrates presentation of supplemental information upon selection of a menu item in FIG. 41.

FIG. 47 illustrates an alternate way of presenting supplemental information in connection with the procedure illustrated in FIGS. 44 to 46.

The foregoing drawings illustrate various features and aspects of the present invention, but are merely illustrative, and are not intended to limit the present invention in a manner not required by the appended claims.

DETAILED DESCRIPTION

Figure 1:
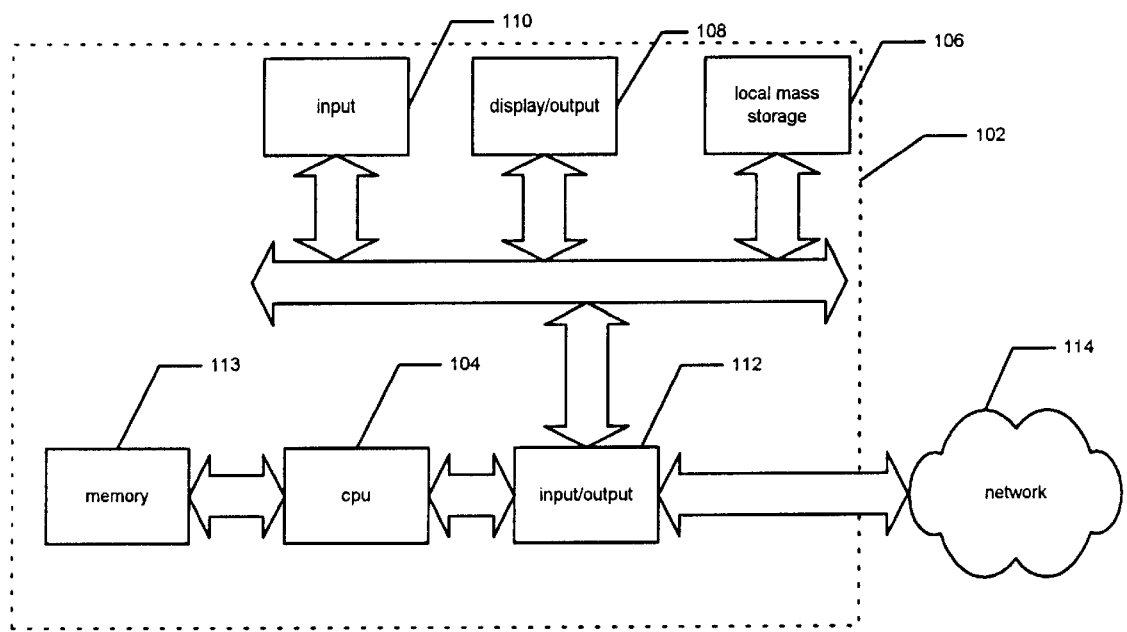
FIG. 1 is a block diagram of a computer system attached to a network.

FIG. 1 is a block diagram of a general purpose computer 102 that may be used to implement one or more embodiments of the present invention. The computer 102 has a central processing unit (CPU) 104, memory 113, and input/output (i/o) circuitry 112. The CPU 104 is connected to the memory 113 and the i/o circuitry 112. The i/o circuitry permits the CPU 104 to access various peripheral devices, such as the display 108, local storage 106, and input device(s) 110. The input device(s) 110 may include a keyboard, mouse, pen, voice-recognition circuitry and/or software, or any other input device. Some type of secondary or mass storage 106 is generally used, and could be, for example, a hard disk or optical drive. The storage 106 can also be eliminated by providing a sufficient amount of memory 113. Either the storage 106 or the memory 113 could act as a program storage medium that holds instructions or source code. The i/o circuitry 112 is also connected to a network 114, thereby connecting the computer 102 to other computers or devices.

Figure 2:
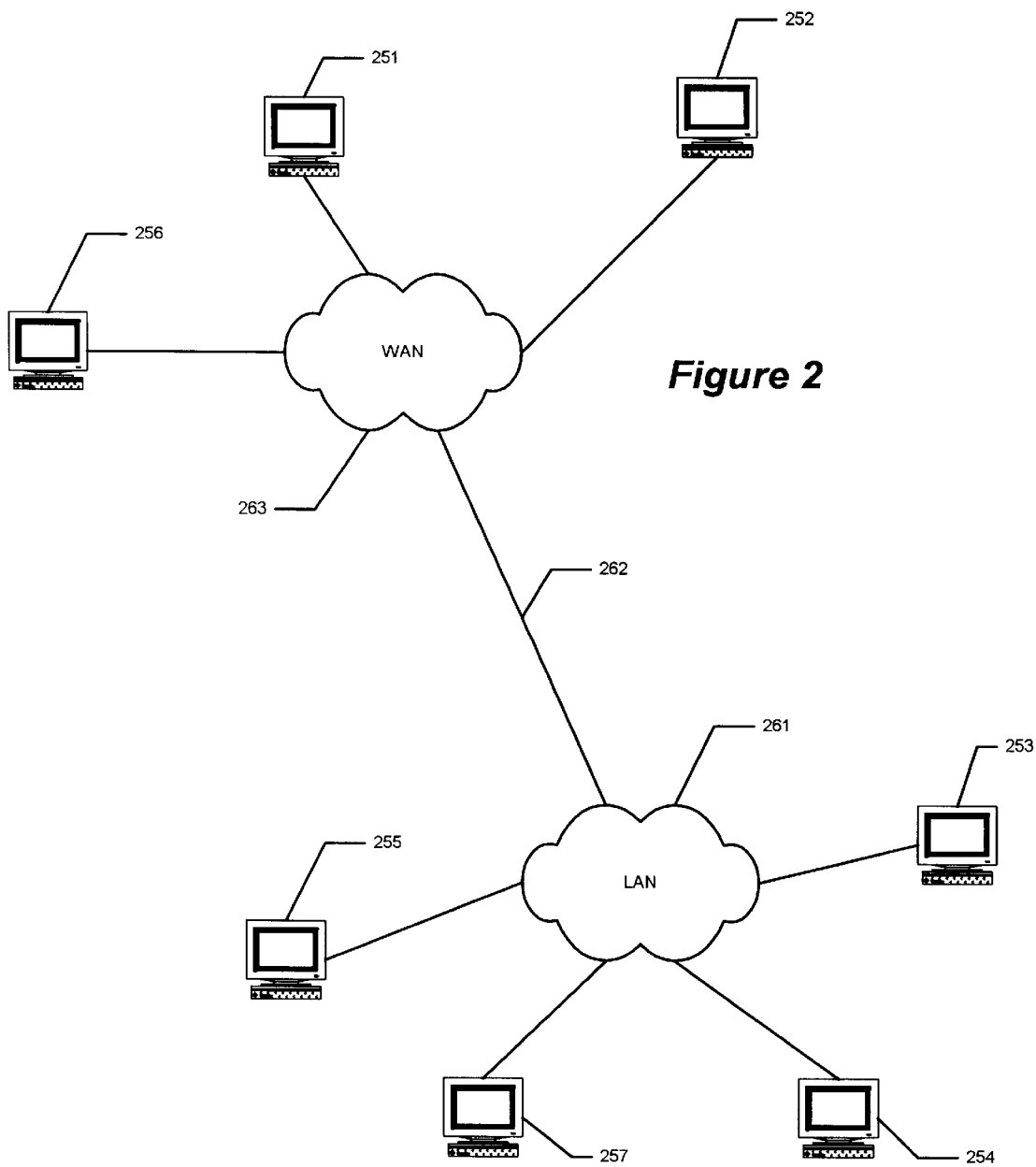
FIG. 2 is a diagram of multiple computers on a network.

FIG. 2 is a representation of multiple computers (251, 252, 253, 254, 255, 256, and 257) connected together to form a network of computers and/or networks. Computers 251, 252, and 256 are shown connected to wide area network (WAN) 263, whereas computers 253, 254, 255, and 257 are shown interconnected by local area network (LAN) 261. The LAN 261 is connected to the WAN 263 by connection 262.

Figure 3:
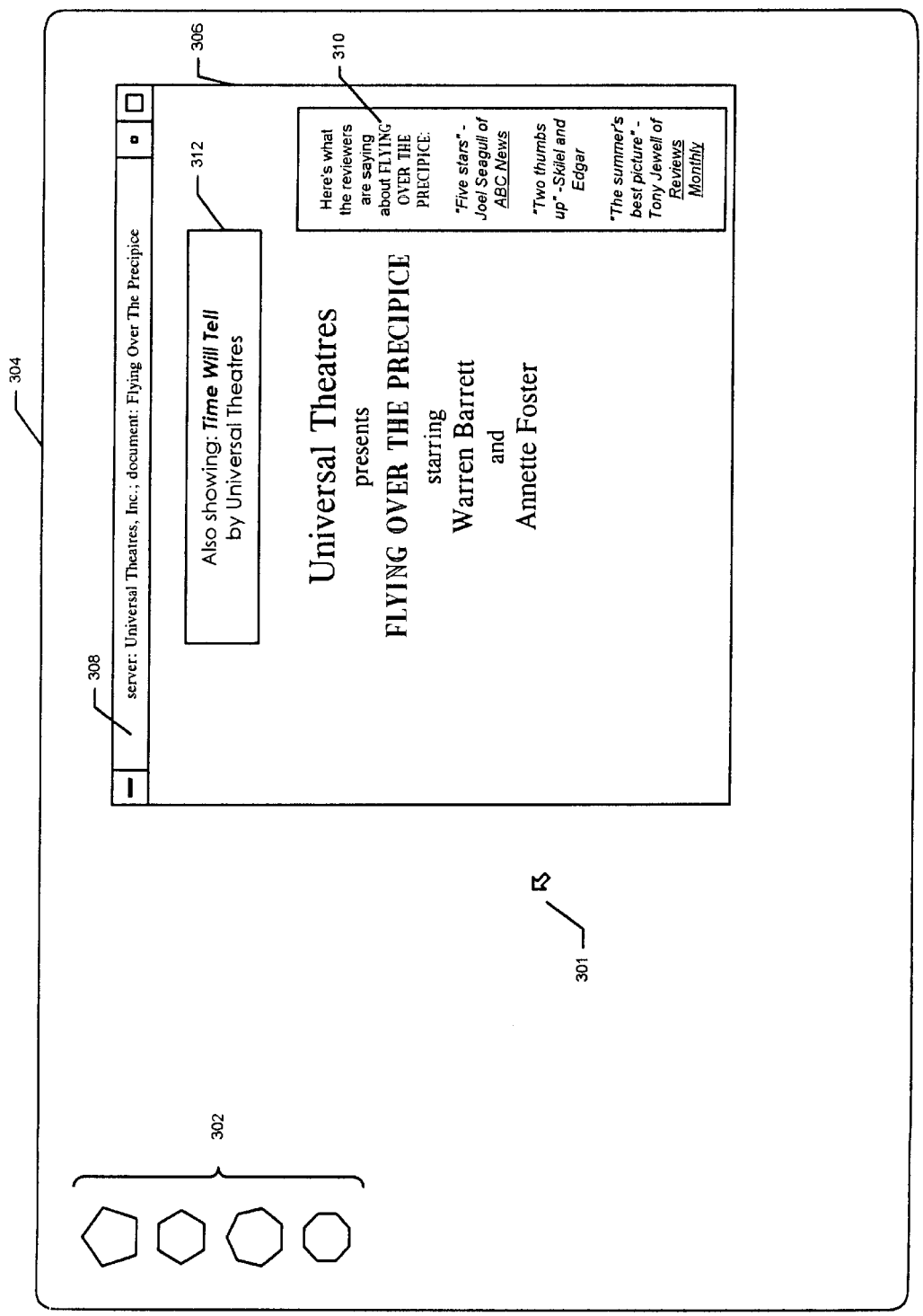
FIG. 3 is a simplified representation of a screen showing a window in which information retrieved over a network is displayed.

FIG. 3 shows a simplified representation of a video display screen 304 for a computer such as that of FIG. 1. The area 304 represents the area on a screen within which images, text, video, and other type of data or multimedia objects can be displayed and manipulated. On the display 304 shown in FIG. 3, a cursor 301, and a number of display elements, icons, or objects 302 are shown.

Another type of object, window 306, is also displayed on the display 304. The window 306 is a representation of a document retrieval, browsing, and/or viewing program that is used to view or interact with information or resources either stored locally on the computer or retrieved over a network. The window 306 has a title area 308 that displays the title of the resource or document being displayed, along with the server on which the document is located. The title area 308 could also display the location or address of the document being displayed, or also the universal resource locator of the document being displayed. Alternatively, an additional area within the window could be used for displaying the universal resource locator in the manner implemented by commercially available browsers.

Shown within the document viewing area of the window 306 in FIG. 3 are the contents of a document or page published by Universal Theatres, Inc., and made available at its server over a wide area or global network (e.g., the Internet's World Wide Web). This particular document or web page relates to a motion picture produced by Universal Theatres entitled "Flying Over The Precipice." As indicated in the window 306, actors named Warren Barrett and Annette Foster star in the movie. The document or page shown in window 306 is made available by Universal Theatres (on a wide area or global network) for browsing by, for example, people that may be interested in seeing this particular movie. The page in FIG. 3 (or others accessible from it) may provide information about which local theaters are showing the movie, and the times it is being shown. The page may also offer previews of the movie in the form of audio or video clips that encourage the viewer to see the movie.

Still referring to FIG. 3, some promotional information is also provided in an area 310 on the right side of the page. This promotional information is in the form of a list of favorable reviews that have been given to the "Flying Over the Precipice" movie. For example, Joel Seagull of ABC News gave the movie "five stars," and other reviewers also gave the movie a favorable review. These reviews might be selected by Universal Theatres, Inc. for inclusion in this page to encourage the viewers of the page to see the movie. For this reason, favorable reviews may sometimes be the only reviews included such a page.

A banner advertisement 312 is also displayed at the top of the page, which promotes another Universal Theatres movie, "Time Will Tell." Selection of such a banner ad may retrieve and display in the window 306 information about the advertised movie. The banner ad 312 could alternatively promote other entertainment choices, or other goods or services if Universal Theatres chooses to sell advertisement space on its pages to third parties. For example, a supplier of soft drinks to patrons of movie houses showing Universal Theatres pictures may choose to invest in advertising on one or more of Universal Theatres' pages.

Figure 4:
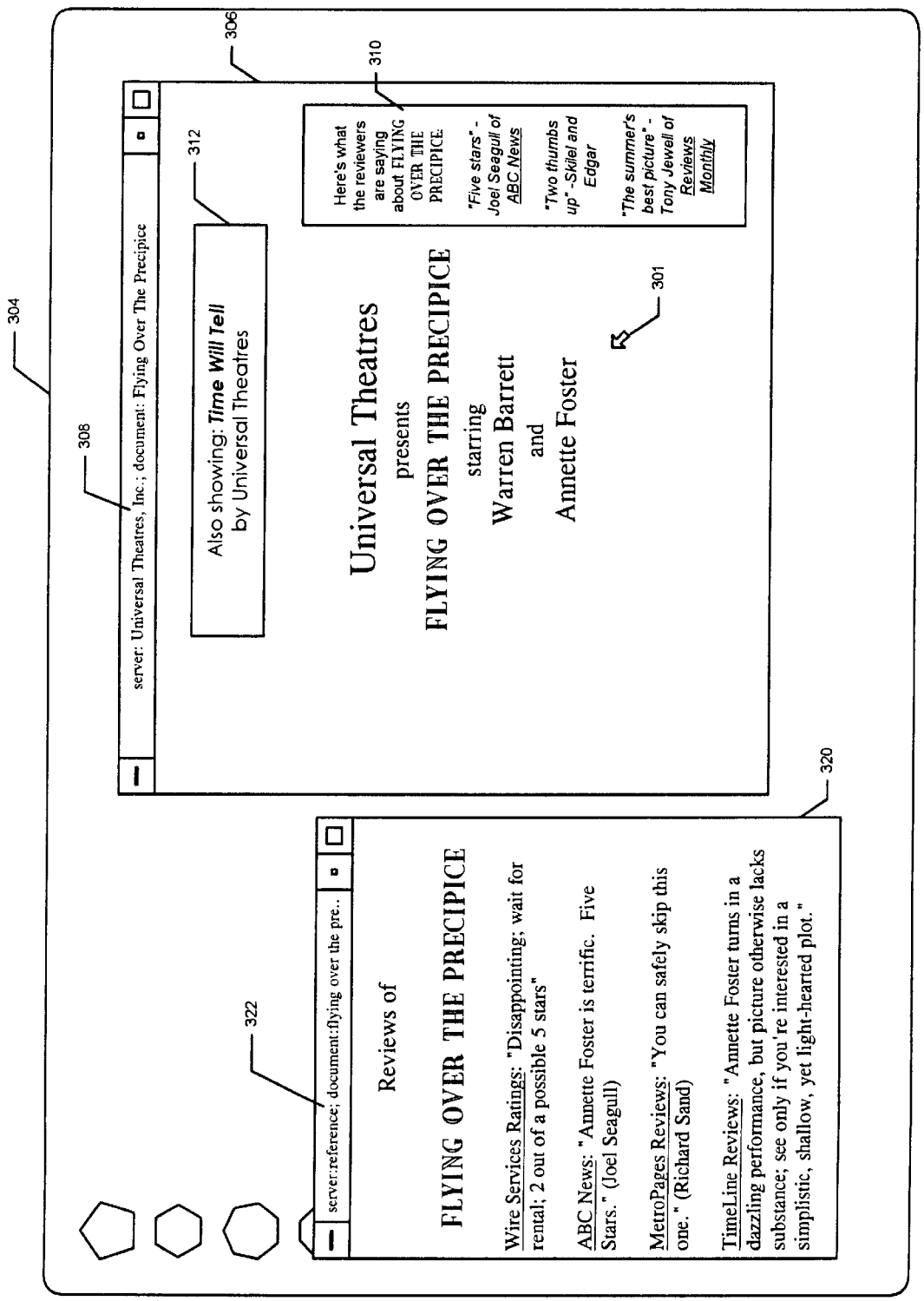
FIG. 4 is the view of FIG. 3 with an additional window shown on the display, in which supplemental information is displayed.

In FIG. 4, a simplified representation of a video display or screen is shown where window 306 is present, as was the case in FIG. 3, but in addition, a window 320 is also shown on the display. In the embodiment shown, the window 320 is displayed automatically when the user retrieves and displays the Universal Theatres page shown in window 306. The window 320 contains excerpts from various reviews of the movie "Flying Over the Precipice."

In the particular embodiment shown in FIG. 4, the information in the window 320 is not created or published by Universal Theatres. This information is instead created and published by a third party in this embodiment, such as a movie review organization that seeks to provide a well balanced, and even-handed representation of the reviews a particular movie is receiving. The page published by Universal Theatres and shown in window 306 in FIG. 4 may not link to or point to where the information in window 320 can be found on the network.

Shown in window 320 are four reviews of the movie "Flying Over the Precipice," including the favorable review by Joel Seagull of the (fictional) ABC News. The other three reviews shown in window 320 (from Wire Services Ratings, MetroPages Reviews, and TimeLine Reviews) are not as favorable and may discourage the viewer from seeing the movie "Flying Over the Precipice." In fact, the information provided in window 320 reveals quite a different tone from the reviewers than the set of reviews cited by Universal Theatres on its "Flying Over the Precipice" web page in window 306. Universal Theatres has omitted from its "Flying Over the Precipice" web page (shown in window 306) some of the reviews quoted in window 320.

As can be seen from the embodiment of FIG. 4, the information provided by Universal Theatres on the page shown in window 306 may not be an accurate or even-handed representation of the reviews the subject movie is receiving. Nor would one necessarily expect that Universal Theatres would provide an entirely accurate representation of the reviews for Flying Over the Precipice if many of those reviews are unfavorable. To do so may be counterproductive for Universal Theatres, because unfavorable reviews would not effectively sell the movie to people who view the page shown in window 306. The information provided by Universal Theatres in its publications and on its web pages may not be wrong or incorrect, but at least in some situations, this information is likely to be slanted in a manner that is favorable to Universal Theatres.

In the embodiment shown in FIG. 4, the information provided in window 320 provides a revealing supplement to the information on the Universal Theatres page shown in window 306. The information in window 320 therefore may be quite useful to a person contemplating going to a movie because the viewer will be able to consider a more representative sample of the reviews the "Flying Over the Precipice" is receiving. Universal Theatres, however, may prefer to keep unfavorable reviews from the viewer of its page when the reviews are generally unfavorable. (But in other situations or embodiments, Universal Theatres may not object, and may even encourage the communication of information of this type to the user.)

It may be possible for the user to go directly to the place on the network where the information shown in FIG. 320 is found. However, at least in some situations, the user may not know where to find these reviews, and may not even know that there is a resource for such information. Yet the user may in these situations know where to find the Universal Theatres' "Flying Over the Precipice" page that is shown in window 306. Universal Theatres may have heavily marketed the movie, and as a result, the user may know the location on the network where information about the movie can be found. Thus, at least in some cases, the user is more likely to go to the Universal Theatres page when interested in a particular movie produced by Universal Theatres. Yet the information that the user will find there may describe Universal Theatres' movies favorably, making an assessment of the entertainment value of a particular movie both difficult and potentially inaccurate. The supplemental information shown in window 320 may make such an assessment easier or more accurate.

Figure 5:
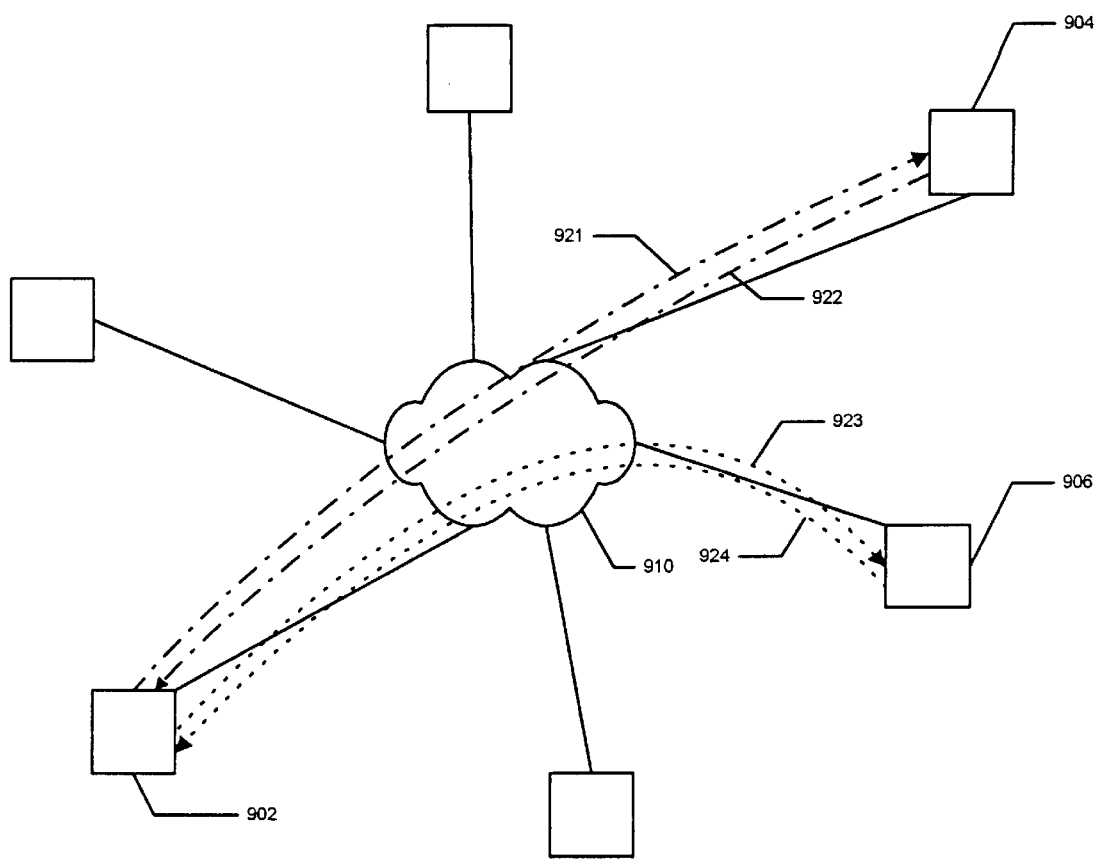
FIG. 5 is a network diagram showing the retrieval of supplemental information by a client computer.

FIG. 5 is a diagram showing seven computers, including computers 902, 904, and 906, connected to a network 910. Many more (or less) computers also could be present on the network. The network 910 could also be an internetwork such as that shown in FIG. 2, or any other type of network. In the embodiment of FIG. 5, the user operates a browsing program (i.e., "browser") at computer 902 (referred to herein as the "client" computer), and the browsing program is typically stored and executed on that computer. The browser is capable of retrieving resources from various computers on the network, such as from computers 904 and 906. Normally, inter-computer communication takes place through a protocol such as HTTP, DCOM, IIOP, or Java's RMI. Any other protocol could be used.

Figure 6:
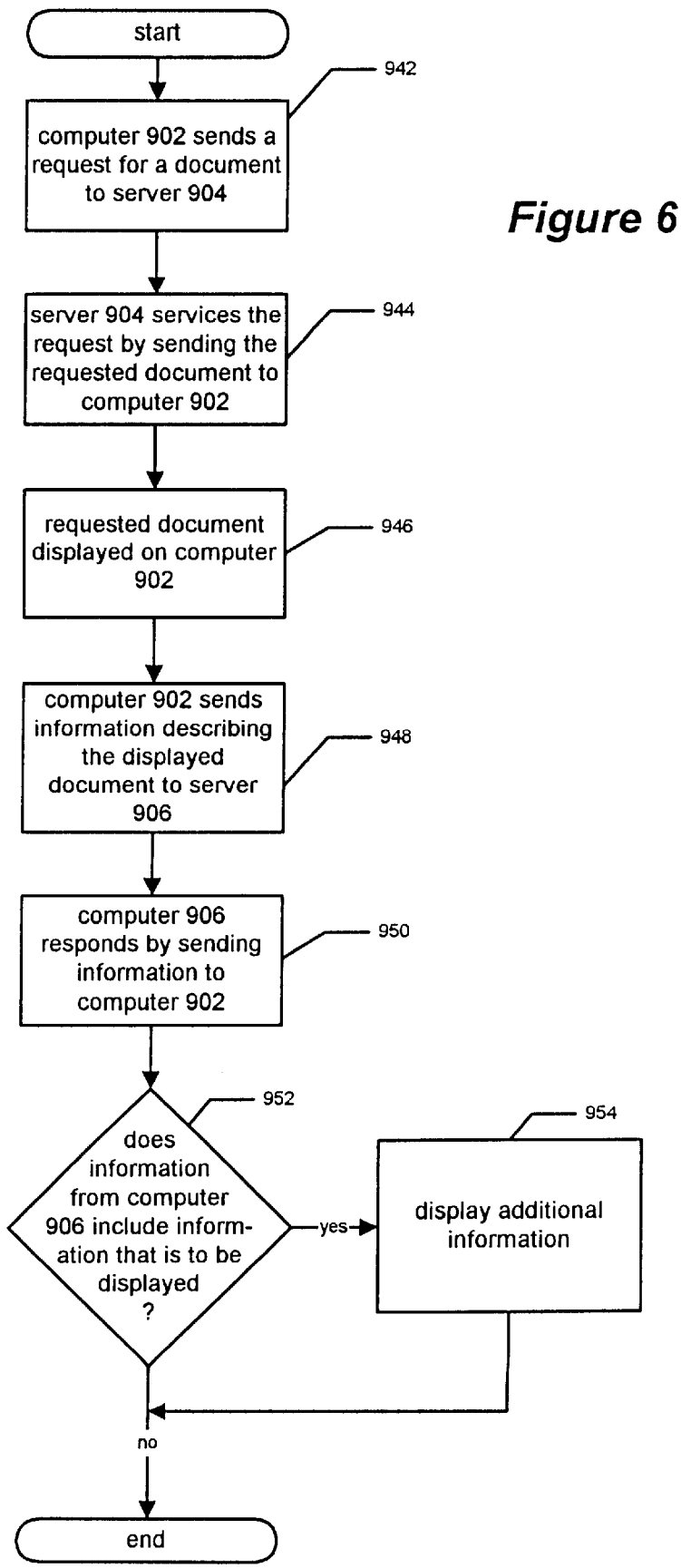
FIG. 6 is a flow chart illustrating the process for retrieving and presenting supplemental information in the network of FIG. 5.

FIG. 6 is a flow chart illustrating the process diagrammed in FIG. 5. At 942 in FIG. 6, the browser executing on computer 902 in FIG. 5 sends a request to computer 904 for a document stored on server 904. The document stored on the server 904 might be the "Flying Over the Precipice" document shown in FIGS. 3 and 4, and the computer 904 could be a web server on which that document is stored. The request for this document is shown in FIG. 5 by the arrow 921. The web server 904 responds to this request at 944 by sending the requested document to the client computer 902. (See arrow 922 in FIG. 5.) The browser executing at the client 902 then displays the requested document (946).

At 948 in FIG. 6, the browser (or another program that works in conjunction with the browser) then sends information describing and/or identifying the displayed document to computer 906 (arrow 923 in FIG. 5). In the embodiment shown, the computer 906 differs from the server from which the browser retrieved the displayed document. A computer such as computer 906 may be referred to in some embodiments as a "reference server" because requests are sent to it to see if supplemental information is available for a particular document on the network. Thus, it is used, at least in part, as a "reference." The information sent to computer 906 in the embodiment of FIG. 5 includes the server from which the displayed document has been retrieved (i.e., server 904), as well as the identity of the document or resource on that particular server that is being displayed at the client 902. For the example of FIGS. 3 and 4, the server is the Universal Theatres, Inc. server and the specific resource on that server is the "Flying Over the Precipice" document. See title bar 308 in FIGS. 3 and 4.

Upon receipt of this information from the client computer 902, computer 906 checks a table or a database of servers and documents to determine if there is supplemental information available for this particular document. The computer 906 then sends a response to computer 902 that indicates whether supplemental information is available for the identified document (i.e., the "Flying Over the Precipice" document), and if so, the computer 906 includes the supplemental information in its response. (See arrow 924 in FIG. 5.) The browser (or the program operating in conjunction with the browser) then displays the supplemental information (954). In the embodiment of FIG. 4, the supplemental information available for the "Flying Over the Precipice" document stored on Universal Theatres' web server is the reviews information shown in window 320 in FIG. 4. This supplemental information is sent to the client computer 902 (arrow 924) by the computer 906, and is displayed in window 320 along with the "Flying Over the Precipice" document as shown in FIG. 4.

Figure 7:
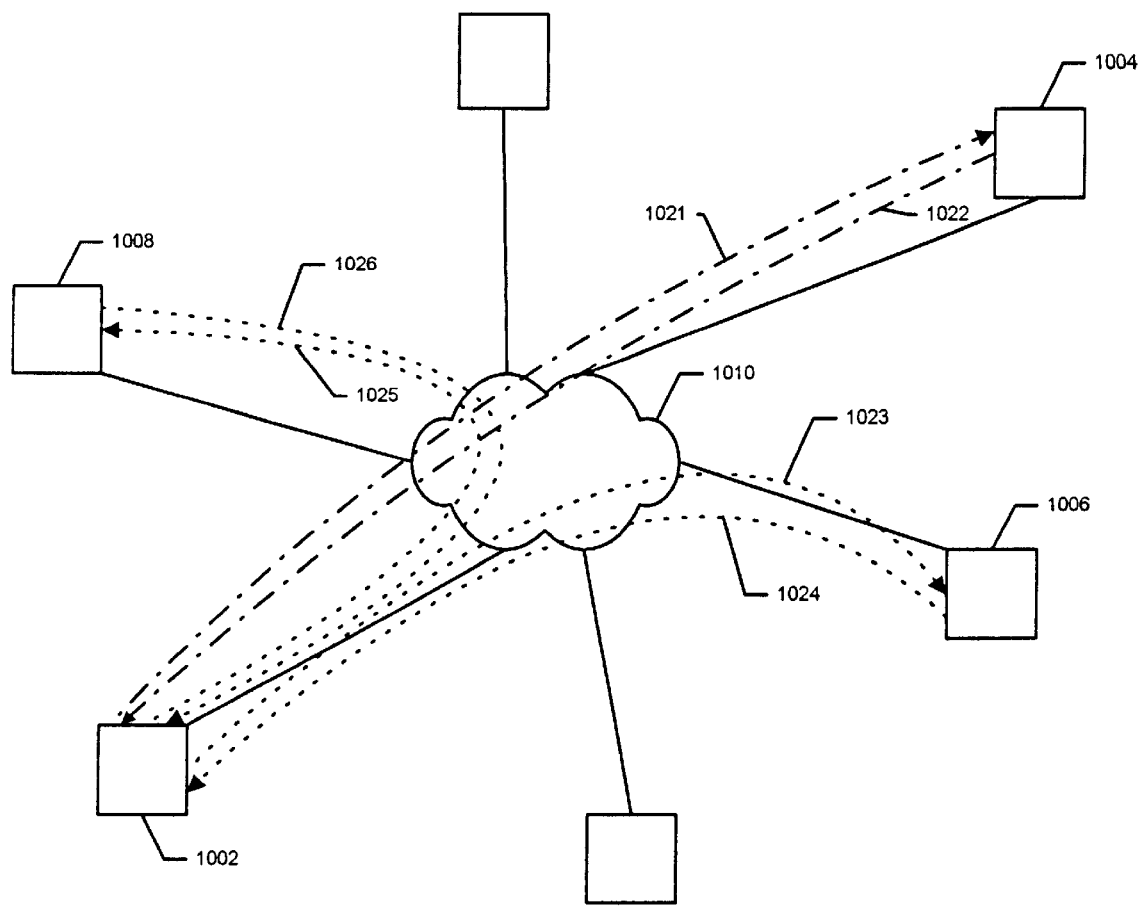
FIG. 7 is a network diagram showing an alternate procedure for retrieval of supplemental information.
Figure 8:
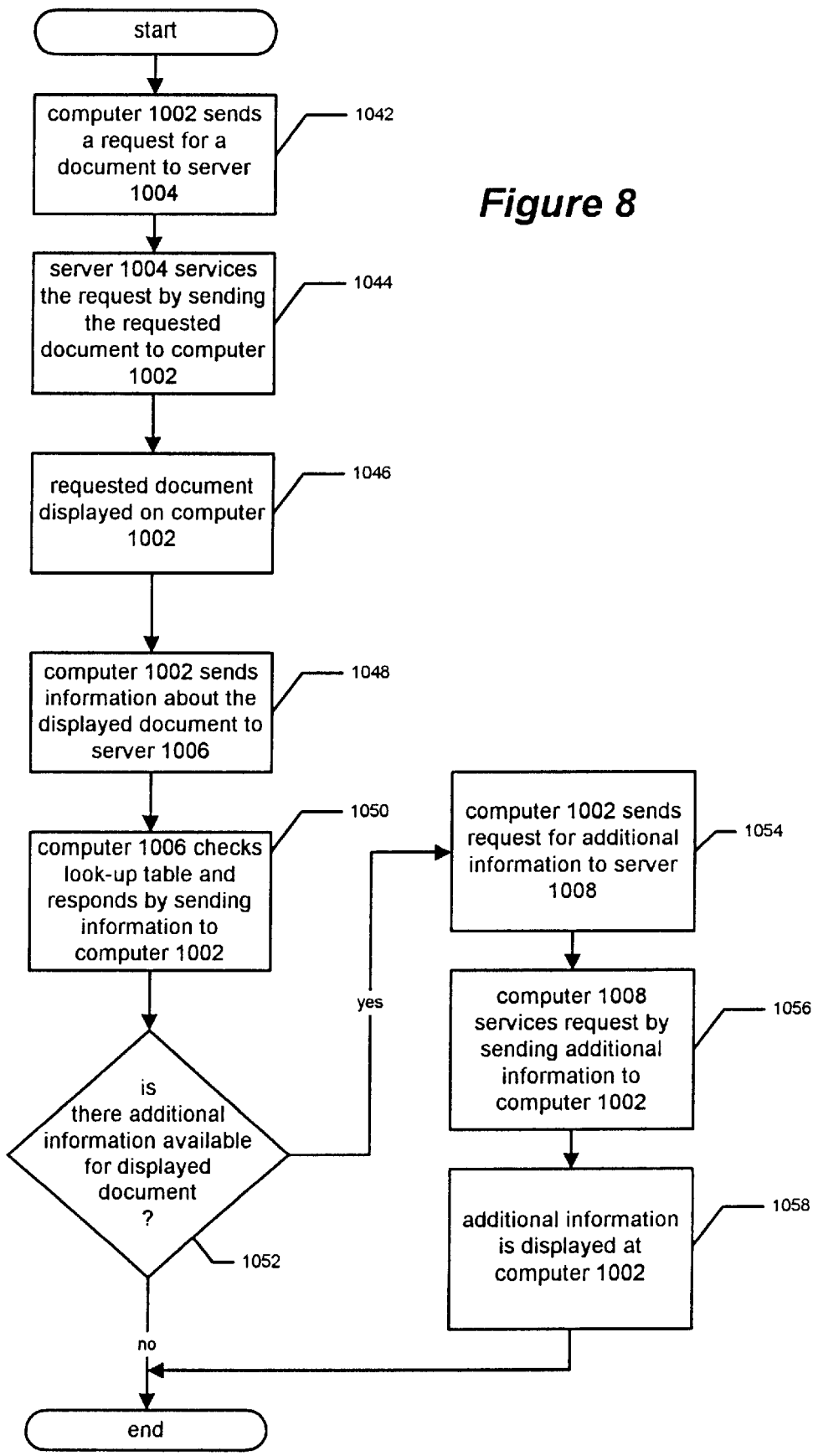
FIG. 8 is a flow chart illustrating the process for retrieving and presenting supplemental information in the network of FIG. 7.

FIG. 7 is another network diagram, and FIG. 8 is an accompanying flow chart. Computers 1002, 1004, and 1006, as well as others, are shown on a network 1010. The user operates the browsing program at the client computer 1002, and the browsing program is usually (but need not be) stored and executed on that computer. As in FIG. 5, the browser is used to retrieve resources from various computers on the network. At 1042 in FIG. 8, the browser executing on the client 1002 sends a request to server 1004 for a document stored on resource server 1004 (see arrow 1021 in FIG. 7). Upon receiving this request, the server 1004 sends the requested document to the client 1002 (arrow 1022 in FIG. 7), and the document is displayed at the client 1002. At 1048 in FIG. 8, the browser, or some other program that operates with the browser, sends information identifying the document displayed at the client to the server 1006. This computer 1006 checks to see if supplemental information is available for the identified document, and then sends to the client 1002 information that indicates whether supplemental information is available for the identified document, and if so, where that supplemental information can be found. If there is supplemental information available for the document displayed at the client computer 1002, the client then sends a request for the supplemental information to the computer identified by the information that the client receives from the reference server 1006. In the example of FIGS. 7 and 8, computer 1006 identifies computer 1008 as having supplemental information, so this request from computer 1002 goes to computer 1008 (see arrow 1025 in FIG. 7). (The computer 1008 may be referred to in some embodiments as the "supplemental information" server.) The computer 1008 responds by sending the supplemental information to the client 1002 (arrow 1026), and the client presents this supplemental information to the user, typically by displaying the supplemental information on the screen.

Figure 9:
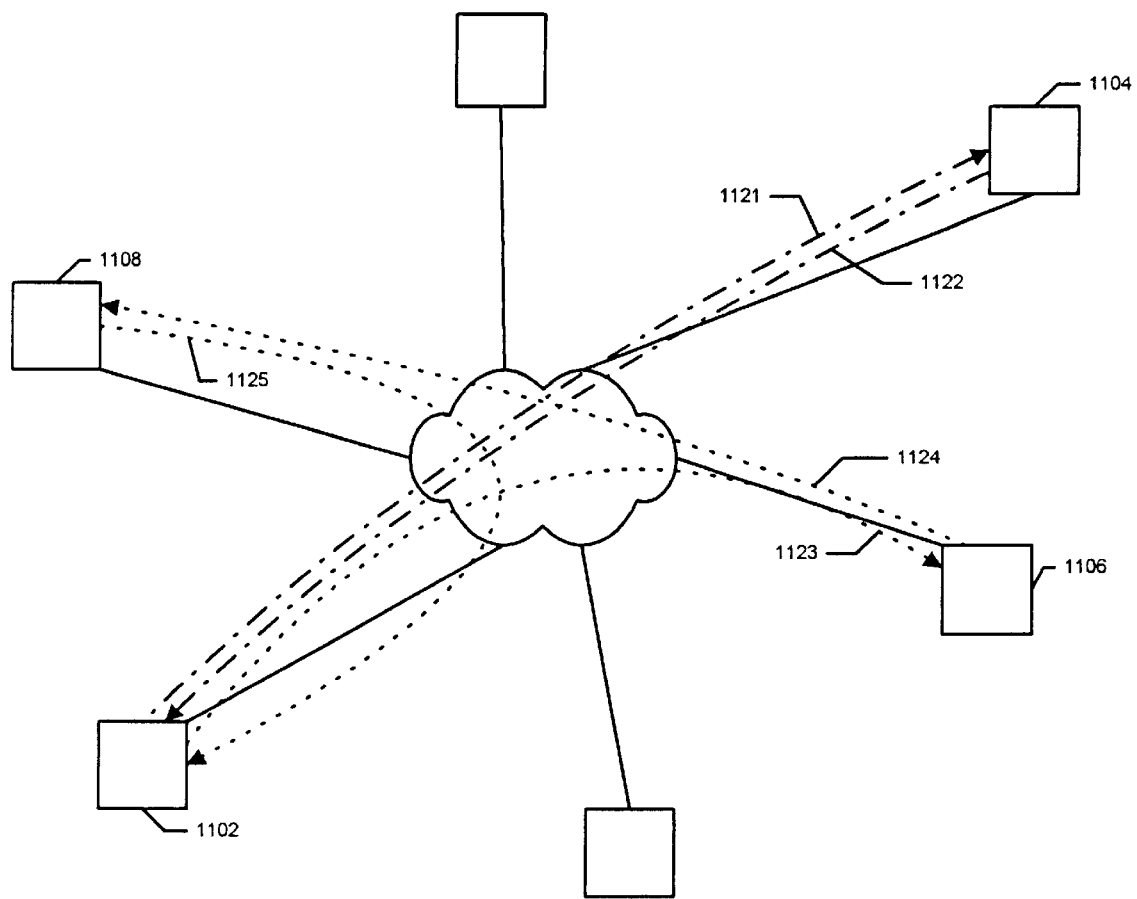
FIG. 9 is a network diagram showing an alternate procedure for retrieval of supplemental information.
Figure 10:
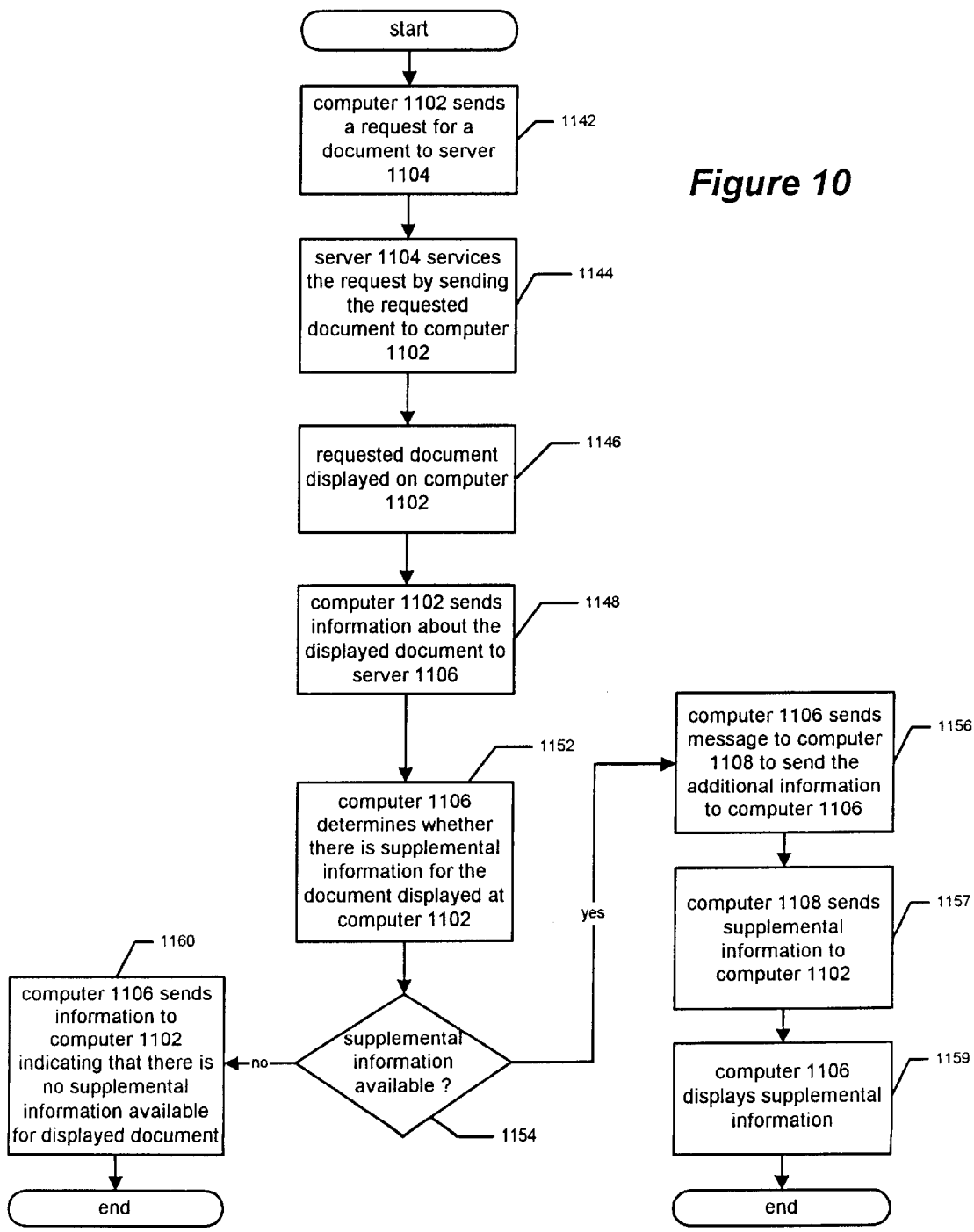
FIG. 10 is a flow chart illustrating the process for retrieving and presenting supplemental information in the network of FIG. 9.

FIGS. 9 and 10 illustrate a network diagram and accompanying flow chart in an other embodiment. In FIG. 9, the browser at the client 1102 sends a request for a document to the server 1104, and this server responds by sending the requested document to the computer 1102 (arrows 1121 and 1122 in FIG. 9). The client then sends information identifying the document to the reference server 1106 (arrow 1123). The reference server 1106 then determines, by accessing a database or look-up table, whether the identified document has supplemental information available for it (1152). If it does, it sends a message to computer 1108, directing that computer to send the supplemental information to the client 1102. The supplemental information is then sent to the client by the computer 1108. If the server 1106 were to determine at 1152 that there is no supplemental information available the document, the server 1106 would respond to the client computer 1102 by informing the client computer 1102 that no supplemental information is available for the displayed document.

FIGS. 11 through 14 illustrate embodiments of the present invention where the client computer 1502 has more than one process executing on it. In one embodiment, one process is a browser 1520 or document display program, and the other process is a program, applet, thread, or the like (hereinafter "program 1525") that coordinates the display of the supplemental information in the manner herein described. These two programs communicate through an interprocess communication protocol, such as the Dynamic Data Exchange (DDE), OLE, ActiveX, CORBA, or JavaBeans protocols. Other communication protocols or component architectures are or will become available and perhaps widely used, and it should be understood that they are also applicable to the present invention.

Figure 11:
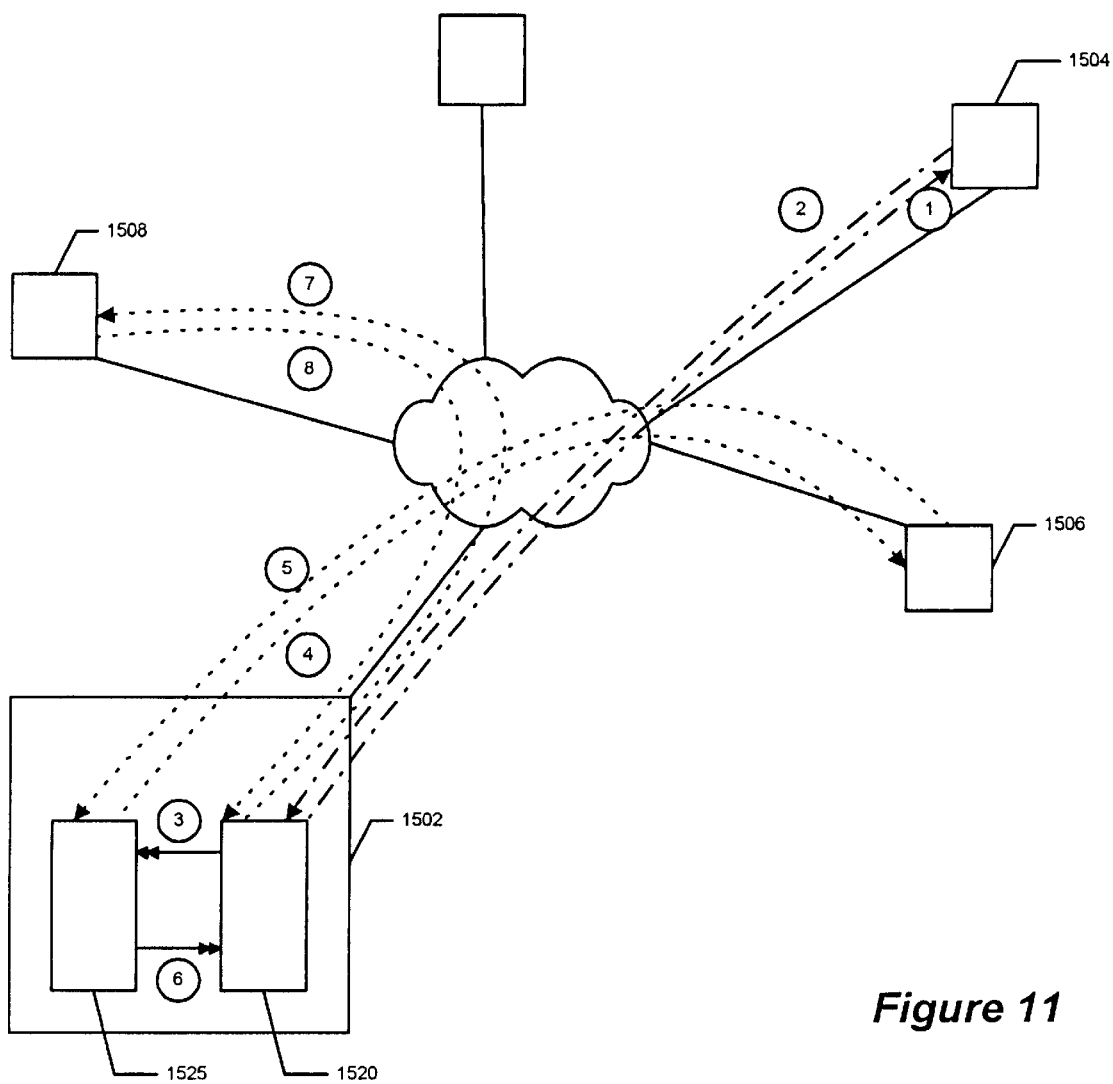
FIG. 11 is a network diagram showing network activity and inter-process communication at the client computer.
Figure 12:
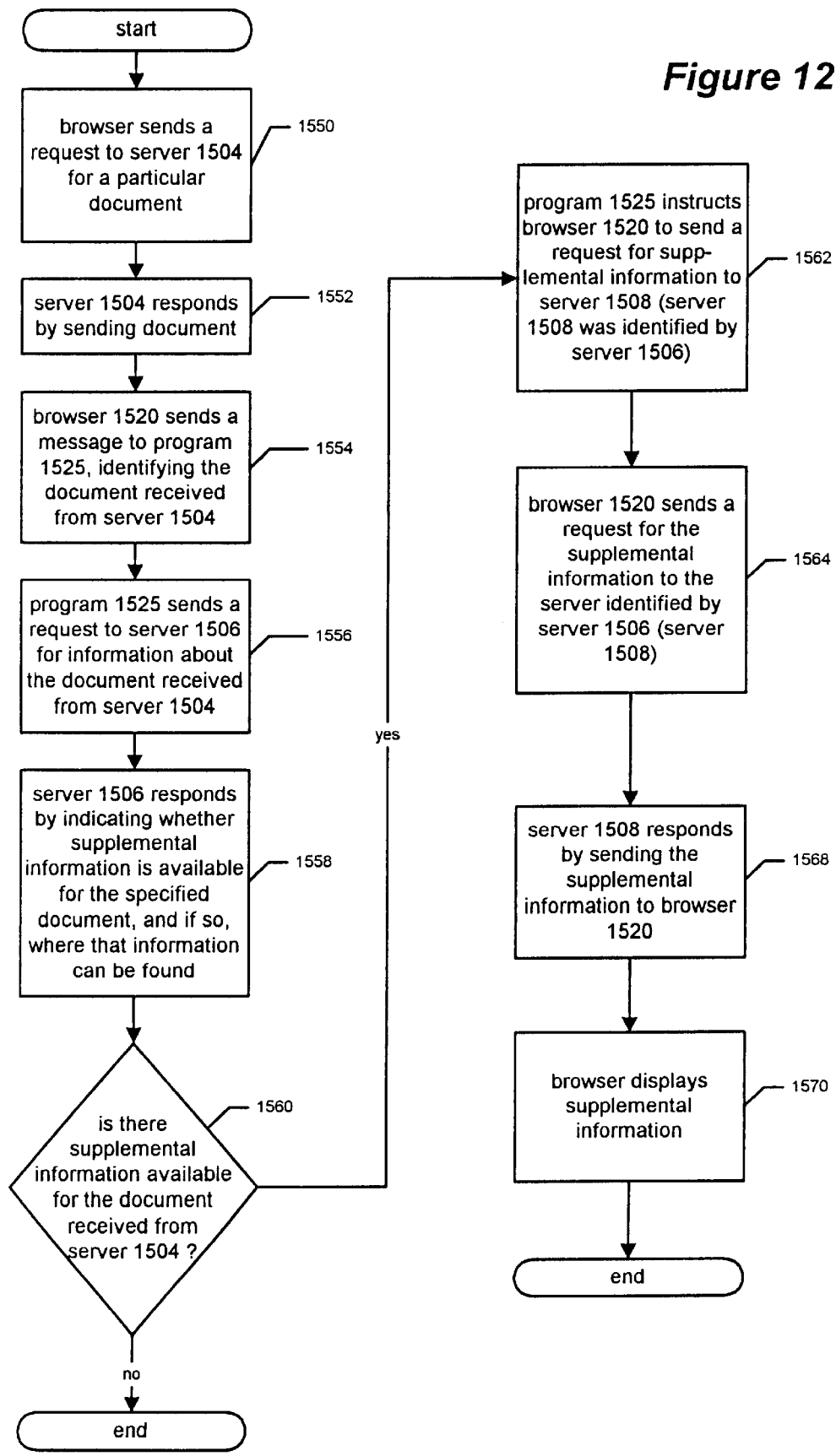
FIG. 12 is a flow chart illustrating the process diagrammed in FIG. 11.

FIG. 12 is a flow chart illustrating the process diagrammed in FIG. 11. At 1550, the client computer first sends to the web server 1504 a request for a particular document, which is then serviced by the web server 1504 by sending the requested document back to the client 1502. The browser program 1520 informs the program 1525 of the identify of the document that was just requested and displayed (1554). The program 1525 then sends information to the server 1506, inquiring whether supplemental information is available for the displayed document (1556). The server 1506 responds by either informing the program 1525 of the location of supplemental information available for the identified document or by informing the program 1525 that there is no supplemental information available for the displayed document (1558). If supplemental information is available for the displayed document, the program 1525 directs the browser to retrieve the supplemental information (e.g., from server 1508) and display it on the screen with the displayed document (1562, 1564, 1568, and 1570).

Figure 13:
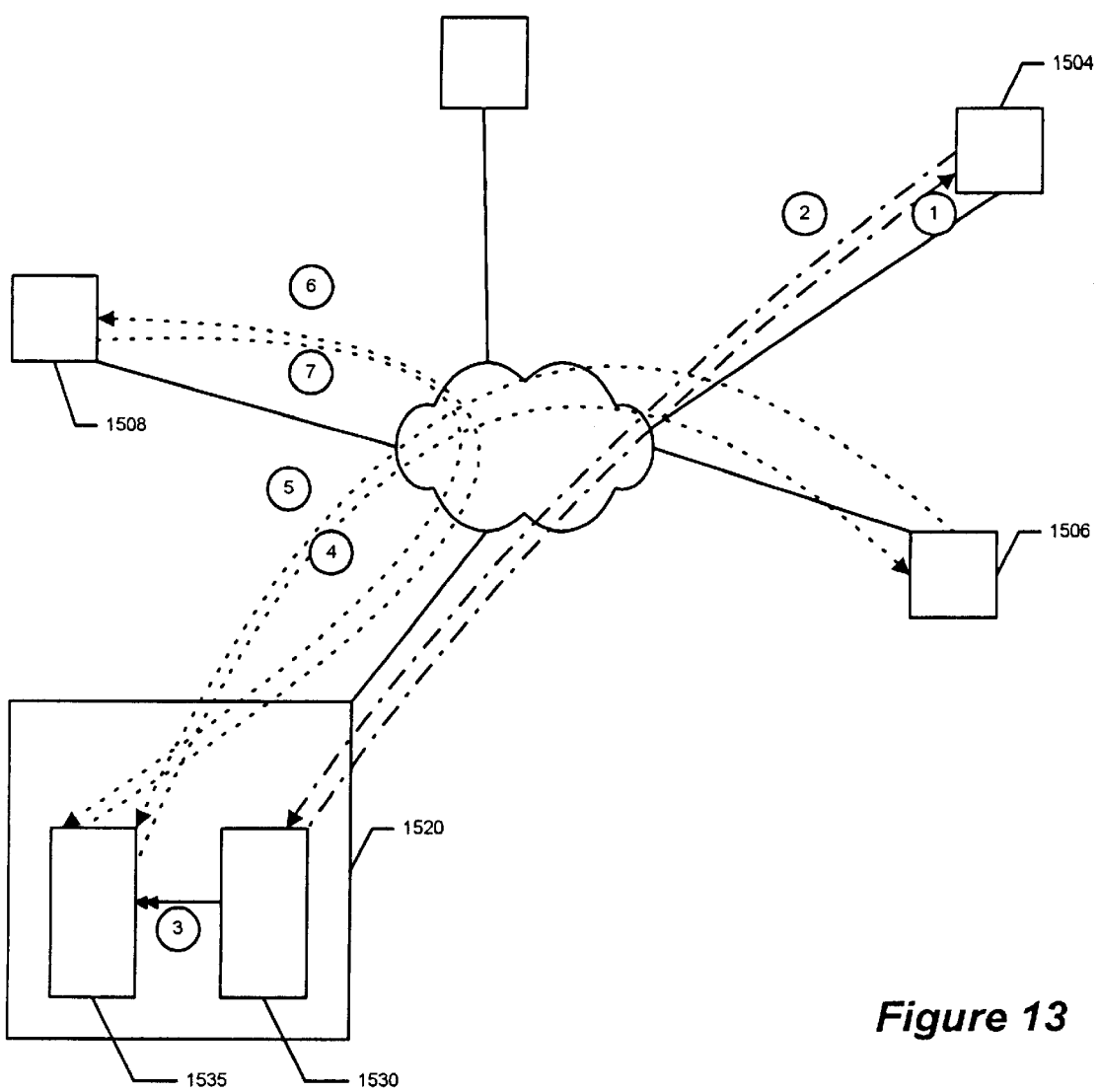
FIG. 13 is a network diagram showing an alternate implementation of two processes executing at the client program.
Figure 14:
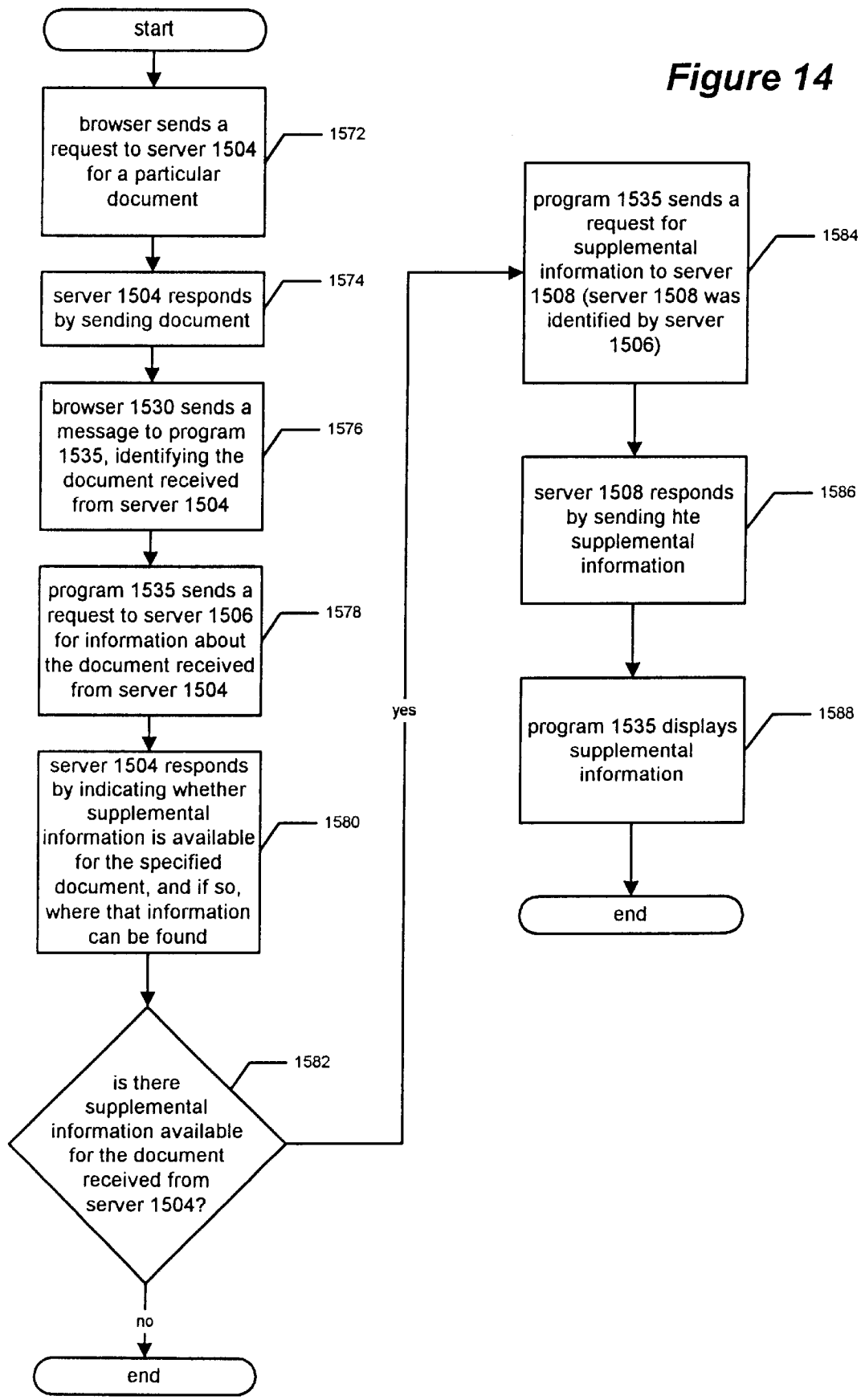
FIG. 14 is a flow chart illustrating the process diagrammed in FIG. 13.

FIG. 13 is a network diagram of another embodiment of the present invention, and FIG. 14 is a flow chart illustrating the process diagrammed in FIG. 13. As shown in FIG. 13, the browser program 1530 executing on the client computer 1502 first retrieves from the web server 1504 a given document or resource, and the browser 1530 informs the program 1535 of the identity of the retrieved document (1572, 1574, and 1576 in FIG. 14). The program 1535 then sends the identity of the retrieved document to the server 1506, and in response, receives the location of where any supplemental information for the retrieved document can be found (1578 and 1580 in FIG. 14). The program 1535 then retrieves the supplemental information and presents it to the user, typically by displaying it on the screen. The embodiment of FIG. 13 thus differs from that of FIG. 11. One difference is that unlike program 1525, program 1535 of FIG. 13 displays the supplemental information rather than directing the browser to display that content.

In FIGS. 11 to 14, the programs 1525 and 1535 may be informed of the identity of the document presented to the user by the programs 1520 and 1530 through interprocess communication. It may be appropriate in other embodiments, however, for the program 1525 (or the program 1535) to access the network connection or network stack or operating system software directly, and analyze the information or packets being passed over the network. The data on the network may need to be analyzed and/or decoded to decipher the necessary information about the identity of the document presented to the user. It should be understood that any known or hereafter developed technique for identifying the content being presented to the user could be used, and such techniques may also be applicable to the present invention. The present invention need not be limited to the interprocess communication techniques described in connection with FIGS. 11 to 14.

Figure 15:
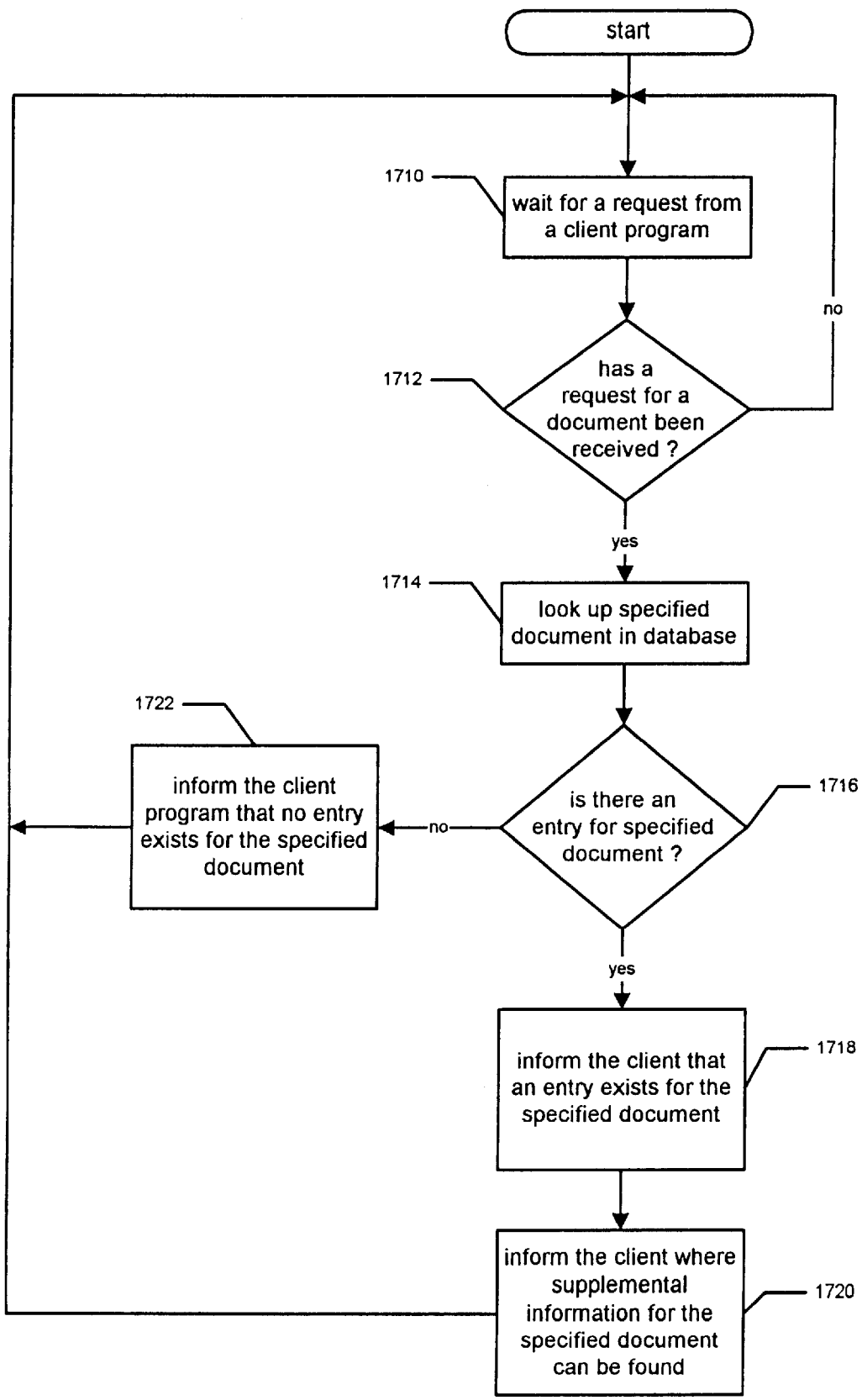
FIG. 15 is a flow chart illustrating a server process similar to that shown in FIGS. 11 and 13.

FIG. 15 is a flow chart that illustrates the operation of a server computer such as computer 1506 in the embodiments diagrammed in FIGS. 11 and 13. In FIGS. 11 and 13, a server process executes on the computer 1506 to provide information to client computers about where supplemental information relating to network resources can be found. At 1710 and 1712 of FIG. 15, the server process waits for a request from a client computer. Upon receiving a request, the server process looks up the document specified in the client's request in a look-up table or some other data structure (1714).

If the server does find at 1714 and 1716 that there is supplemental information for the specified document, the client computer is so informed at 1718, and the client computer is also informed at 1720 where the supplemental information can be found. Where there is no supplemental information for the specified document, the reference server informs the client that no entry exists for the specified document, which the client understands to mean that there is no supplemental information for the specified document. The loop 1710 and 1712 is then reentered.

Figure 16:
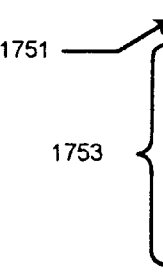
FIG. 16 is a simplified representation of a database or look-up table that may be used by a server computer.

FIG. 16 is a simplified representation of a database or look-up table such as that referred to at 1714 in FIG. 15. As can be seen from this table, the "Flying Over the Precipice" document that is stored on the "Universal Theatres" server has an entry at 1751 specifying that supplemental information for this document can be found at the server called "reference" and within the document called "flying over the precipice." This is the document displayed in window 320 in FIG. 4. There are also other entries 1753 for the "Flying Over the Precipice" document in the table of FIG. 16, which means that there are a few instances of supplemental information for the "Flying Over the Precipice" document.

There are entries for other documents in FIG. 16, such as the "index" document from the "Hunan Taste" server. This document has supplemental information available, and that supplemental information is contained within the document "metro pages quote" and is stored on the "oriental specialties" server. Similarly, the "dine-in menu" document on the "Hunan taste" menu also has supplemental information within document "dine-in menu" at the "oriental specialties" server. By referring to the entries in the look-up table, the server is able to determine whether supplemental information is available for any given document. In the embodiment shown in FIG. 16, if there is no entry in the look up table for a document, no supplemental information is available for that document.

Figure 17:
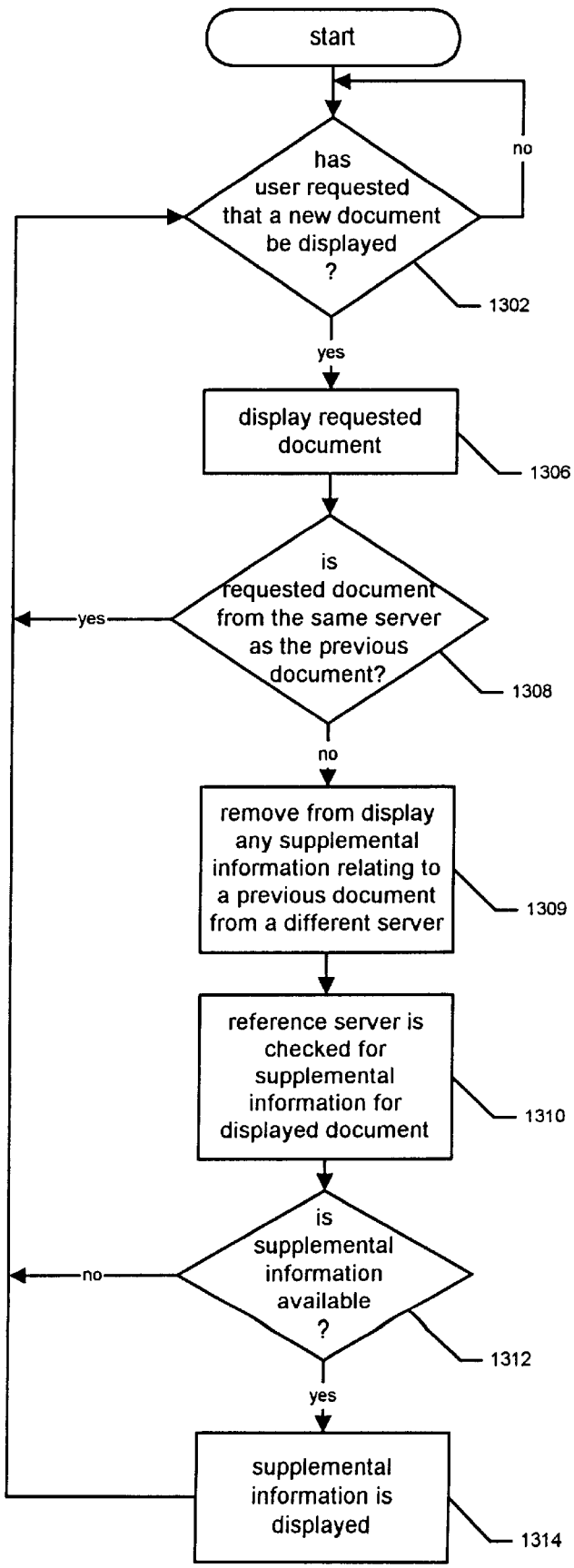
FIG. 17 is a flow chart illustrating a process in which a client computer sends a request to a reference server in certain circumstances.

In some embodiments of the present invention, each time a new document or resource is presented to the user (e.g., in window 306 of FIG. 3), a request for supplemental information is always initiated. In other embodiments, the client computer only occasionally sends a request over the network to determine whether there is supplemental information for the document displayed or otherwise presented at the client computer. FIG. 17 is a flow chart illustrating a process in which the system waits at 1302 until the user requests that a new document be displayed. When the user makes such a request, the requested document is displayed at 1306. If the requested document is not from the same server as the previous document, supplemental information relating to a previous document is removed from the display at 1309. A message is then sent over the network to a reference server so that the reference server can determine whether supplemental information is available for the displayed document (1310, 1312). If so, the supplemental information is retrieved and displayed. However, if the displayed document is from the same server as the previous document, or if there is no supplemental information for the displayed document, the waiting loop 1302 is entered.

The embodiment of FIG. 17 thus operates to check the reference server for supplemental information only where the user requests a document that is stored on a server that is different from that of the previously-displayed document. The amount of network traffic generated by repeated requests to the reference server is reduced in this embodiment because the requests are generated only when the user accesses a new server. In a modified version of this embodiment, the reference server is checked only where the domain has changed.

Figure 18:
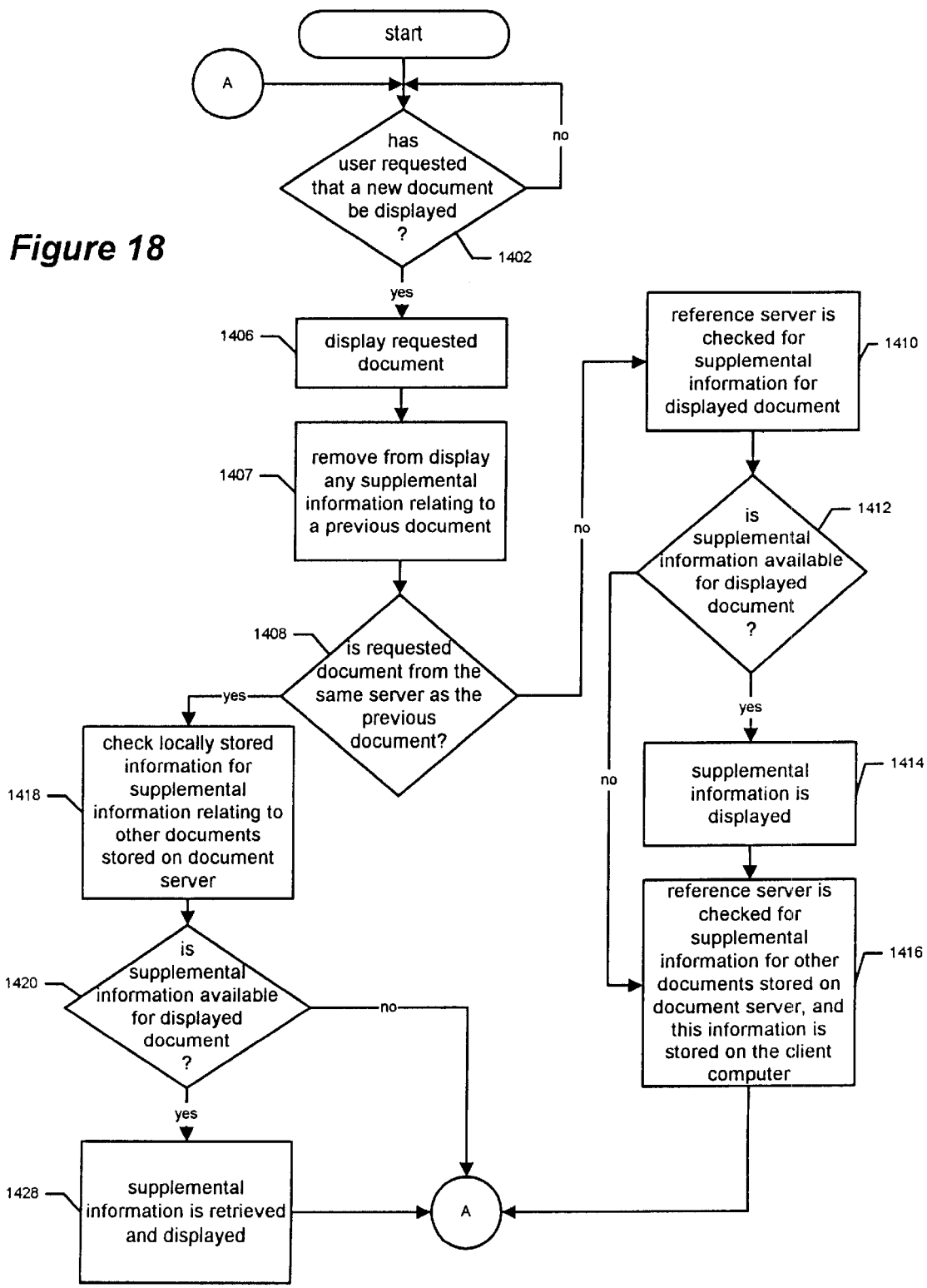
FIG. 18 is a flow chart illustrating a process in which a client computer determines whether supplemental information is available for more than one document.

FIG. 18 is a flow chart illustrating a process in another embodiment of the present invention. In FIG. 18, if it is determined at 1408 that the requested document is not stored on the same server as the previous document, then a reference server is checked for supplemental information for the displayed document (1410). If supplemental information is available, that information is retrieved and displayed (1412). In addition, the reference server is checked for supplemental information for other documents stored on the document server, and this information is stored on the client computer (1416). The loop 1402 is then entered. If at 1408 the requested document is from the same server as the previous document, the locally stored information for other documents stored on the same server is analyzed. This information may have been previously stored at 1416, and if it reveals that supplemental information is available for the displayed document, the supplemental information is retrieved and displayed at 1428.

Thus, in the embodiment of FIG. 18, that portion of the look-up table or database (or whatever data structure is used) that corresponds to a particular server is downloaded to the client the first time that the client computer retrieves a resource from a particular server. Thereafter, the client need not use the network to determine whether supplemental information is available for any other documents stored on that same server because the information necessary to make this determination is stored locally on the client. This embodiment may be more efficient where the cost of making multiple requests over the network is high and the information that needs to be downloaded each time a new server is encountered is not too voluminous.

Figure 19:
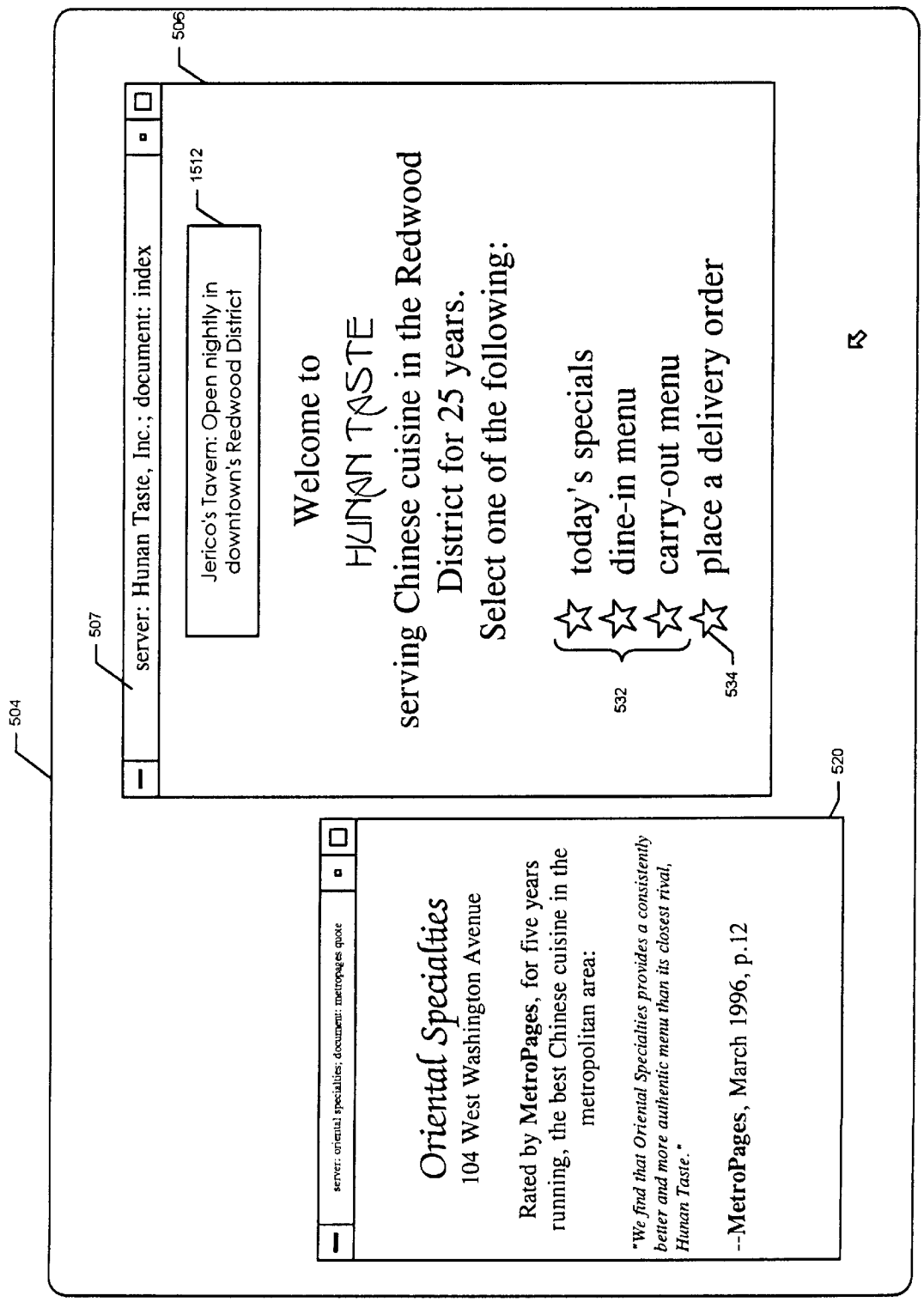
FIG. 19 is a view of a screen showing a window in which supplemental information is displayed.

In FIG. 19, a window 506 from a document retrieval program or a browser is shown on the screen 504. The title bar 507 identifies the server from which the document was retrieved (i.e., the server controlled by "Hunan Taste, Inc."), and the identity of the document (i.e., "index"). This "index" document relates to a restaurant named "Hunan Taste," located in a hypothetical city's "Redwood District." This document provides links to information about the Hunan Taste restaurant's daily specials and dine-in and carry-out menus, which can be retrieved by the user by selecting one of the display elements 532. A delivery order from Hunan Taste can also be placed by selecting display element 534. A banner advertisement 512 promotes an establishment called "Jerico's Tavern," which is located near Hunan Taste. In this embodiment, Jerico's Tavern advertises on Hunan Taste's page because it seeks to attract patrons leaving Hunan Taste after dining. Because Jerico's Tavern is not a direct competitor to Hunan Taste, Hunan Taste may permit (even encourage) Jerico's Tavern to advertise on the page shown in window 506.

When the "index" document from the Hunan Taste server is retrieved over the network and displayed in the window 506, as shown in FIG. 19, the window 520 also appears on the display screen 504. The information shown in window 520 relates to a competing Chinese restaurant called "Oriental Specialties." A person viewing the Hunan Taste page shown in window 506 is likely to be interested in going to a Chinese restaurant, so "Oriental Specialties" has an interest in providing an advertisement to such a person. In some situations or embodiments, however, Hunan Taste may not allow a competing restaurant (i.e., Oriental Specialties) to advertise on the page displayed in window 506. Thus, Oriental Specialties may be unable to reach these potential customers through advertisement on Hunan Taste's pages. (In other situations or embodiments, Hunan Taste may permit such activity.)

The window 520 allows Oriental Specialties to communicate with the person viewing the Hunan Taste web page displayed in window 506. These persons may be considering a visit to the Hunan Taste restaurant, or at least may be interested in Chinese food. In window 520, Oriental Specialties provides information targeted specifically to individuals viewing the Hunan Taste page shown in window 506 by quoting a magazine article in which Oriental Specialties is favorably compared to Hunan Taste. This may be targeted and effective marketing for Oriental Specialties because the message displayed in the window 520 is likely to be seen by individuals looking for the very service that Oriental Specialties provides. In addition, the person viewing the Hunan Taste page may also be interested in seeing the information shown in window 520. Because this person has retrieved the Hunan Taste page, he or she likely is interested in Chinese cuisine, yet may not know about the Oriental Specialties restaurant. Thus, from the user's perspective, the window 520 may provide useful, relevant, and appreciated information that might not otherwise be seen when viewing the Hunan Taste page alone.

Figure 20:
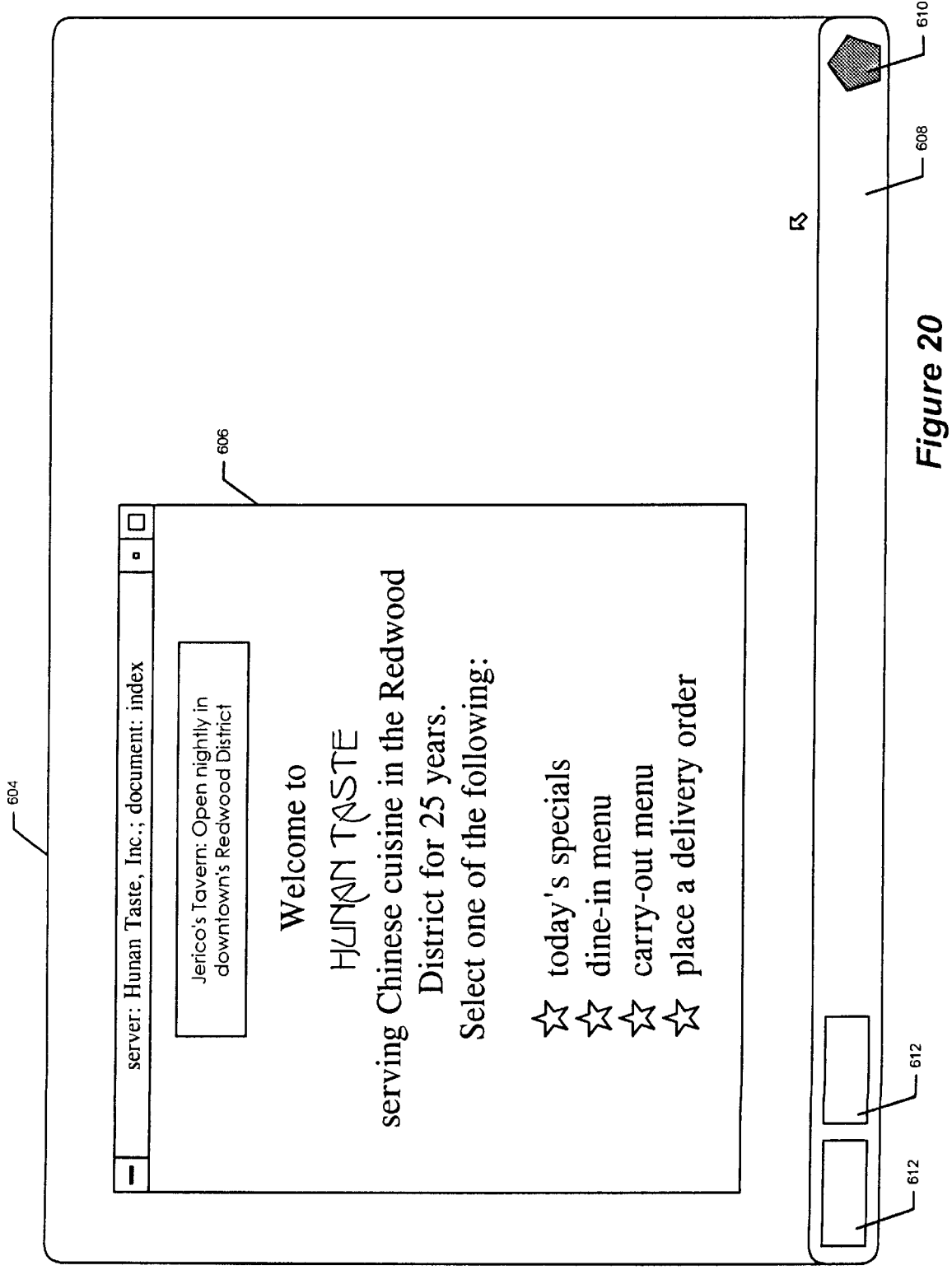
FIG. 20 is a view of a desktop having a display element that the user can select to display supplemental information.

In FIG. 20, the "index" document from the Hunan Taste, Inc. server is displayed in window 606, and in this embodiment, a task bar 608 is also shown on the display screen 604. This task bar 608 has buttons 612 that can be used to select particular programs or stores of information. In FIG. 20, supplemental information is displayed in response to the user selecting (e.g., through an input device) the display element 610.

Figure 21:
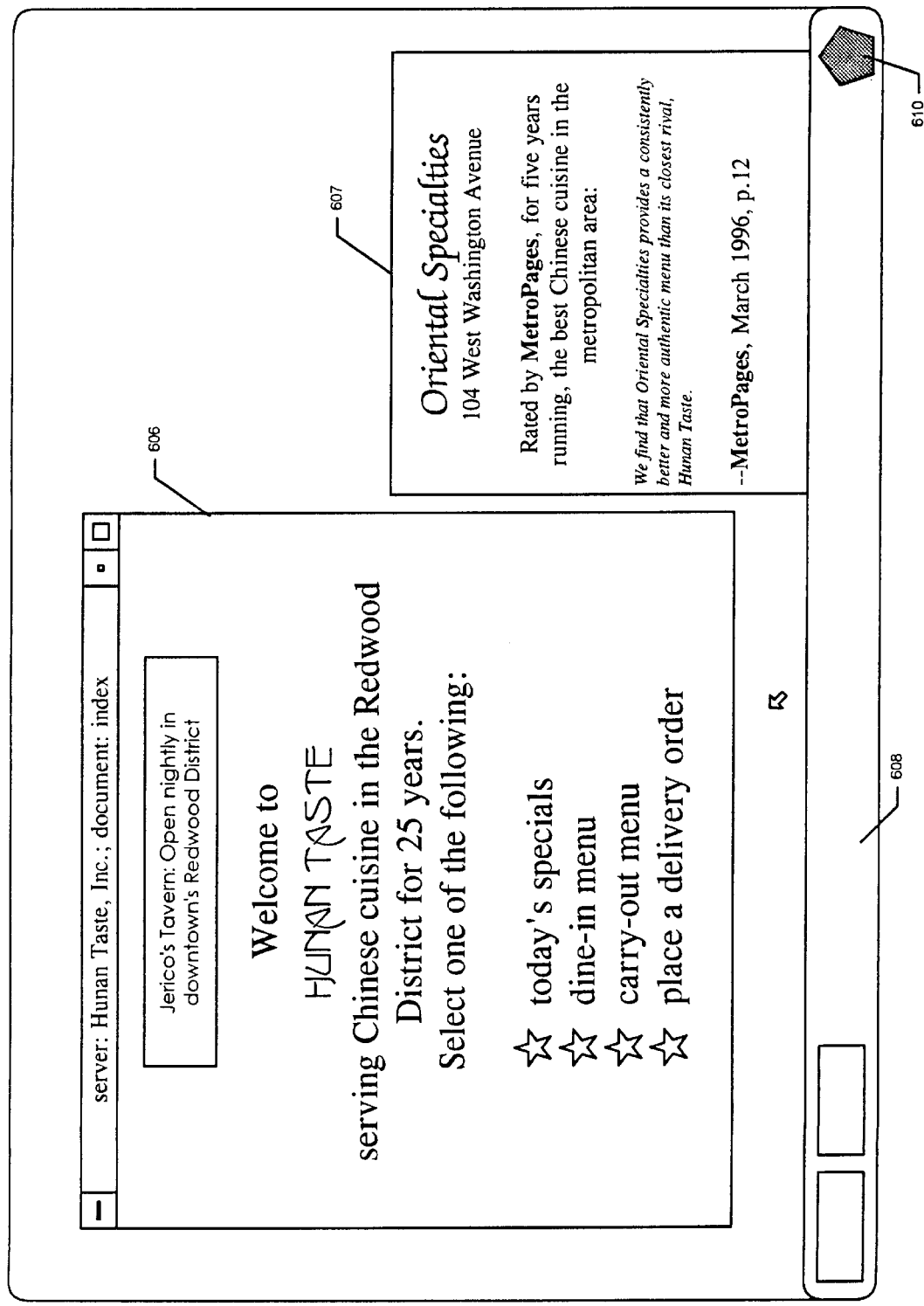
FIG. 21 is the desktop of FIG. 20 after selection of the display element.

In FIG. 21, the user has selected the display element 610, causing supplemental information similar to that shown in window 520 in FIG. 19 to be displayed in the box 607. Although the button 610 is provided on the task bar of FIGS. 20 and 21, it need not be, and such a button or other functionality could be provided, for example, through a menu structure, or through an icon elsewhere on the screen.

Figure 22:
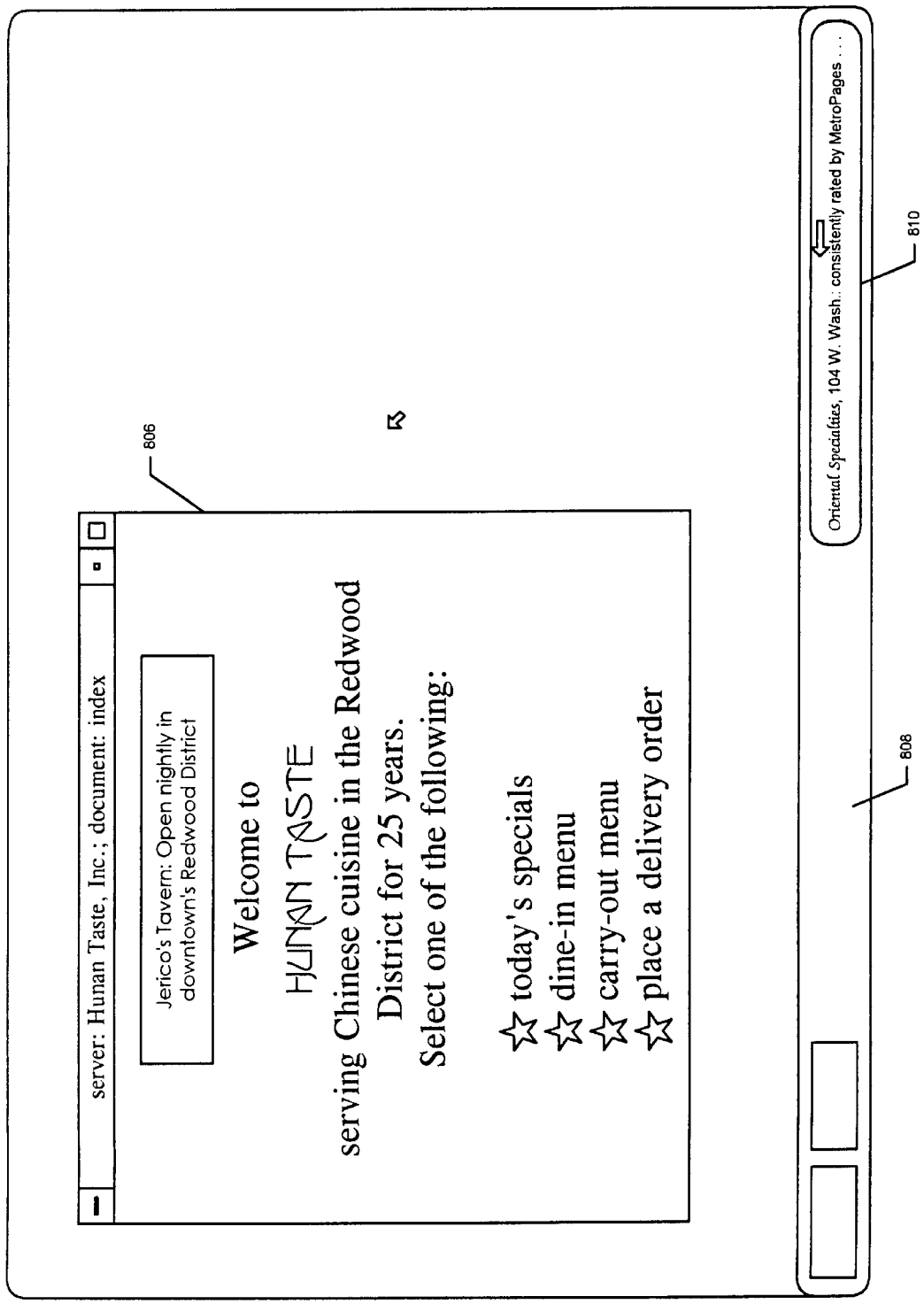
FIG. 22 illustrates a display screen on which supplemental information is scrolled in a window.

In another embodiment of the present invention, shown in FIG. 22, supplemental information relevant to the information displayed in a browser window 806 is displayed in a scrolling window 810 shown on the taskbar 808. The supplemental information may be scrolled in window 810 where the window 810 is quite small.

Figure 23:
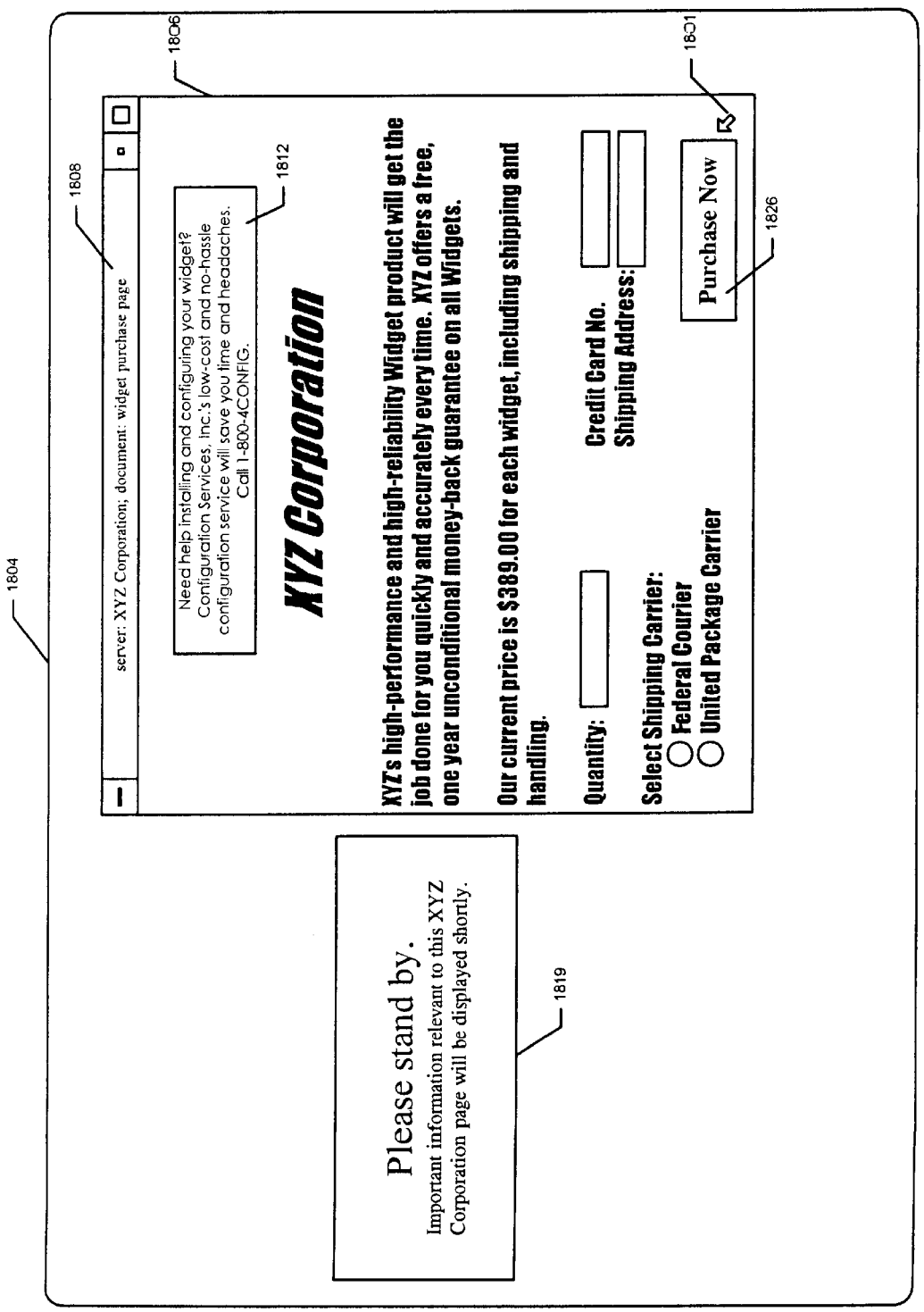
FIG. 23 illustrates a display screen informing the user that supplemental information or supplemental content relating to other content on the display screen exists.

FIG. 23 shows a window 1806 on a display screen 1804. As indicated in the title bar 1808 for window 1806, the document "widget purchase page" from the XYZ Corporation server is displayed in window 1806. This page may be used to purchase a specified quantity of "widgets," which are products manufactured and sold by XYZ Corporation. A person browsing this page can purchase a quantity of XYZ Corporation Widgets by entering a credit card number (or other financial account number) and specifying the manner in which the Widget(s) should be shipped. (This information could also be provided automatically.) Once the requisite information is completed by the user, the user selects button 1820 to place the order and to process the transaction. Window 1819 is shown in FIG. 23 to illustrate how the display screen 1804 may appear when supplemental information is available for a particular page but, because of limitations in network resources or bandwidth, has not yet been fully retrieved over the network and rendered on the display. The window 1819 in the embodiment of FIG. 23 informs the user that there is supplemental information for the XYZ page shown in FIG. 23, and acts as a "place holder" while the supplemental information is being retrieved over the network or rendered on the display.

Figure 24:
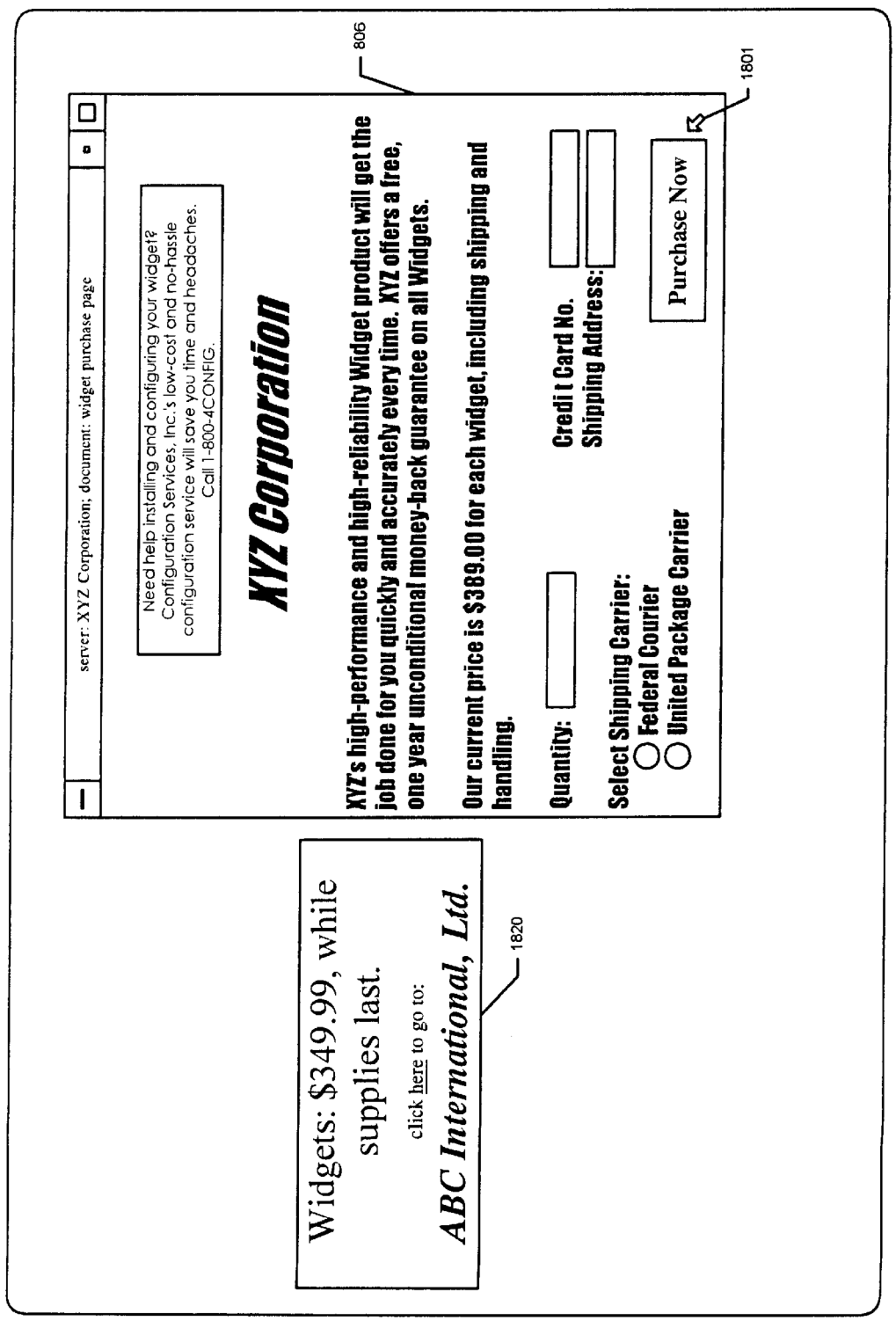
FIG. 24 illustrates the display screen of FIG. 23 when supplemental information is presented to the user.

Once the supplemental information is retrieved over the network, the display of FIG. 23 is updated to that shown in FIG. 24. Window 1820 now includes an advertisement from ABC International, Inc., in which that entity offers to sell widgets for a price that is lower than those sold by XYZ Corporation. Thus, as shown in FIG. 24, despite the fact that ABC International, Ltd. is a direct competitor to XYZ Corporation, ABC is effectively able to advertise in a manner closely associated with XYZ Corporation's pages, and even at XYZ's point of sale. This can be a very effective scenario for advertisement, precisely because the advertisement is so pertinent and of interest to the user viewing this particular XYZ Corporation page.

If the user selects the advertisement in window 1820, the display is, in one embodiment, updated to that shown in FIG. 25. FIG. 25 is a point of sale page for ABC International, where the user can specify the quantity of widgets that he or she wishes to purchase, and can purchase them at this page. Thus, the user may be able to move very efficiently from the point of sale at the XYZ Corporation page to the point of sale page at a competing manufacturer, and compare prices and/or features and selection very efficiently, quickly, and easily. In another embodiment, a page for ABC International is displayed in a separate window or other display area, leaving the XYZ page at least partially visible on the display.

As illustrated in the look-up table of FIG. 16, some network resources may have more than one supplemental information document or resource that is relevant to it. For example, as shown in FIG. 16, the widget purchase page on XYZ Corporation's server has three different entries in the look-up table in FIG. 16. One way in which this situation is handled is to simply choose a single entry for a given document or resource and provide only that supplemental information document. Selection of the entry to be used can be done randomly, or through a weighted (or evenly-weighted) average for each of the available entries. Another method is to display a large number or all of the entries.

Figure 26A:
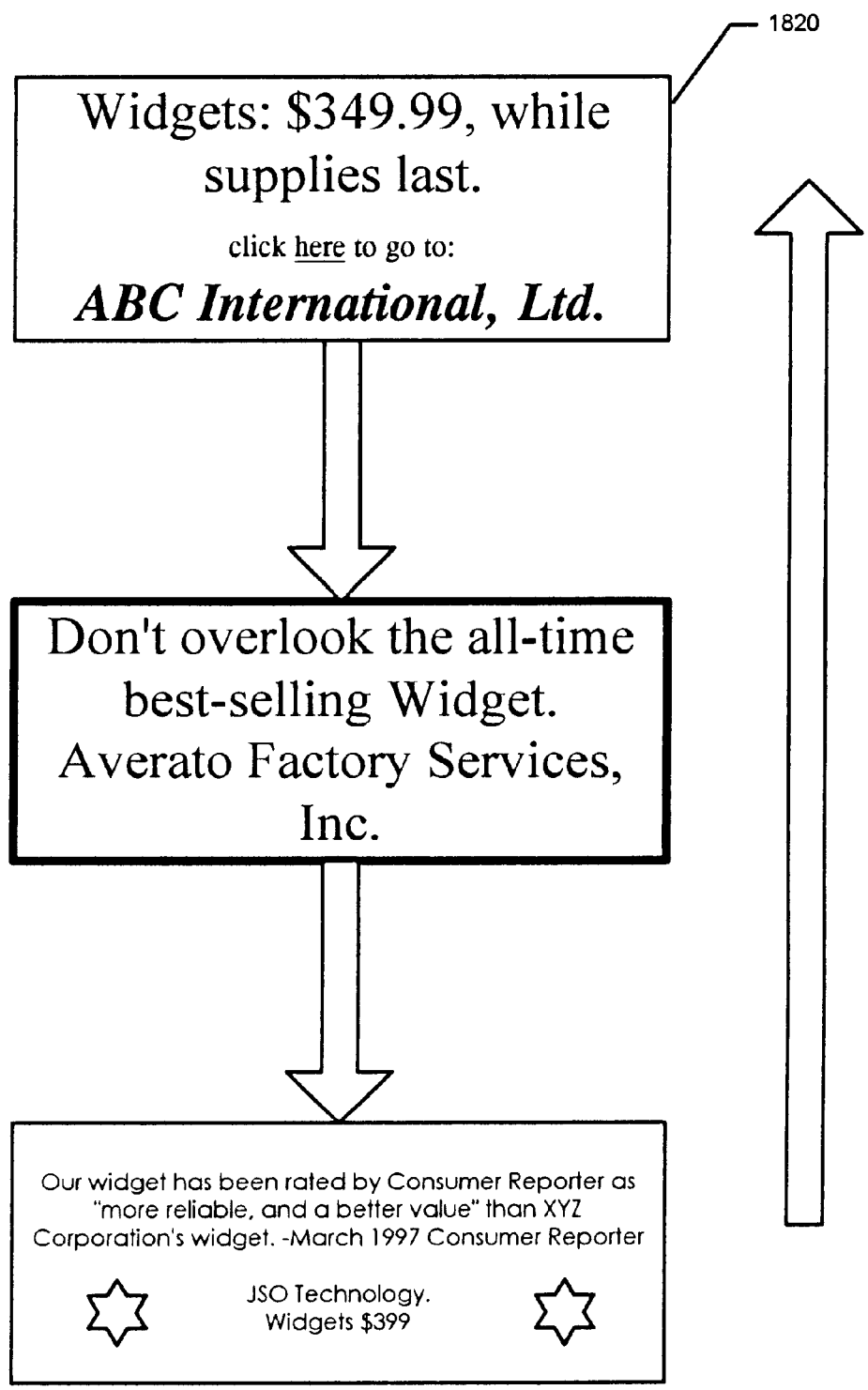
FIG. 26a illustrates rotation of supplemental information in a window in FIG. 24.

In another method of handling such a situation, illustrated in FIG. 26a, the three supplemental information documents are rotated in the window 1820 in FIG. 24. Each advertisement may be paused for a preprogrammed period of time, which may differ for each advertisement. FIG. 26a shows the order in which each of the three advertisements are displayed in the window. This method allows multiple third parties to provide supplemental information that is relevant to single page. The amount of time that the advertisement or other message is displayed could depend on the rate paid by the advertiser. It could also depend on the number of advertisers or information providers that wish to provide information in this manner. In the embodiment of FIG. 26a, when the time period for the third supplemental information document (i.e., JSO Technology) is completed, the order repeats.

When supplemental information is presented in the manner illustrated in FIG. 26a, where each is allocated a portion of time on the display, the user may have difficulty selecting supplemental information when the time allocated for one or more instances of supplemental information is short. For example, if each of the three instances of supplemental information illustrated in FIG. 26a is displayed on the screen for only three seconds, the user may have to act quickly in order to move the pointing device to the window 1820 (or perform some other method of selecting the information in the window 1820) in FIG. 24 when the desired supplemental information is displayed or otherwise presented to the user. If the user waits too long, the next instance of supplemental information will be rotated into the window and the prior instance will be lost (at least temporarily). This problem can be addressed by suspending the timer (or some other similar mechanism) that keeps track of the supplemental information during the time that the user is moving the cursor. For example, while the user is substantially continuously moving the cursor 1801 (or otherwise activating the input device) on the screen in FIG. 24, the supplemental information displayed in window 1820 will suspend or delay the process of rotating the next instance of supplemental information into the window 1820. Thus, if the user starts moving the cursor 1801 on the display just prior to the time for the instance of supplemental information displayed in the window 1820 to be changed, the supplemental information may remain until the user stops moving the cursor. This provides a more forgiving environment for selecting transient display elements such as the window 1820.

Figure 26B:
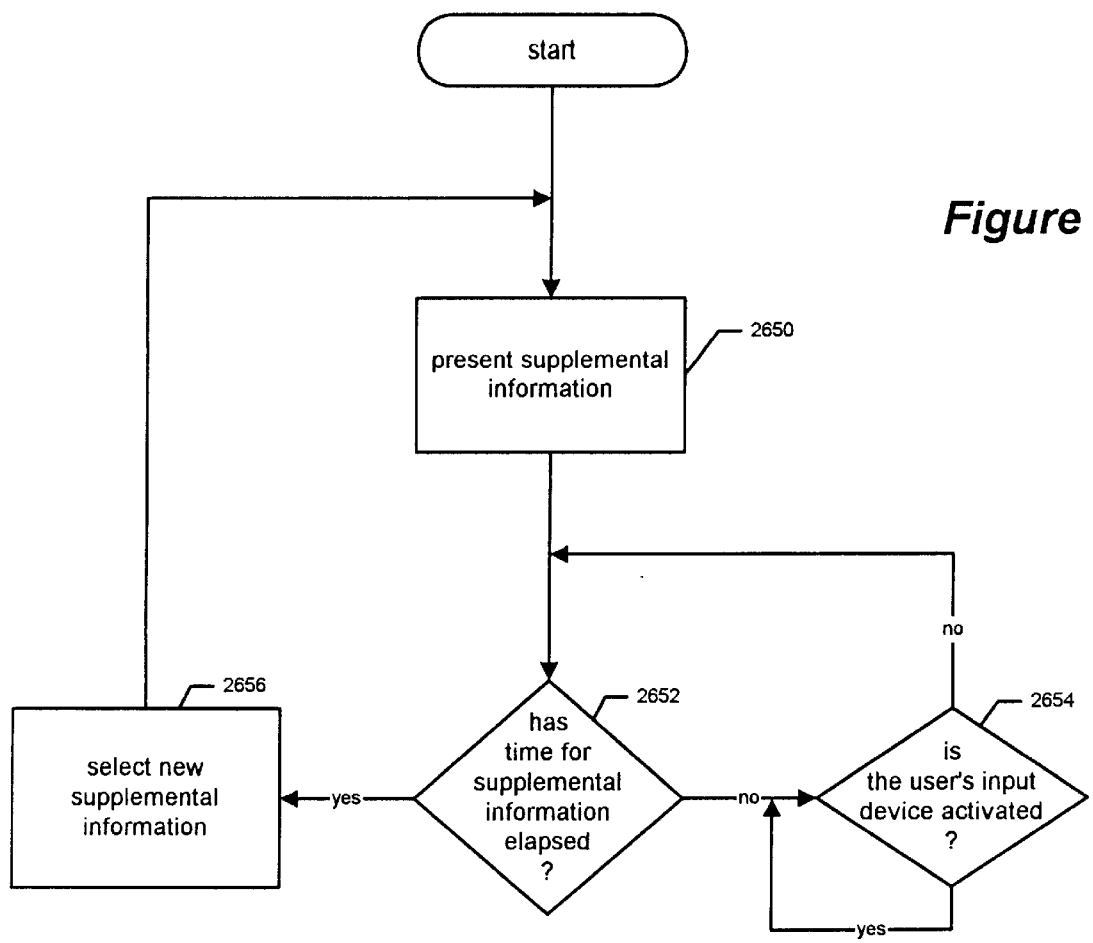
FIG. 26b is a flow chart of a process in which the displayed supplemental information remains substantially constant during the time that the input device is active.

FIG. 26b is a flow chart illustrating an implementation of such a procedure. At 2650, supplemental information is presented to the user (e.g., displaying information on the display screen, playing an audio clip). At 2652, a determination as to whether the supplemental information that is currently being presented to the user should be replaced with other supplemental information is made (e.g., determining if a predetermined amount of time has elapsed, or if some other condition is satisfied). If not, the process of FIG. 26b checks to see if the input device is activated at 2654. If the device is not activated, the condition at 2652 is again tested. This loop continues as long as the user's input device (e.g., pointing device, keyboard, voice recognition logic) is not activated, and the condition at 2652 is not satisfied. When the input device is activated, a loop at 2654 continues until that input device is no longer active. And when a determination is made that the supplemental information should be replaced, new supplemental information is selected (e.g., as described in connection with FIG. 26a) at 2656, and then presented to the user at 2650.

In FIG. 27, the window 2006 includes within it an area 2009 in which supplemental information is displayed. This area 2009 is integrated into and may be part of the window 2006. A button 2011 may be used to hide and unhide the area 2009. In the embodiment shown, selection of the button 2011 when the supplemental information area 2009 is displayed will remove from the window from the area 2009. Thereafter, the button 2011 will still be visible, and selection of that button will restore the area 2011. In other embodiments, the area 2009 may be positioned in many different areas and in many different ways. For example, the area 2009 could be configurable within the browser, and retrievable through a keyboard command or menu selection.

Figure 28:
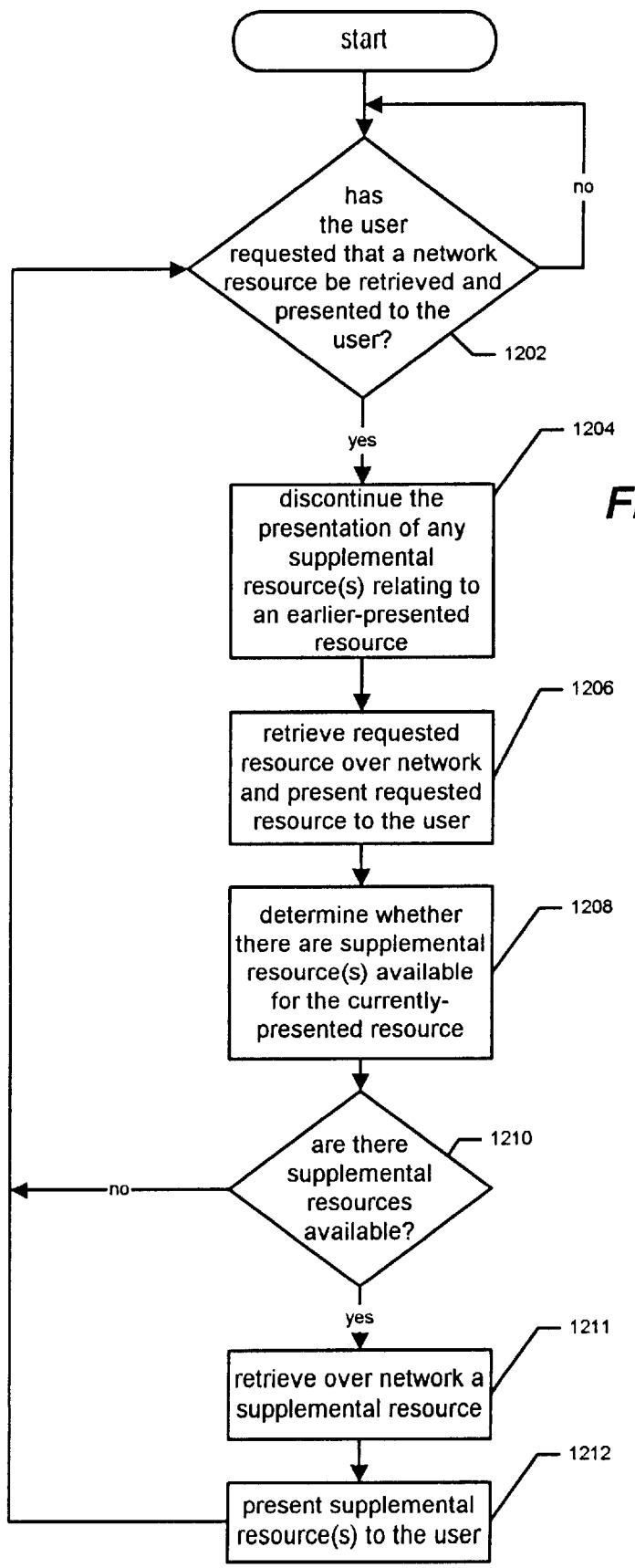
FIG. 28 is a flow chart illustrating a process for presenting a supplemental resource or supplemental content to a user.

A flow chart of a process for presenting a supplemental resource or supplemental content to a user is illustrated in FIG. 28. The system waits at 1202 until the user requests that a network resource be presented. At 1204, the presentation of any supplemental resource(s) relating to an earlier presented resource may be discontinued. (In another embodiment, the presentation of such a resource may be continued.) The requested resource is then retrieved and presented to the user at 1206. The presentation of this resource may involve an animation, the execution of a program, the playing of a video or audio clip, the display of a text-based document, or any combination of these or other techniques. At 1208, the system determines whether there are supplemental resource(s) available for the currently presented resource. As described previously, in one embodiment, this may involve a request sent to a reference server that is different from that from which the currently presented resource has been retrieved. Alternate procedures could also be followed. If supplemental resources are available at 1210, at least one of these resources is retrieved at 1211 and presented to the user at 1212. These resources may be a computer program, a video or audio clip (or both) or any other form or type of content or multimedia.

Figure 29:
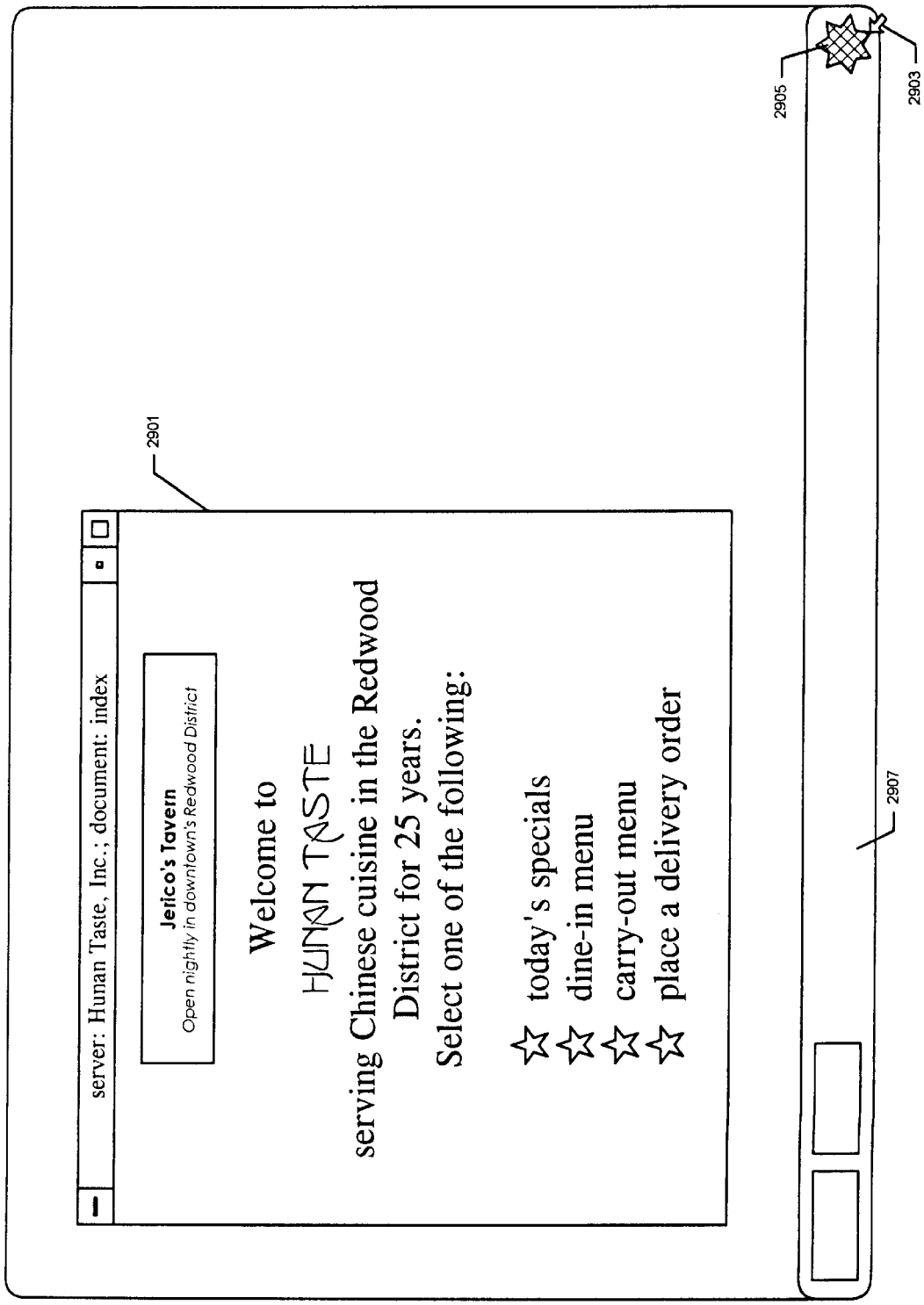
FIG. 29 illustrates the selection of a display element while content in a browser is presented to a user.
Figure 30:
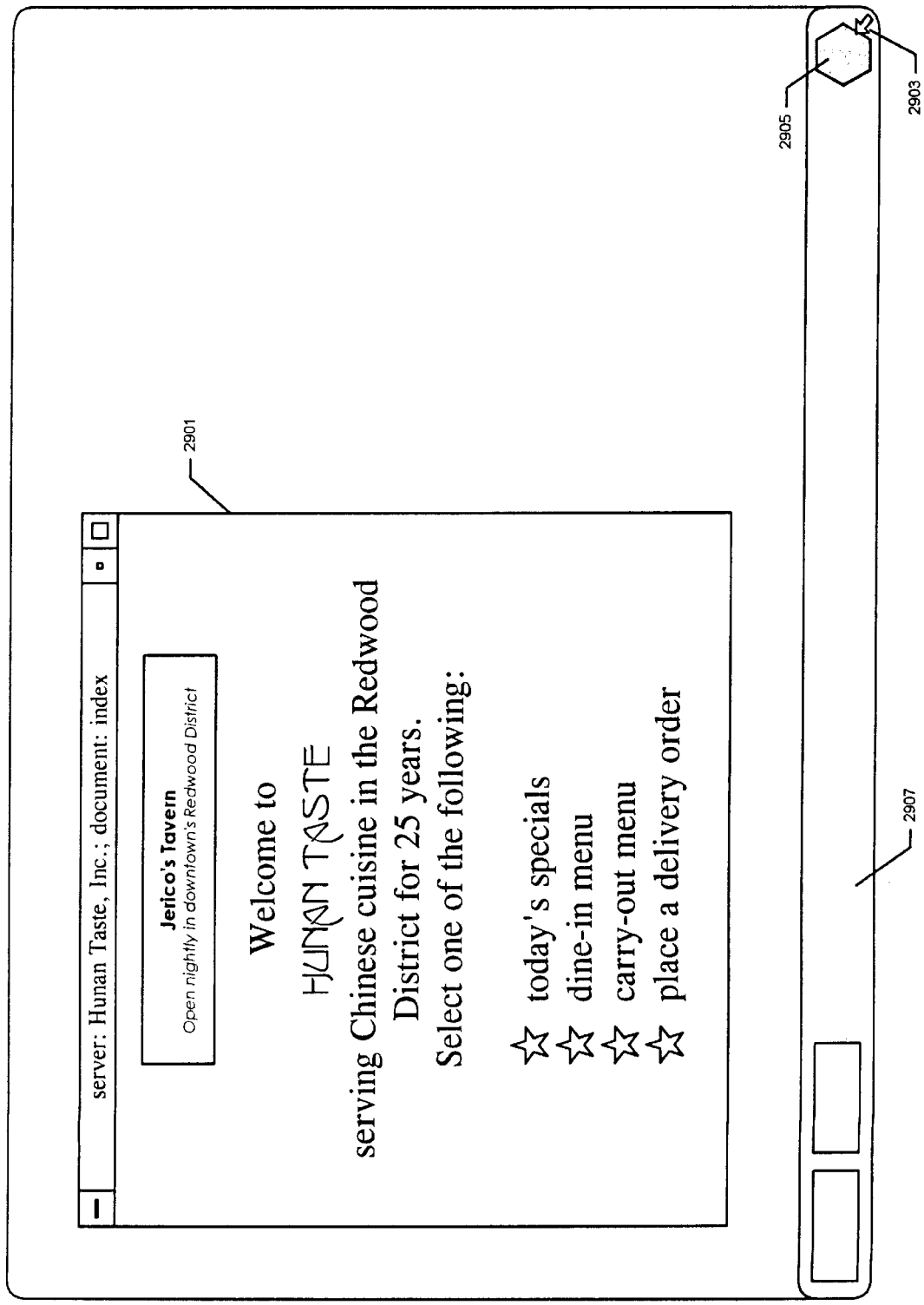
FIG. 30 illustrates the updated display screen after the selection of the display element in FIG. 29.

In FIG. 29, a browser window 2901 is shown on a screen, and a page from the "Hunan Taste, Inc." server is rendered in the browser window 2901. On the task bar 2907 is an icon, button, or display element 2905. In FIG. 30, the display element 2905 of FIG. 29 has been selected with the cursor 2903, and the appearance of the display element 2903 has changed. In the embodiment shown, the display element 2903 has changed shape and is shaded, but any other visual or other indication technique may be used. After a period of time, the display is further updated to that of FIG. 31, where a window or area 3201 is displayed on the task bar 2907. Within the area 3201, various display elements 3203, 3205, 3207, and 3209 are displayed.

Each of the display elements 3203, 3205, 3207, and 3209 represent a type of supplemental information relating to the content or information displayed in window 2901. In the embodiment shown, the presence of four display elements 3203, 3205, 3207, and 3209 means that four different types of supplemental information are available for the content rendered in the window 2901. For an embodiment like that of FIG. 31, if only one type of supplemental information were available for the content rendered in window 2901, only one display element would be displayed in the box 3201. In another embodiment, however, a display element may be present for each type of supplemental information, whether or not that type is available. In such an embodiment, display elements may be modified or highlighted when supplemental information of the corresponding type is actually available.

Figure 32:
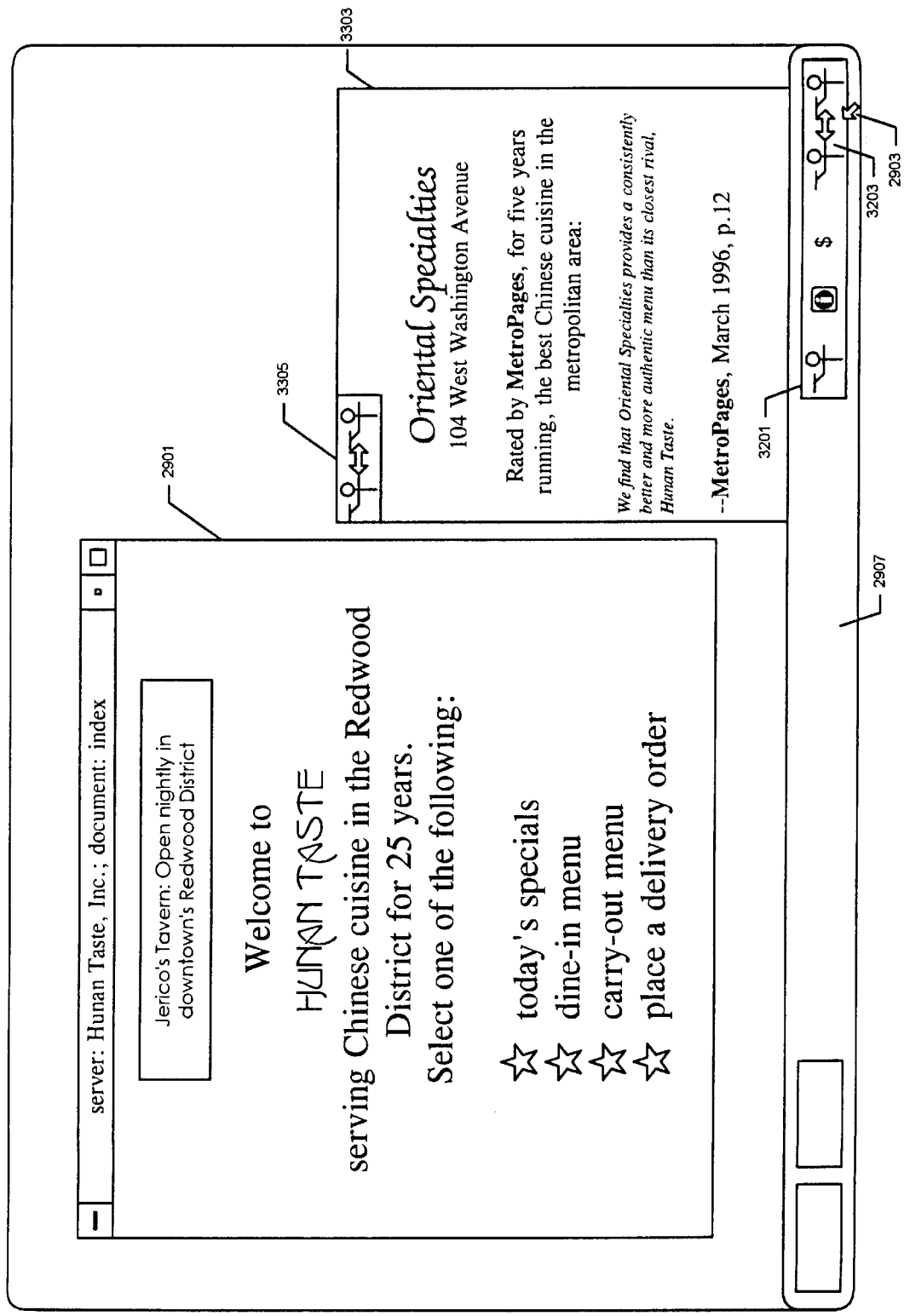
FIG. 32 illustrates the updated display screen upon selection of a task bar display element in FIG. 32.

In FIG. 32, the display has been updated following the selection of display element 3203 with the cursor 2903. The selection of the display element 3203 causes supplemental information of the type represented by display element 3203 to be displayed in the window 3303 in FIG. 32. The display element 3203 represents supplemental information relating to competing services, or services that compete in some way with a given service provider. Because the service provider that is the subject of the content rendered in the window 2901 in FIG. 32 is the Hunan Taste restaurant, competing services may be, for example, other restaurants. And as shown in FIG. 32, window 3303 displays supplemental information about a competing restaurant, Oriental Specialties. A display element 3305 is shown in the window 3303. This display element 3305 indicates which type(s) of supplemental information are being provided in the window 3303.

Figure 33:
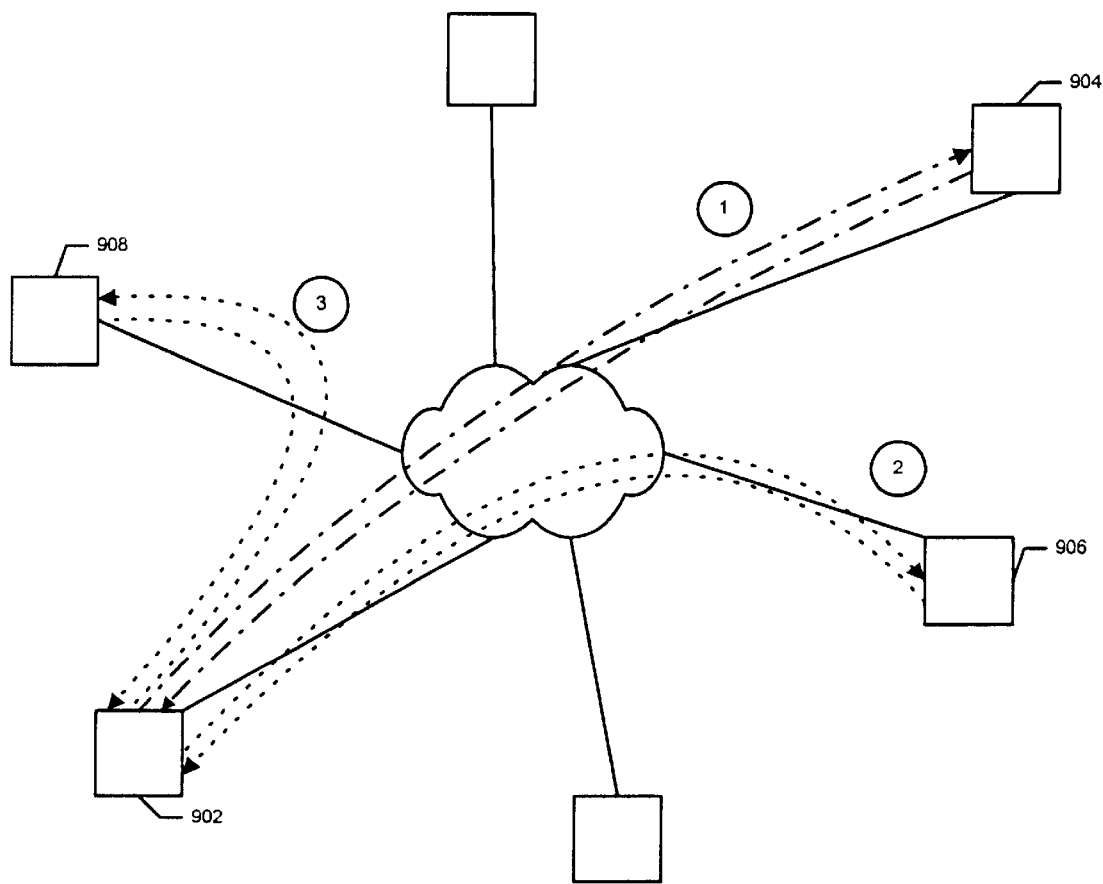
FIG. 33 is a network diagram illustrating network activity in connection with FIGS. 29, 30, 31, and 32.

FIG. 33 is a network diagram illustrating the network activity underlying FIGS. 29 to 32. At computer 902, the user operates the browser or document viewing program represented by the window 2901 in FIG. 29. The computer 902 sends a request for a document to the computer 904, which is the Hunan Taste, Inc. server. In response, requested document is sent by the computer 904 to the computer 902. See the arrows labeled "1" in FIG. 30. At this point, the display is as shown in FIG. 29.

When the display element 2905 is selected in FIG. 29, the display is updated to that shown in FIG. 30, and a request is sent by the computer 902 to computer 906 for information about the types of supplemental information available for the content rendered in window 2901. The display is updated to that shown in FIG. 30 to indicate to the user that information describing the types of supplemental information available for the content of window 2901 is being retrieved over the network. Because of network or other limitations, the retrieval of this information may take time. Computer 906 responds to the request made by computer 902 by sending information about the types of supplemental information (if any) available for the content rendered in window 2901. See the arrows labeled "2" in FIG. 33. When the supplemental information types are retrieved, they are communicated to the user, such as in the manner shown in FIG. 31. In some embodiments, the computer 906 may also send the location and identity of supplemental information for one or more information types, thereby making this information available for later use.

When the user selects the supplemental information type in FIG. 32, supplemental information of the selected type is retrieved over the network (e.g., from computer 908). See the arrows labeled "3" in FIG. 33. The location of this supplemental information may have been identified when the types of supplemental information were previously retrieved from the computer 906. (See arrow "2" of FIG. 30.) If not, however, the location of the supplemental information may be retrieved over the network from computer 906 (or from another computer on the network) before the supplemental information is actually retrieved from computer 908.

Figure 31:
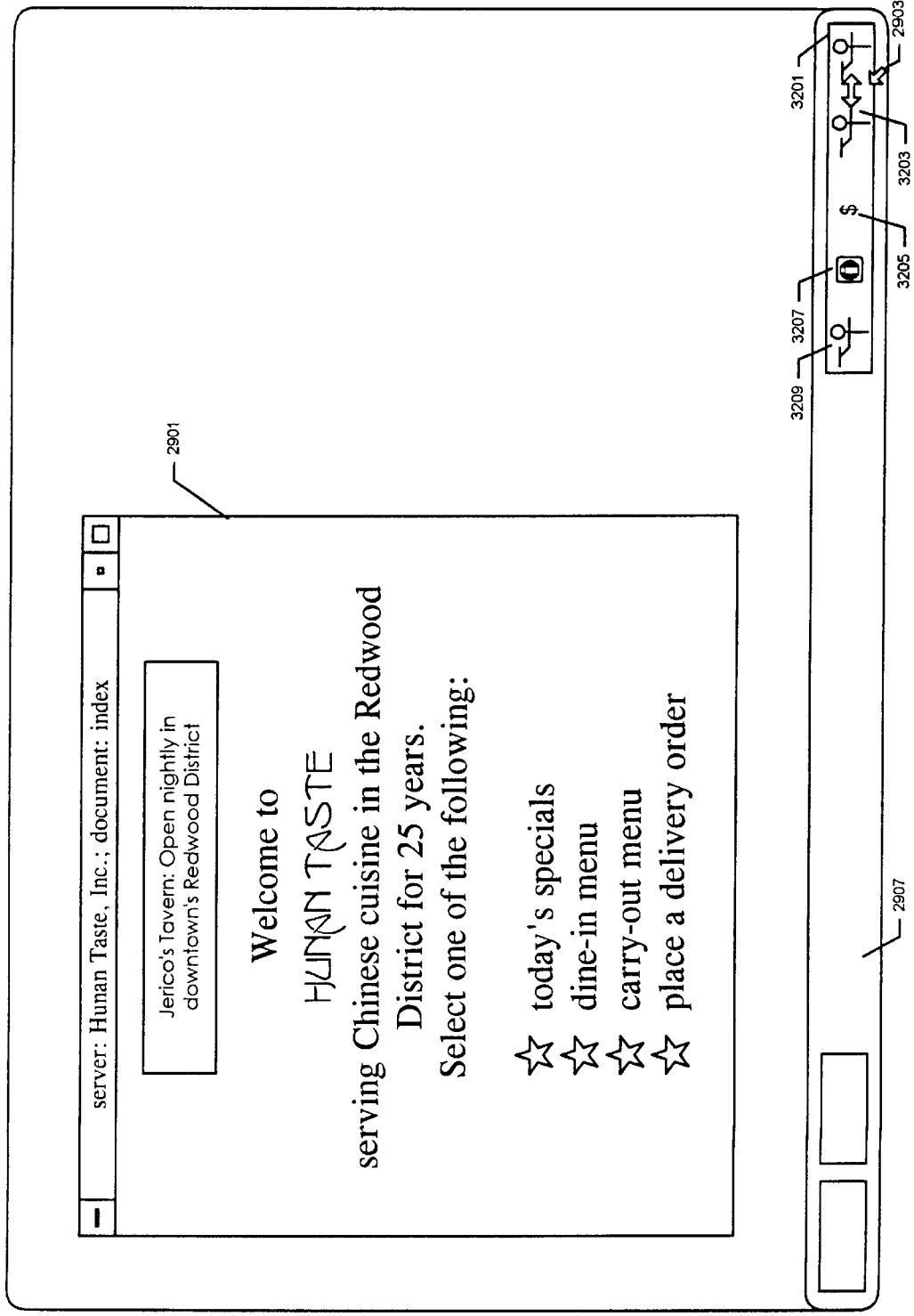
FIG. 31 illustrates the display screen of FIG. 30 showing display elements representing various types of supplemental information on a task bar.
Figure 34:
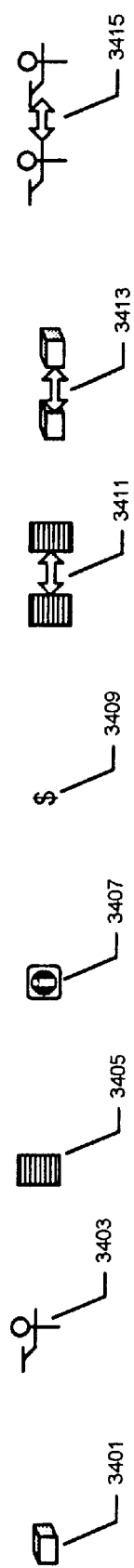
FIG. 34 illustrates a number of display elements that may be used to represent different types of supplemental information.

FIG. 34 shows numerous display elements, each of which may represent a different type of supplemental information in the window 3201 of FIGS. 31 and 32. Display element 3415 was the display element selected in FIG. 33, and it represents supplemental information for competing service providers. For a page or site relating to a restaurant, supplemental information from a competing service provider may be information about another restaurant. For a service provider such as, for example, a landscaping service, supplemental information from a competing service provider may be information or content from another landscaping service, or perhaps a lawn maintenance service. Since there are service providers for almost every type of service, a display element of this nature can be used in a wide variety of other contexts, and in many situations.

Display element 3413 represents supplemental information or content relating to a competing product supplier. Supplemental information of this type for a page involving bicycles, for example, may involve information about another bicycle manufacturer or another bicycle distributor. This display element may represent supplemental information relating to any type of product. A display element of this nature can be used in a wide variety of other contexts, and in many situations.

Display element 3411 represents supplemental information or content from a competing information supplier. This display element may be pertinent to a page from a news or business information provider. Selection of display element 3411 may cause information or content to be presented to the user that is published by a competitor of the publisher of the information already being presented to the user. For example, for a page from a sports information site that publishes the latest sports scores and highlights, supplemental information of this type may be information about a competing sports information site. A display element of this nature can be used in a wide variety of other contexts, and in many situations.

As described, the display elements 3415, 3413, and 3411 described above present information from or about a competitor to the subject of the information or content that is otherwise being presented to the user. The display element 3415 represents competing service providers, and may be useful at least when the user is viewing or is being presented with content relating to a particular service provider. The display element 3413 represents competing product information, and may be useful at least when the user is viewing or is being presented with a page describing a particular product. And the display element 3411 represents competing information, and is useful at least when the user is being presented with content or information of a particular type (e.g., news or business information).

Display element 3409 represents supplemental information relating to price, and may be used to indicate that price information is available for the content or page being viewed by the user. For a page offering a particular product for sale, supplemental information of this type may describe a competitor that offers the same or a similar product at a reduced price. Alternatively, for the same page, supplemental information of this type may be information from an entity that provides cost analysis or cost commentary for the offered product or for the company offering the product. Another example of the use of this type of supplemental information is shown in FIG. 24. A display element of this nature can be used in a wide variety of other contexts, and in many situations.

Display element 3407 represents a type of supplemental information that relates to the actual information or content being presented to the user. For example, for a movie or video, display element 3407 may represent a review of that movie or video. For a news page, display element 3407 may represent a review or critique of the publisher of the news page, or of the particular news page itself. This type of supplemental information may differ from that of, for example, display element 3411 where it provides information about the content itself, rather than similar, competing content. A display element of this nature can be used in a wide variety of other contexts, and in many situations.

Display element 3405 represents supplemental information of a type that is information about a given product, service or instance of information. For a given product or service, supplemental information of the type represented by display element 3405 may be a review or critique of that product or service. See, e.g., FIG. 4. In another example, for a product that requires assembly, supplemental information of this type could include instructions on how to assemble the product. A display element of this nature can be used in a wide variety of other contexts, and in many situations.

Display element 3403 represents supplemental information about a service. For example, for a page describing or offering for sale a vacuum cleaner, the display element 3403 may represent information about a home or office cleaning service. Or for a page describing how to select winners in the stock market, display element 3403 may represent information from a discount brokerage house or a electronic stock trading service. A display element of this nature can be used in a wide variety of other contexts, and in many situations.

Display element 3401 represents supplemental information about a product. For example, for a page or video that describes how to construct landscape retaining walls, display element 3401 may represent information from the manufacturer or distributor of a tool that easily splits the retaining wall blocks, as may be required when constructing such a retaining wall. A display element of this nature can be used in a wide variety of other contexts, and in many situations.

The foregoing display elements are described merely to illustrate the various types of supplemental information that may be made available, and these categories are not meant to be exhaustive. And they may not be rigidly defined in every embodiment. Further, different schemes for categorizing supplemental information can be used, and it should be understood that any such alternate schemes for categorizing supplemental information may be applicable to the present invention.

Figure 35:
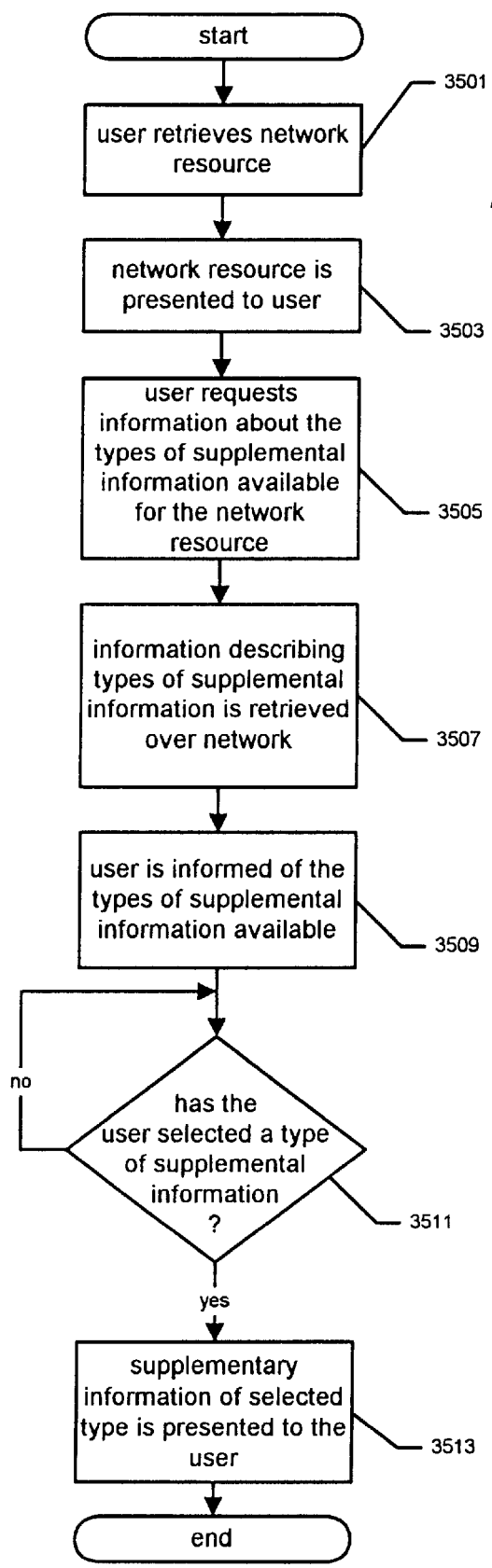
FIG. 35 is a flow chart of a process similar to that illustrated in FIGS. 29 to 33.

FIG. 35 is a flow chart of a process similar to that illustrated in FIGS. 29 to 32. At 3501, the user retrieves a network resource over the network. The network resource is then presented to the user at 3503. This may involve the content being displayed for the user, or it may involve an audio presentation or any other type of multimedia presentation. The user then requests at 3505 information about the types of supplemental information. This request can be made by selecting a button with a pointing device (e.g., display element 2905 in FIG. 31), or this request could be made through any other input device (e.g., voice recognition). The request at 3505 causes information about the types of supplemental information available to be retrieved over the network at 3507, and communicated to the user at 3509. In one embodiment, the types of supplemental information available are communicated to the user through display elements as are shown in FIGS. 31 and 32.

Still referring to FIG. 35, the system loops until the user selects a type of supplemental information at 3511. When such a selection is made, supplemental information of the selected type is presented to the user at 3513. This supplemental information may be retrieved over the network, or, if it was already retrieved over the network, it may be retrieved from local storage.

Figure 36:
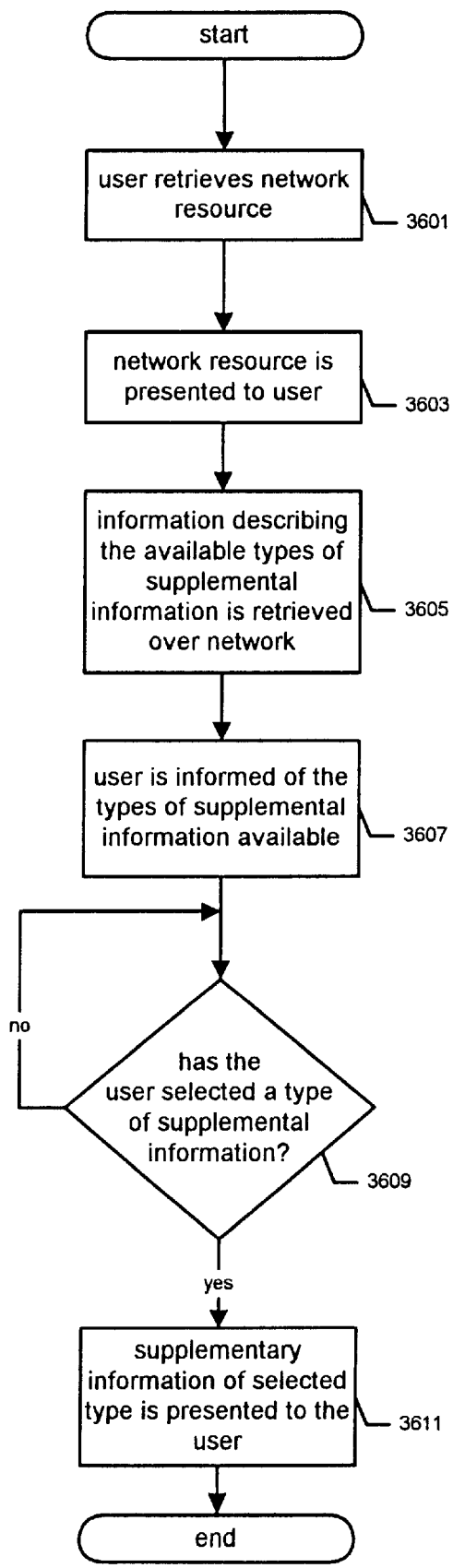
FIG. 36 is a flow chart illustrating an alternate process.

FIG. 36 is a flow chart illustrating an alternate process. At 3601, the user retrieves a network resource over the network. The network resource is then presented to the user at 3603. At 3605, information describing the available types of supplemental information is retrieved over the network, without waiting for the user to request this information. The user is informed of the types of supplemental information available at 3607, and supplemental information is presented to the user at 3611 when the user selects a type of supplemental information at 3609.

Figure 38A:
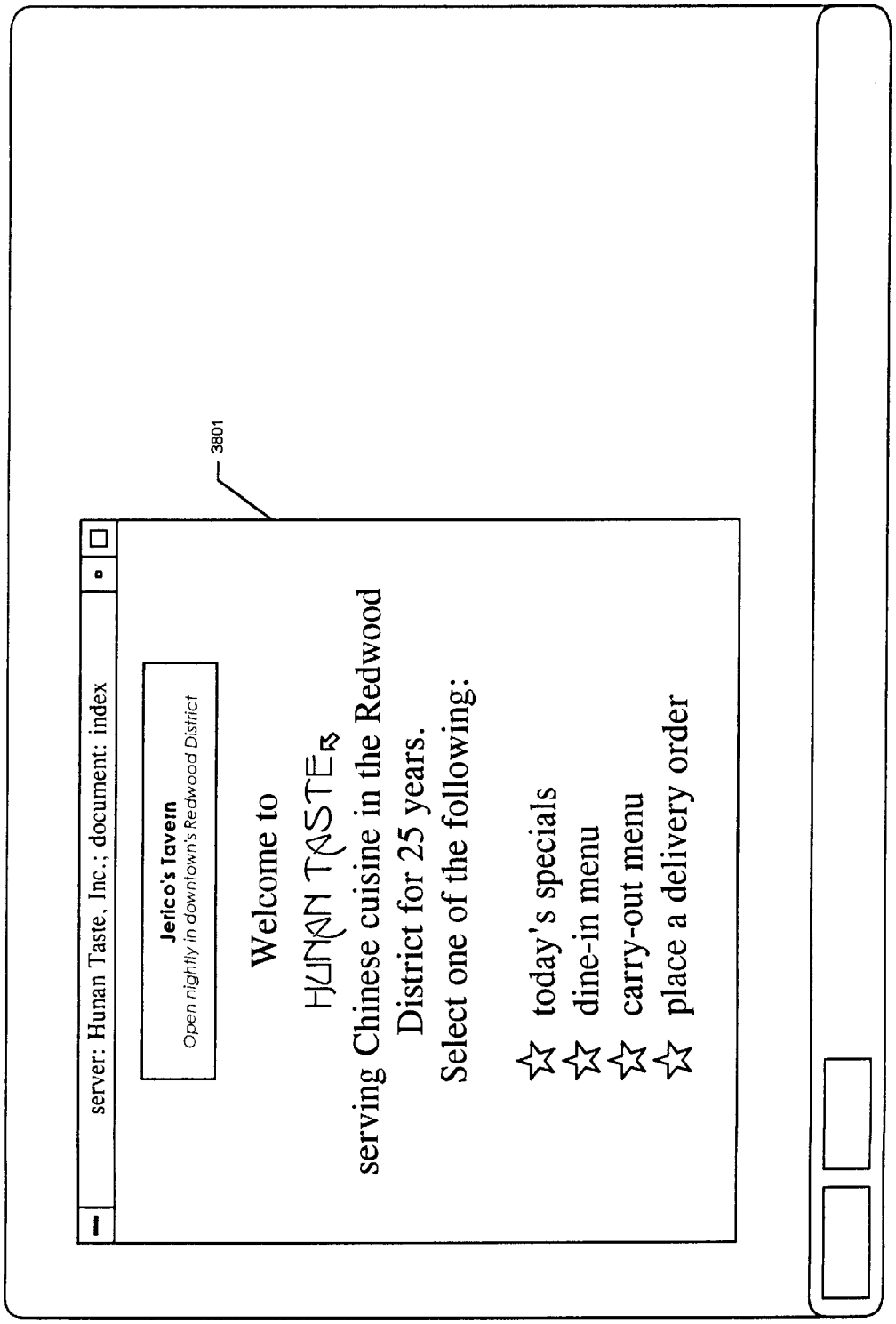
FIG. 38a illustrates information being displayed in a window.
Figure 38B:
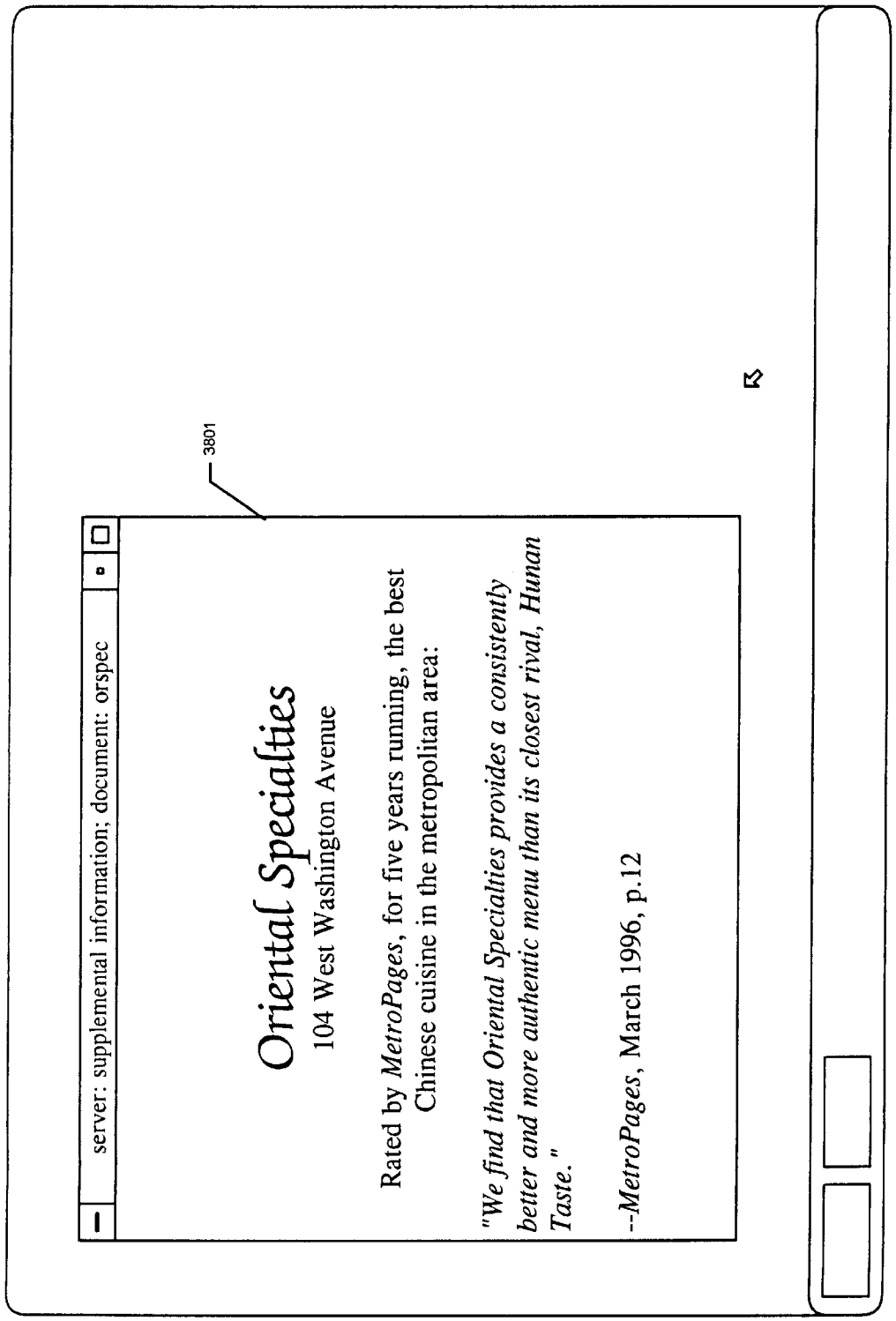

FIGS. 38a and 38b illustrate display screens in an embodiment in which rendered in the browser window is supplemental information that relates to an earlier page rendered in the browser window. In other words, in one embodiment, supplemental information relating to the previous page is provided when the user accesses another a site on the network that acts as a server for supplemental information. In FIG. 38a, the browser window 3801 shows a page from the Hunan Taste, Inc. server. Supplemental information is provided to the user about the Hunan Taste page shown in window 3801 when the user communicates to the browser program the identity and/or location of a server for supplemental information. (The identity and/or location of such a server could be communicated to the browser a number of different ways, such as by typing it into a text box within the browser program, selecting such a server from a pull-down menu, selecting an display element or link within the browser window that corresponds to the supplemental information server, or any other way known in the art.)

When the identity and/or location of such a server is provided to the browser, the browser communicates to that server the page or resource that is currently being presented to the user (i.e., the Hunan Taste page). The server for supplemental information evaluates this request, and then serves supplemental information. This supplemental information is then presented in the window 3801 as shown in FIG. 38b, replacing the content in window 3801 in FIG. 38a.

Figure 37:
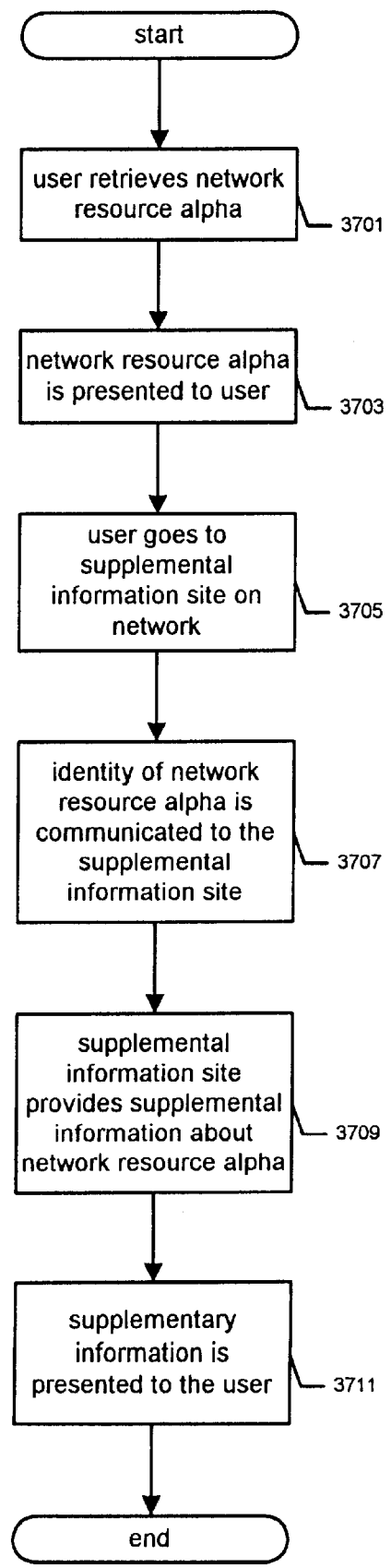
FIG. 37 is a flow chart of the process illustrated in FIGS. 38a and 38b.

FIG. 37 is a flow chart of a process similar to that described in connection with FIGS. 38a and 38b. At 3701, the user of a browser program (or a similar program) retrieves a network resource, which is termed network resource "alpha" in FIG. 37. This network resource alpha is retrieved from a server (or servers) on the network. The resource alpha is then presented to the user at 3703. Thereafter, the user goes to a supplemental information site on the network (3705), and the identity of the network resource that was previously presented to the user at 3703 (i.e., "network resource alpha") is communicated to the supplemental information site (3707). Based on this information, the supplemental information site provides supplemental information at 3709 about the previously-presented network resource (i.e., network resource alpha). This supplemental information is presented to the user at 3711.

Figure 39:
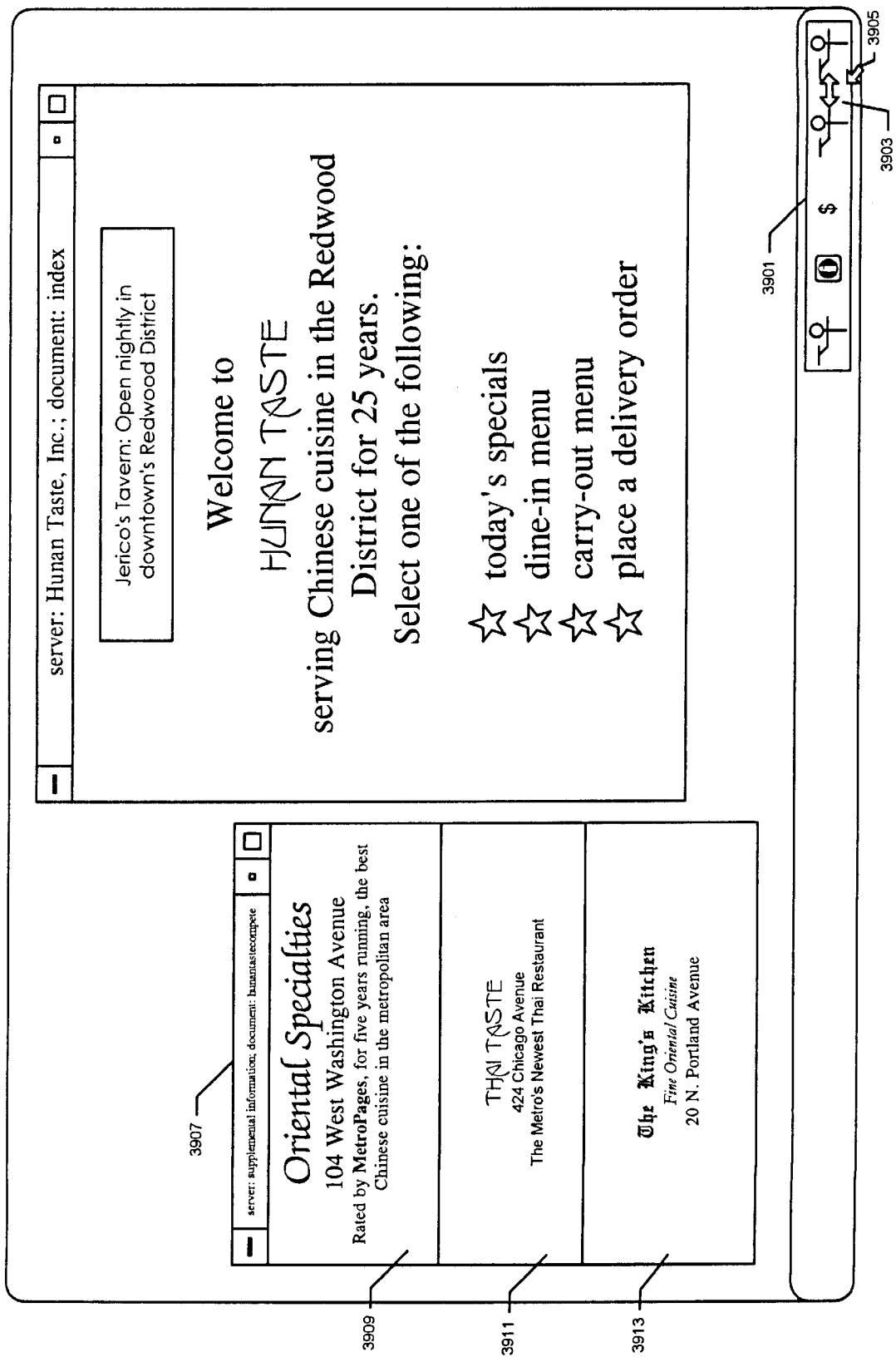
FIG. 39 illustrates an alternate method of displaying supplemental information.

FIG. 39 illustrates a simplified display screen in another embodiment of the present invention. In FIG. 39, the display element 3905 in window 3901 has been selected with the cursor 3905, causing window 3907 to be displayed. The window 3907 provides supplemental information of the "competing service" type. Competing service information from three different competitors is shown in window 3907 (Oriental Specialties, Thai Taste, and The King's Kitchen). Information from each of the three different competitors is displayed in its own frame or sub-window 3909, 3911, and 3913. An alternate implementation may have three or more windows, one for supplemental information from each of the competing restaurants (or other entities).

Figure 40:
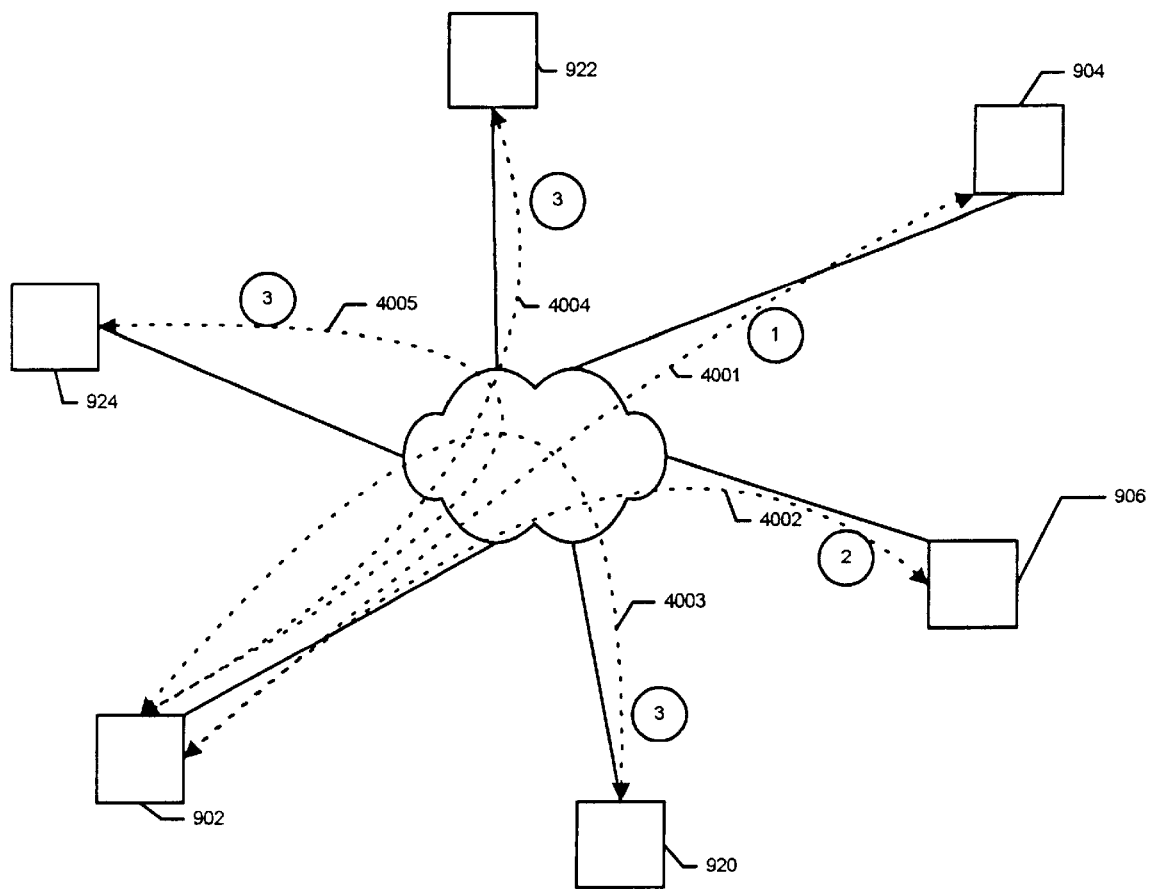
FIG. 40 is a network diagram in which supplemental information from more than one source is retrieved.

FIG. 40 is a diagram of a network where supplemental information from more than one source is presented to the user. Initially, the user at computer 902 requests and then retrieves a network resource from server 904. This request and response from the server 904 is indicated by line 4001. The identity of the resource retrieved from computer 904 is then communicated by computer 902 to server 906, which responds by identifying the location of supplemental information about the resource retrieved from server 904. This communication and response is represented in FIG. 40 by line 4002. In the embodiment shown, the identifying information received by computer 902 from server 906 points to servers 920, 922, and 924. Thus, supplemental information is retrieved by computer 902 from each of the servers 920, 922, and 924, as is indicated by the lines 4003, 4004, and 4005. In this embodiment, supplemental information is distributed throughout the network, and it is retrieved by the client computer from a number of different servers.

In an embodiment that differs from that shown in FIG. 40, supplemental information from or relating to more than one source could be stored on a single server. This would allow some, perhaps all, of the supplemental information to be retrieved from the same server.

Figure 41:
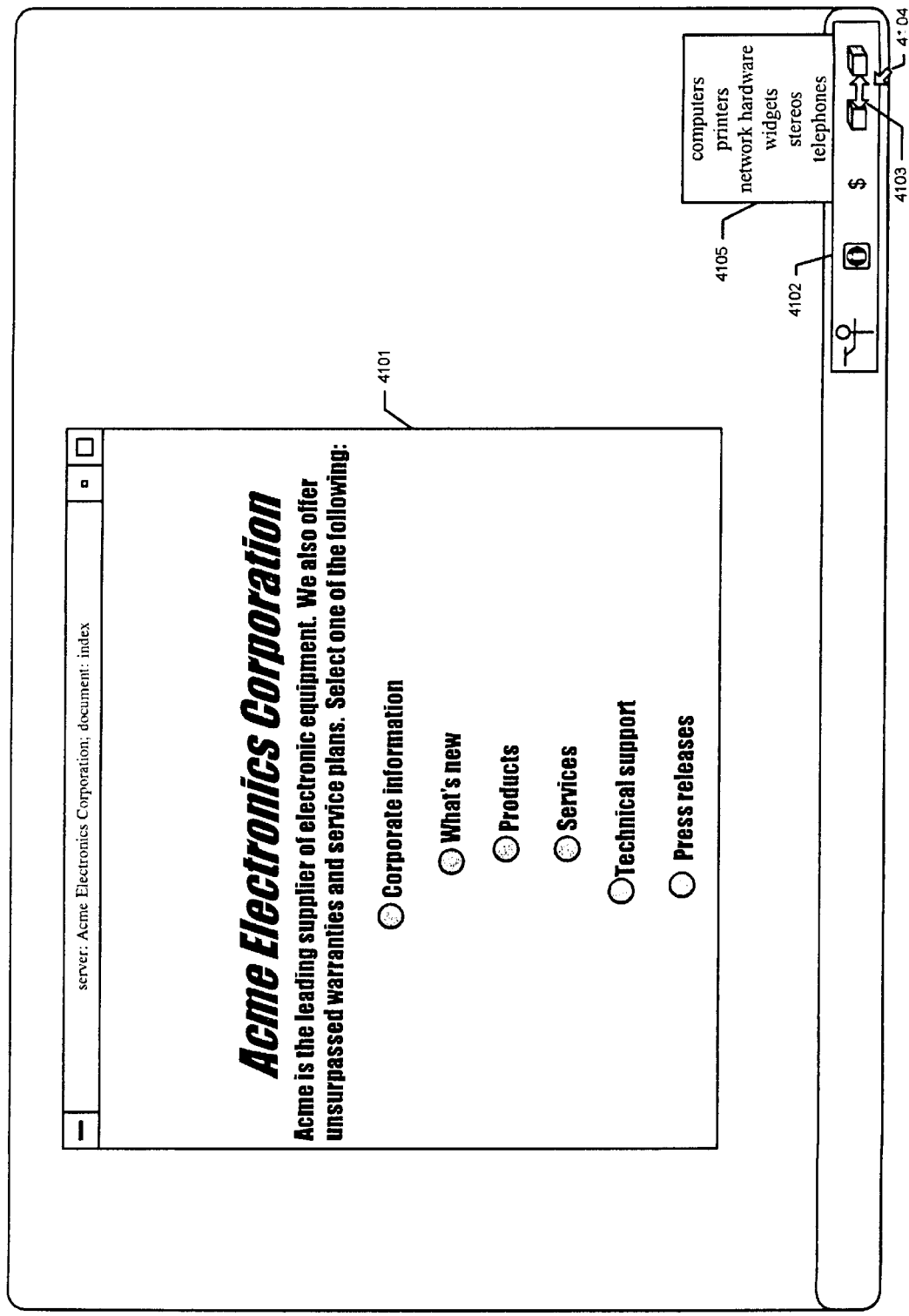
FIG. 41 illustrates a menu being displayed upon selection of a display element.

In FIG. 41, window 4101 displays information relating to the hypothetical Acme Electronics Corporation. Acme Electronics may manufacture or sell a large variety of products, and only a general page from Acme Electronics is displayed in window 4101. Window 4102 displays a number of display elements representing different types of supplemental information available for the Acme Electronics server. When cursor 4104 selects display element 4103, which represents supplemental information relating to competing products, another window 4105 appears. The window 4105 displays six different categories of products that the user can select. These categories represent products or categories of products that are manufactured and/or sold by Acme Electronics Corporation.

Figure 42:
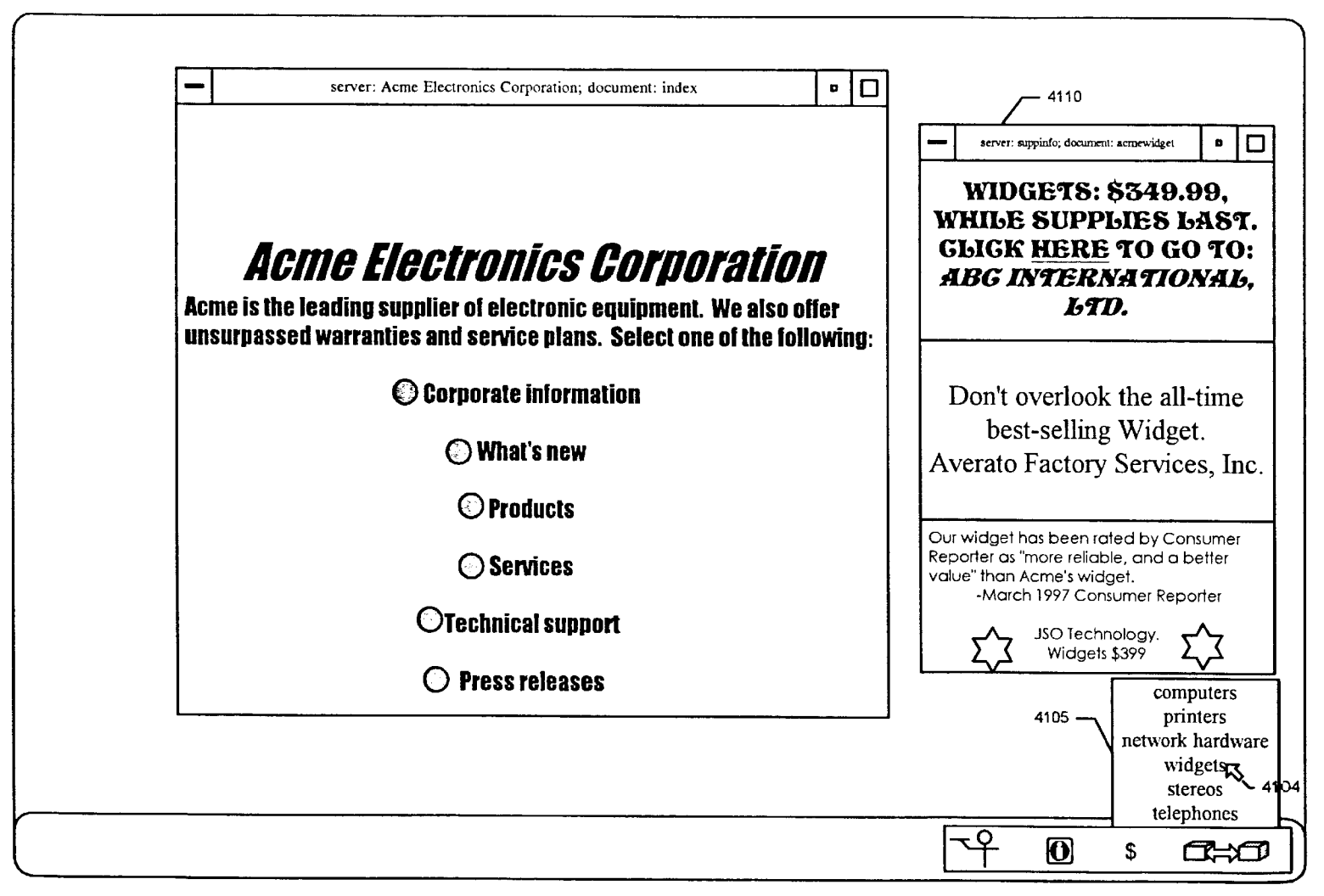

When the user selects one of the products (or categories of products) in FIG. 41, supplemental information that is from the selected category is presented to the user. In FIG. 42, the user has selected the "widgets" category in window 4105 by selecting the "widgets" text in the window 4105. This causes the window 4110 to be displayed, in which supplemental information for three widget manufacturers or distributors that compete with Acme Electronics Corporation is presented.

Because of the nature of some types of networks, it may be difficult to determine which document from a server is being retrieved by a client computer or presented to a user at a client computer. In other words, for embodiments such as those described in connection with FIGS. 11 to 14, even where it is possible to determine which computer or server is being accessed on the network (through the use of a domain name or IP address), it may be difficult to accurately determine which resource or resources on that computer are being accessed. For example, where documents are generated dynamically by the server, they may not have a consistent name or URL. Also, encryption techniques or the like can used to make determination of the nature of the document being presented to the user difficult. Similarly, documents could be continually modified, at least slightly, to make consistent identification and differentiation from other documents difficult. In addition, program 1520 or 1530 may not be capable of providing the identity of the document being retrieved or presented. Thus, particularly where the person or entity in control of a server wishes to make accurate identification of a resource on the server difficult, the identity of the specific resource or document that is being presented to the user may be difficult to determine. A menu such as that shown in FIGS. 41 and 42 may be useful in such a situation because it allows the user to select which type of information he or she is seeking at a particular site. Thus, one at least partial solution is to provide a menu so that the user can select the type of supplemental information that he or she wishes to see.

Figure 43:
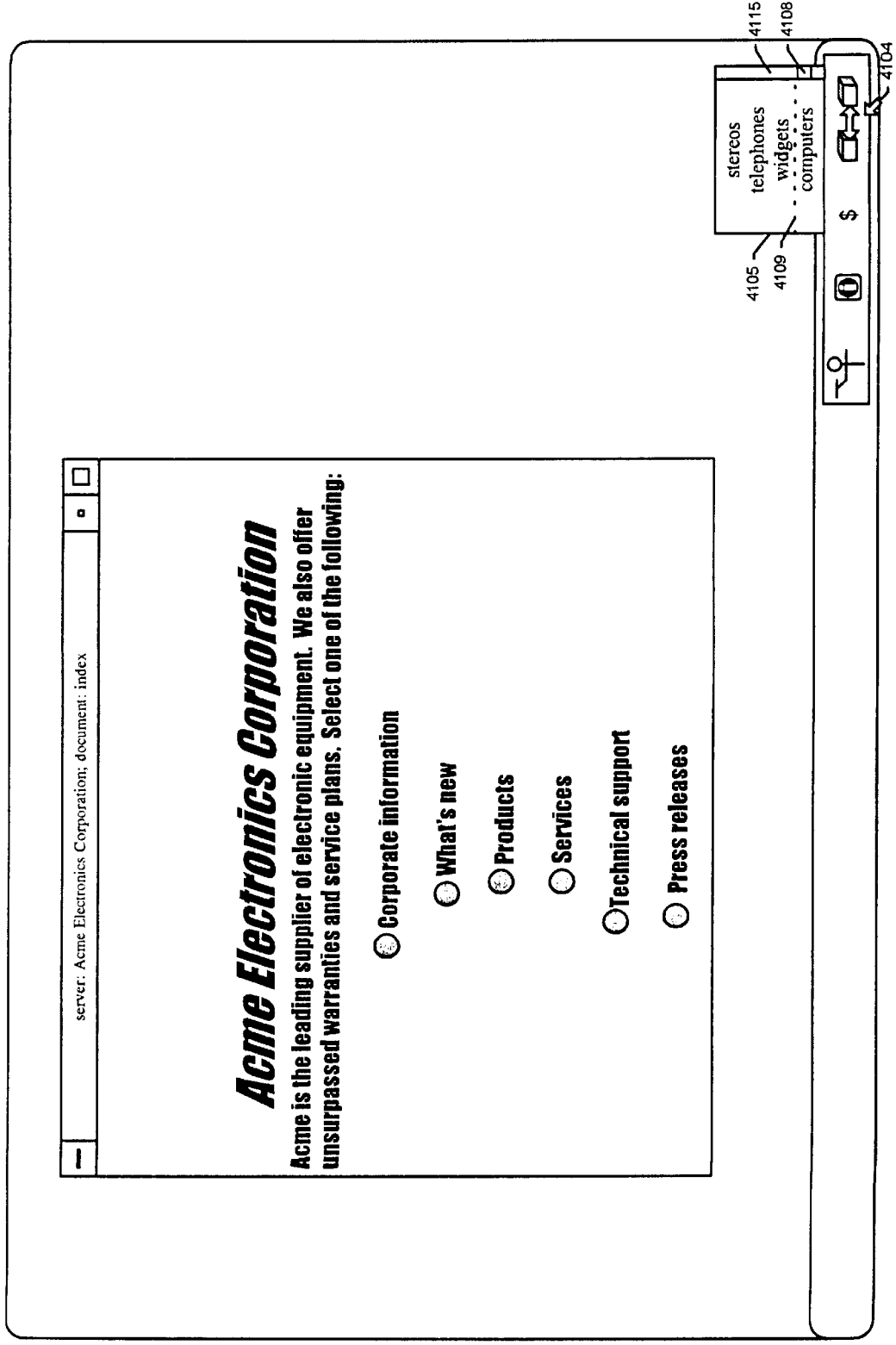
FIG. 43 illustrates an alternative menu being displayed upon selection of a display element.

FIG. 43 shows an embodiment similar to that of FIGS. 41 and 42, but where a limited number of categories of products are displayed in a scrolling window 4105. In the window 4105 in FIG. 43, the categories are scrolled through the window so that only a limited number categories are displayed at a time. The marker 4108 marks the position in the list of categories. When the end of the list is approached, this marker 4108 moves toward the bottom of the slot 4115. When the end of the list rolls over to the front of the list, the marker 4108 moves to where the top of the slot 4115. The visual indicator 4109 marks where the list begins repeating. This embodiment takes a small amount of screen real estate, yet allows the user to select from a large list of categories without searching for the desired category. In a manner similar to that described in connection with FIGS. 26*a* and 26*b*, the categories in the window 4105 may, in some embodiments, discontinue scrolling when the cursor is being continually moved on the display.

The menus of FIGS. 41 to 43 are shown in connection with various implementations of the present invention, but it should be understood that other types of menus, perhaps having additional levels, could be used where appropriate. Further, the menus shown in FIGS. 41 to 43 are merely illustrative, and it should be understood that many other menu structures or user interfaces known in the art or hereinafter developed may be applicable to the present invention.

Figure 44:
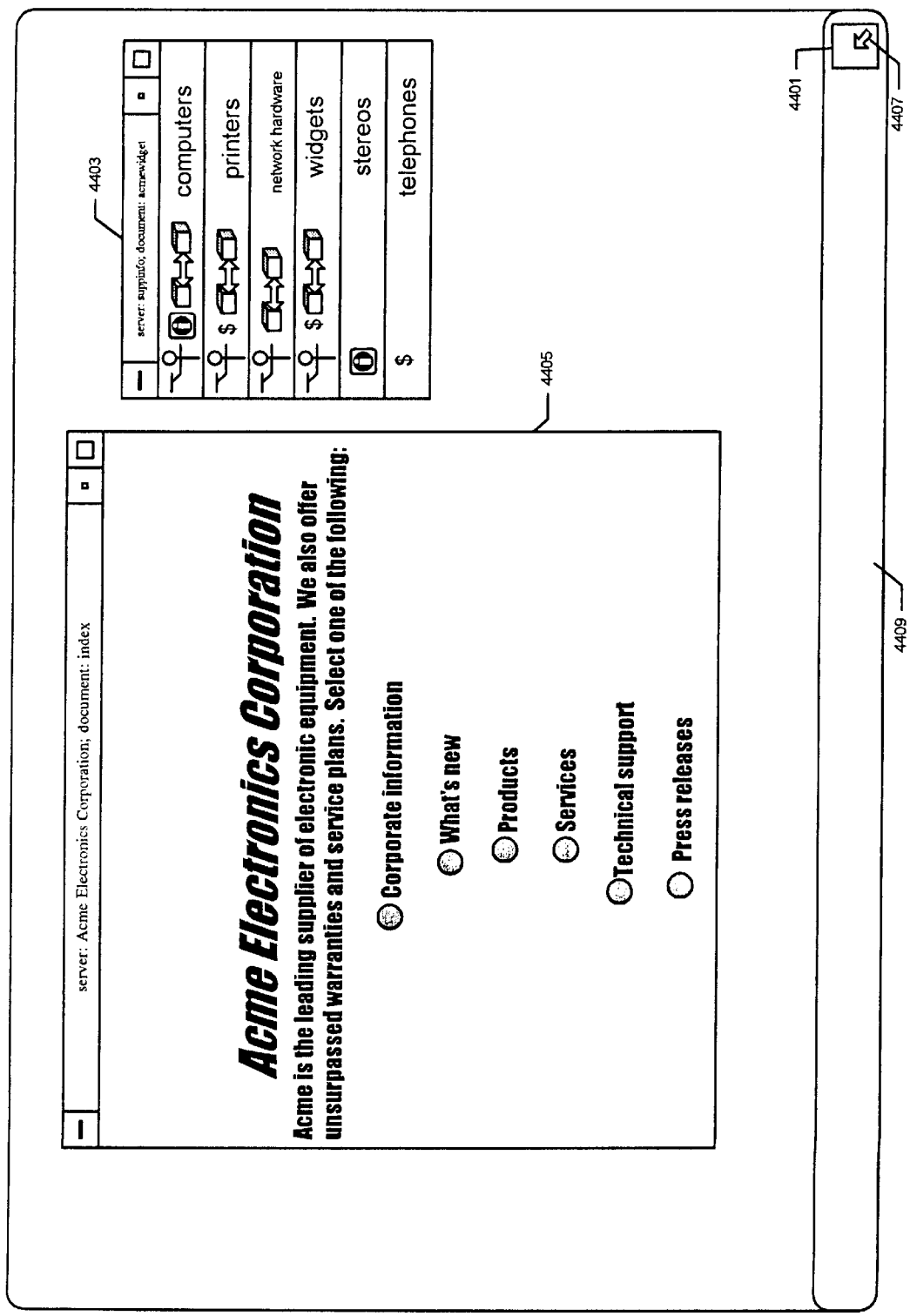
FIGS. 44 to 46 illustrate another procedure for selection of the desired type of supplemental information.

In FIG. 44, the window 4405 displays information relating to the Acme Electronics Corporation in a manner similar to that shown in FIG. 41. A display element or button 4401 is shown on the task bar 4409. The user selects button 4401 when he or she wishes to see categories of supplemental information. In FIG. 44, the user has selected display element 4401, thereby causing window 4403 to be displayed as shown in FIG. 44. This window 4403 communicates categories of products and services available from Acme Electronics Corporation. The window 4403 also indicates the types of supplemental information available for each of the categories. For example, for the "printers" category, supplemental information about services relating to printers manufactured or sold by Acme Electronics is available. Price information about the printers manufactured or sold by Acme is also available. In addition, information about printers manufactured or sold by competitors to Acme is available.

Figure 45:
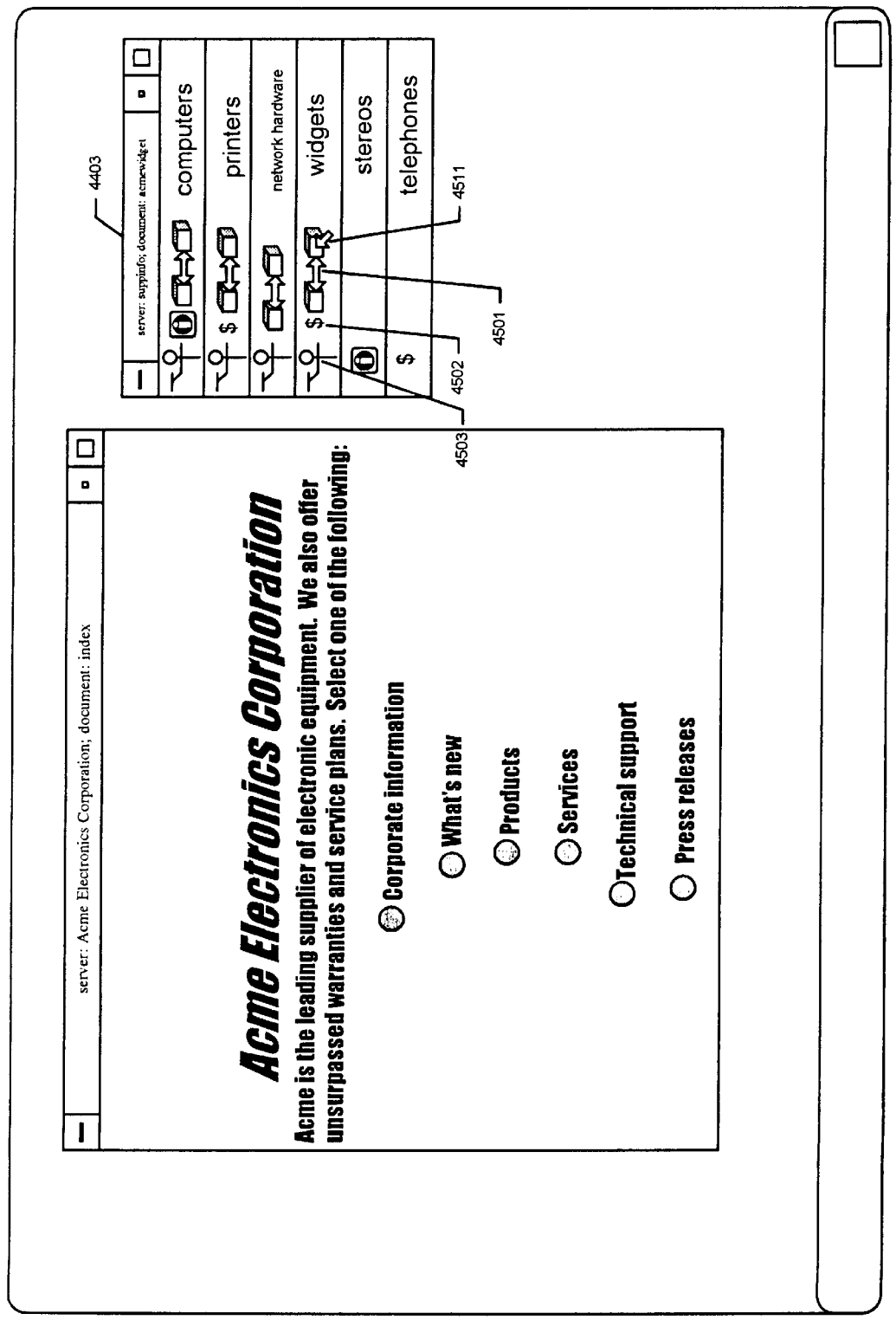
Figure 46:
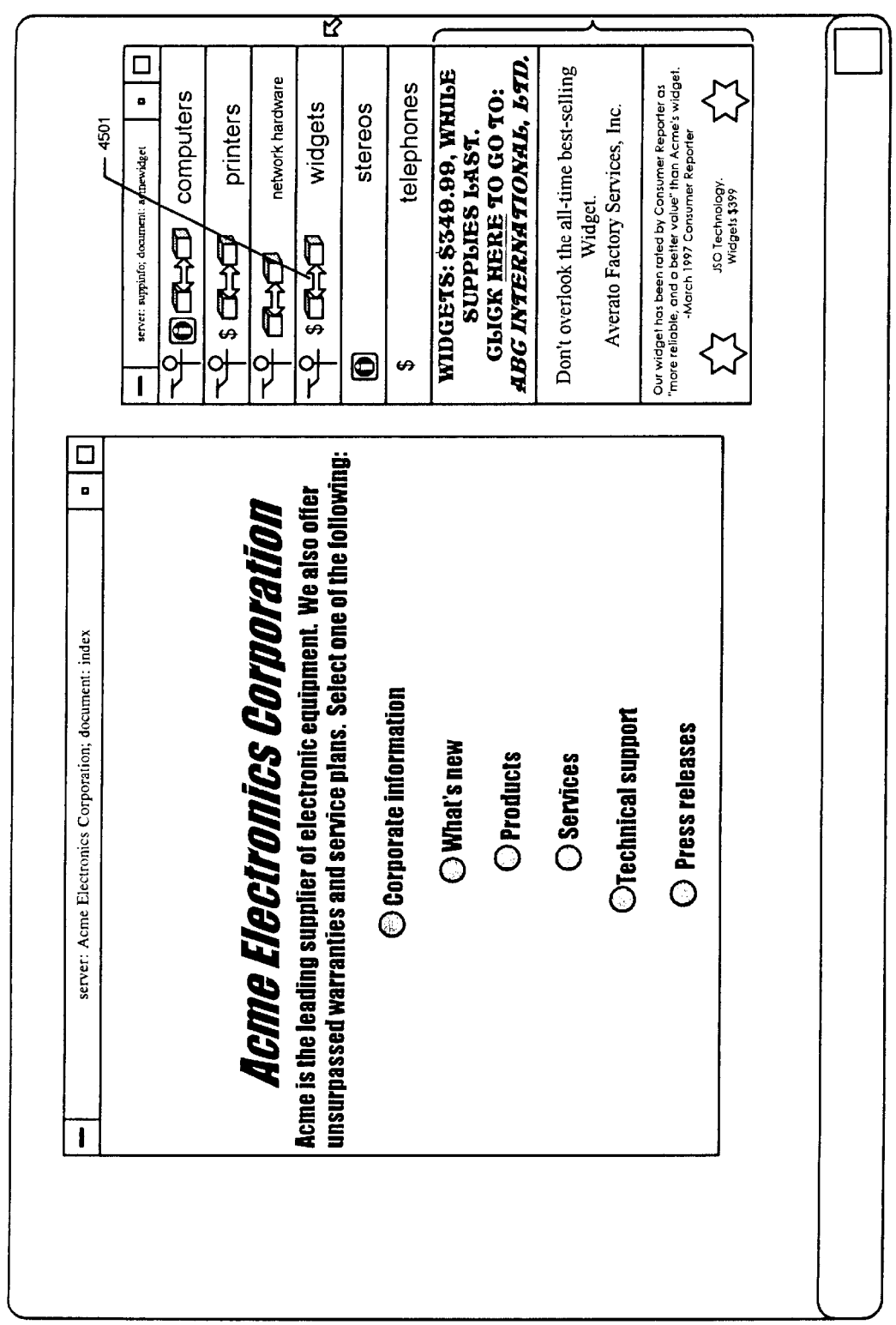
Figure 47:
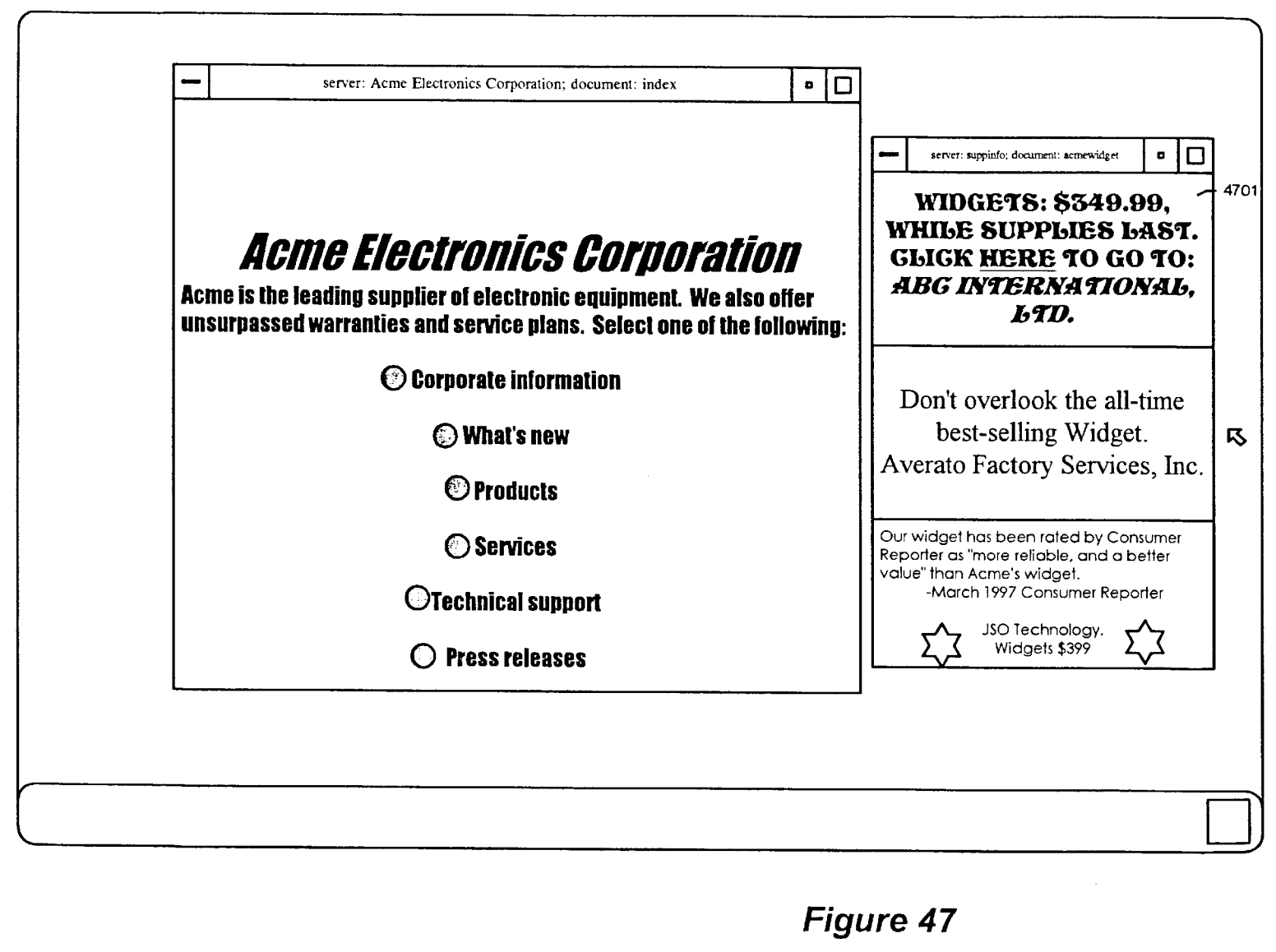

In FIG. 45, the user is selecting with the cursor 4511 the display element 4501, which represents a type of supplemental information in the "widgets" category of window 4403. The display element 4501 that is being selected by the user is the competing product icon for the widget category. After the display element 4501 is selected, the display is updated to that shown in FIG. 46, where supplemental information relating to competing suppliers of widgets is shown at 4601. In the embodiment of FIG. 46, the categories and supplemental information type display elements remain on the screen while the supplemental information is presented to the user. In another embodiment, shown in FIG. 47, the competing product supplemental information is presented in the window 4701, but the categories and supplemental information type display elements, shown in window 4403 in FIG. 45, are removed from the screen.

Referring again to FIG. 45, one or more display elements are shown for each of the categories shown in window 4403. Although FIG. 45 has been described in connection with the selection of display element 4501, the user may select other display elements (e.g., 4502, 4503) for the widget category. Where other display elements are selected, supplemental information that corresponds to the selected display element would be presented to the user. Display elements from any of the other categories shown in window 4403 could also be selected, which will result in the presentation of appropriate supplemental information for the selected category and supplemental information type.

The system of FIG. 45 could also be configured to allow the selection of the category itself, without selection of any particular display element for the category. When the user selects the category (e.g., by selection of the text describing the category), supplemental information of all types may be presented to the user. Such an embodiment may be useful where the user wishes to see all of the supplemental information for a particular category.

Figure 48:
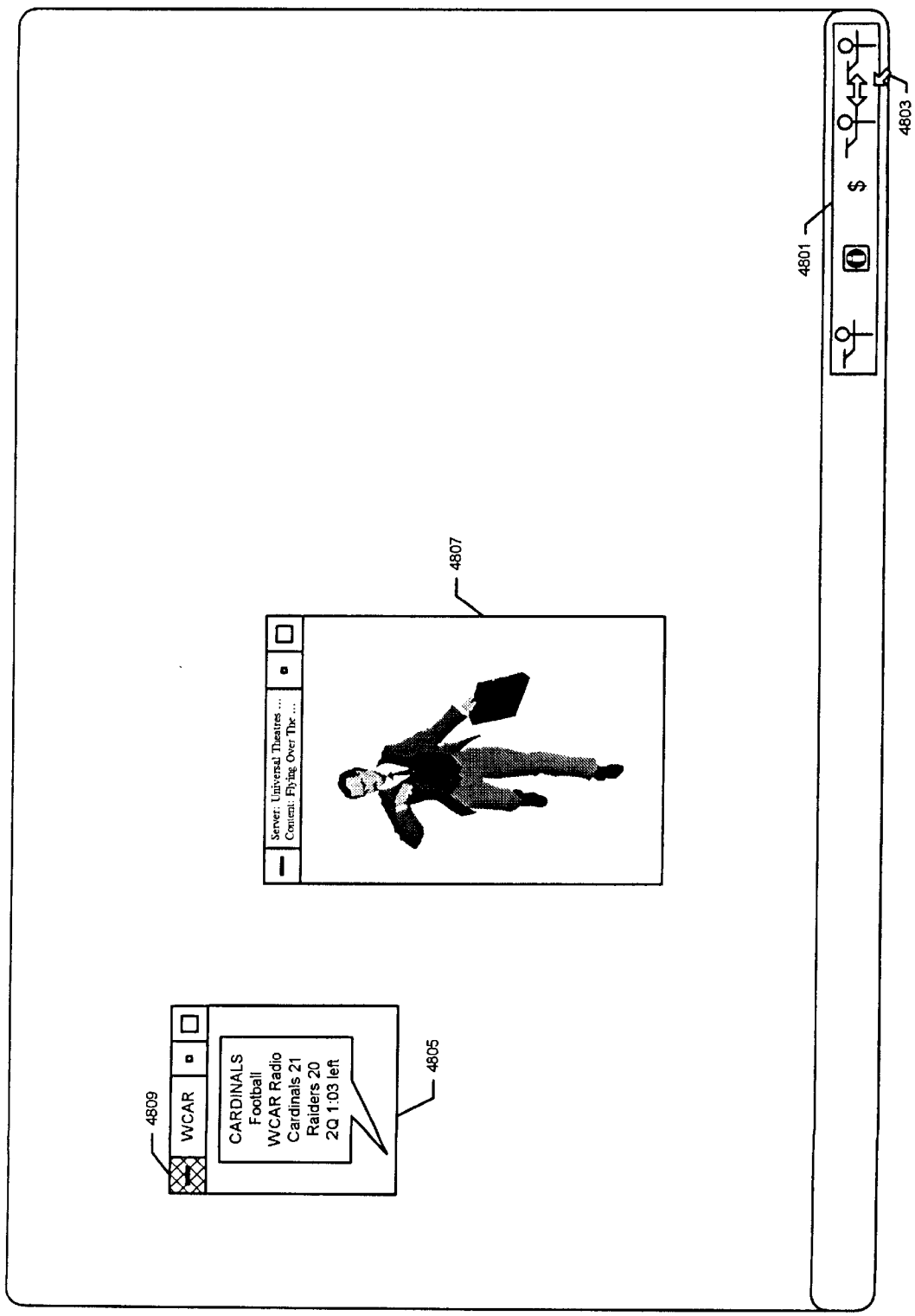
FIGS. 48 and 49 illustrate the selection and display of supplemental information relating to audio content.

In FIG. 48, an application that presents audio content to the user is represented by window 4805. The audio content is published by an entity called "WCAR," and the audio content is a play-by-play broadcast of a "Cardinals" football game. As shown in the window 4805, the Cardinals lead that game 21-20 in the second quarter. In window 4807, a full motion video from the Universal Theatres server is being presented. The video shown in window 4807 is the "Flying Over The Precipice" movie. Thus, for the screen of FIG. 48, audio content is presented to the user in window 4805, and video content is presented to the user in window 4807. A portion 4809 of the window 4805 is shaded or colored or otherwise marked so as to communicate to the user which of the windows on the display is the "active" window. Because the content relating to both of the windows 4805 and 4807 present audio to the user, it may be desirable to present audio from only one source. In FIG. 48, the window 4805 is shown to be the active window, and it may have been placed in that condition by selection by the user (e.g., using the cursor 4803), by default (e.g., it may be the most recent window to appear on the screen), or in any other way. In the embodiment of FIG. 48, audio from the active window 4805 is presented to the user, while the audio from window 4807 is muted. The motion video in window 4807 may or may not continue.

Figure 49:
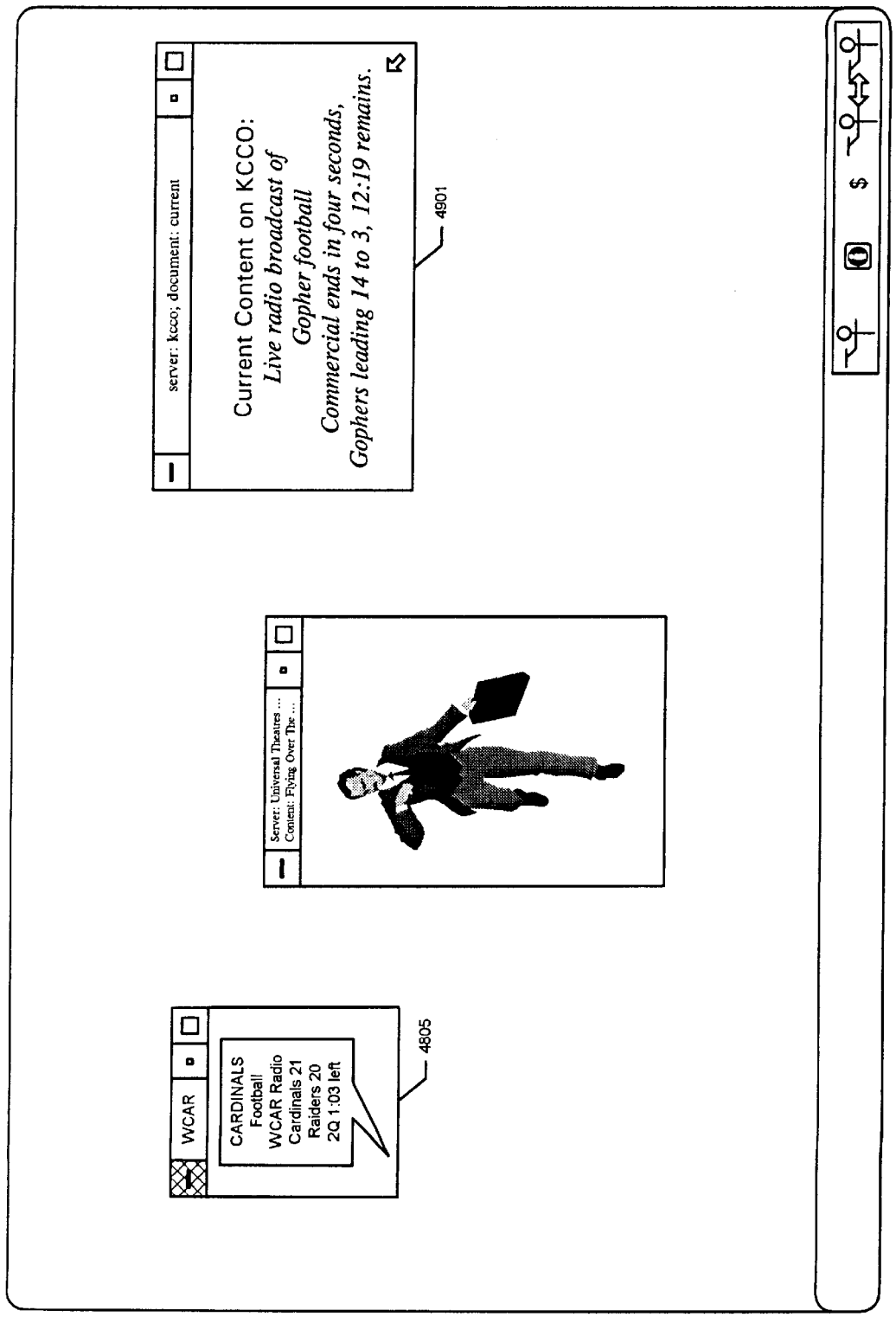

Still referring to FIG. 48, the user selects the display element 4803 in the box 4801, which causes the display screen to be updated to that shown in FIG. 49. In FIG. 49, supplemental information about other competing content is provided in the window 4901. The supplemental information displayed in window 4901 describes a live audio broadcast of a Gophers football game, where the Gophers are leading 14 to 3 with 12:19 left. This information is related to the content being presented to the user in window 4805, the active window in FIGS. 48 and 49. The window 4901 also indicates that a commercial being broadcast in connection with the Gophers game will end in only four seconds. This type of information may encourage the user to select the content described in the window 4901. Similar types of information may be provided in other situations. For example, if the Gophers game were at half-time, the user may switch to a broadcast of another game (e.g., the Cardinals game) while the Gophers game is at half-time. The window 4901 in such a situation may allow the user to keep track of when the Gophers game resumes for the second half. Similarly, the user can keep track of when a particular program or sporting event (broadcast via audio, video, or otherwise) ends, or when the Gophers game gets closer than it currently is. All this may be done while listening to the Cardinals game, or when other related content is being presented to the user.

Figure 50:
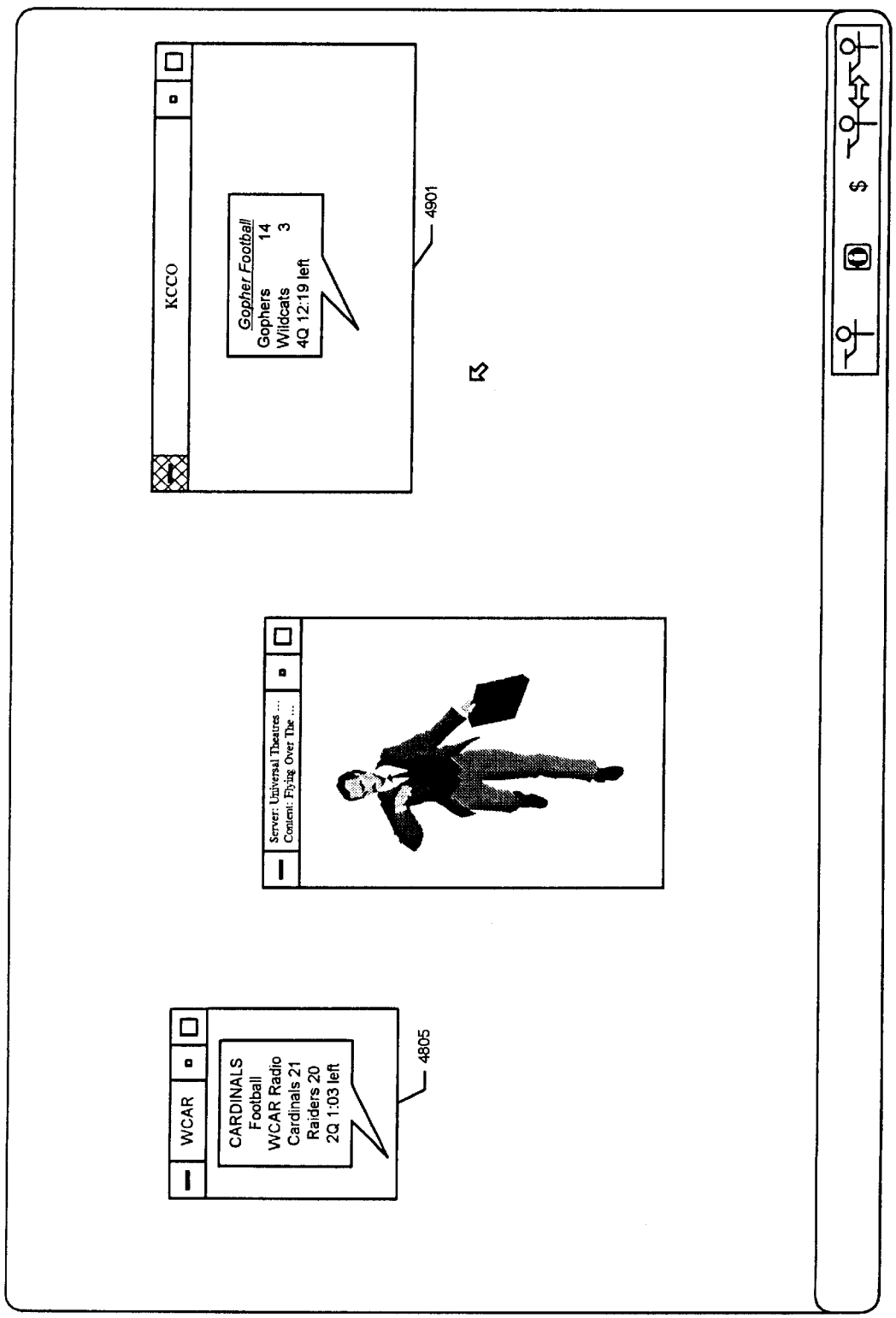
FIG. 50 illustrates the presentation of the audio content relating to the supplemental information of FIG. 49.

When the user selects the window 4901 in FIG. 49, the broadcast of the Gopher game is presented to the user, and the broadcast of the Cardinals game is turned off, or it may be reduced in volume. In FIG. 50, the user has selected the content represented by the window 4901 in FIG. 49, thereby causing the display of FIG. 49 to be updated to that of FIG. 50. Window 4901 is the active window in FIG. 50. The window 4901 of FIG. 50 shows the score of the Gophers game. The window 4805 may or may not remain on the screen. If it remains on the screen, it may be continually updated so that the score of that game is presented to the user, at least visually. In another embodiment, supplemental information about the content being presented in connection with the active window 4901 is presented to the user. This supplemental information may relate to the Cardinals football game, or it may describe another type of supplemental information.

Supplemental information relating to the video presented in window 4807 in FIGS. 48 and 49 could also be presented to the user (e.g., in window 4901). For example, supplemental information could describe content that starts (or that can be configured to start) just as the video rendered in window 4807 completes. Alternatively, supplemental information from the manufacturer of a product that is used or shown in the movie (e.g., an automobile or clothing) could also be presented. Thus, supplemental information can be presented in connection with many types of content, and need not be limited to text, but can fully encompass audio, video, animation, and any other type of content.

For purposes of illustration and example, the network documents described and illustrated in many of the Figures herein are shown displayed within a window controlled by an application program, such as may be represented by window 306 in FIG. 3. It should be understood, however, that such documents (or resources) could be displayed in other ways. For example, the contents could be displayed on the entire desktop, or a portion of the desktop. In another embodiment, the contents might be scrolled on the screen, perhaps under other windows. Further, windows could be controlled by the operating system, rather than by an application program. The manner in which information is being presented to the user herein is for illustration purposes only, and should not interpreted as limiting the present invention.

Further, the present invention has been described principally in terms of computer network available documents containing text, graphics, animated graphics or other objects. It should be understood that the present invention is not limited to only those particular types of network resources. Rather, the present invention can be implemented using audio, video, or other types of multimedia beyond that shown. For example, the supplemental information could be an audio clip, or an applet or application program that carries out a useful function that relates to the resource displayed or otherwise presented to the user. In addition, the term "computer" as used herein should be interpreted broadly to encompass all systems, devices, or machines that have a general or specialized processor or microprocessor or a similar device known in the art or hereinafter developed.

Also, embodiments of the present invention may be integrated with one or more payment or transaction processing systems or the like so that a person viewing certain types of content and/or certain types of supplemental information or supplemental content will incur a fee or a transaction cost. Authentication and automatic payments techniques may also be used.

Generally, although the present invention has been shown and described with respect to specific embodiments and/or implementations, various changes and modifications, even if not shown or specifically described herein, may be applicable to the present invention, and are deemed to lie within the spirit and scope of the subject matter that is applicable to the present invention. Further, any specific features or aspects of the embodiments or implementations described or illustrated herein are not intended to limit the present invention in a manner not required by the appended claims.

INCORPORATION BY REFERENCE

The following pending U.S. patent applications are hereby fully incorporated by reference: application Ser. No. 08/474,921 (entitled "Document Retrieval System Employing a Preloading Procedure"), filed Jun. 7, 1995, now U.S. Pat. No. 5,715,445; U.S. Ser. No. 08/487,925 (entitled "Document Research System and Method for Displaying Citing Documents"), filed Jun. 7, 1995 now abandoned; U.S. Ser. No. 60/028,251 (entitled "A Method and System for Communicating Information About the Contents of a Document"), filed Oct. 8, 1996; 60/047,554 ("A Document Retrieval System Including the Use of Profile Information"), filed May 22, 1997; and U.S. Ser. No. 60/052,830 ("A System and Method for Communicating Information Relating to a Network Resource"), filed Jul. 17, 1997. Any references, applications, or other subject matter incorporated by reference in these applications are also incorporated by reference into this application.

In addition, the following publications listed below are also hereby fully incorporated by reference to the extent that they enable, provide support for, provide a background for, or teach methodology, techniques, and/or procedures employed herein.

Reference 1: Yellin, The Java Application Programming Interface: Volumes 1&2 (Addison Wesley 1996)

Reference 2: Campione, The Java Tutorial (Addison Wesley 1996)

Reference 3: Chan, The Java Class Libraries (Addison Wesley 1997)

Reference 4: Lemay et al., Java in 21 Days (Sams.Net 1996)

Reference 5: Sun Microsystems, Inc., The JavaBeans 1.0 API Specification (Sun Microsystems 1996) (available at http://java.sun.com/beans)

Reference 6: Sun Microsystems, Inc., The Java 1.1 API Specification (Sun Microsystems 1997) (available at http://java.sun.com/)

Reference 7: Bell, "Make Java fast: Optimize!," JavaWorld April 1997 (JavaWorld 1997) (available at http://www.javaworld.com/)

Reference 8: Vanhelsuwe, "How to make Java applets start faster," JavaWorld December 1996 (JavaWorld 1996) (available at http://www.javaworld.com/)

Reference 9: Danesh, JavaScript in a Week (Sams.Net 1996)

Reference 10: Graham, HTML Sourcebook (2d ed. John Wiley & Sons 1996)

Reference 11: Tanenbaum, Computer Networks (2d ed. Prentice Hall 1989)

Reference 12: Jamsa, Internet Programming (Jamsa Press 1995)

Reference 13: Comer, Internetworking with TCP/IP, Volumes 1, 2, & 3 (3d ed. Prentice Hall 1995)

Reference 14: Lemay, Official Marimba Guide to Castanet (Sams.Net 1997)

Reference 15: Kovel et al., The Lotus Notes Idea Book (Addison Wesley 1996)

Reference 16: Schneier, Applied Cryptography ($2_{nd}$ ed. John Wiley & Sons 1996)

Reference 17: Adkins, Internet Security Professional Reference (New Riders 1996)

Reference 18: Chappell, Understanding ActiveX and OLE (Microsoft Press 1996)

Reference 19: Denning, OLE Controls Inside Out (Microsoft 1995)

Reference 20: Brockschmidt, Inside OLE (2d ed. Microsoft 1995)

Reference 21: Siegel, CORBA Fundamentals and Programming (John Wiley & Sons 1996)

Reference 22: Petzold, Programming Windows 95 (Microsoft 1996)

Reference 23: Prosise, Programming Windows 95 with MFC (Microsoft Press 1996)

Reference 24: Microsoft Corporation, Windows NT Server Resource Kit (Microsoft Press 1996)

Reference 25: Russel, Running Windows NT Server (Microsoft Press 1997)

Reference 26: Chapman, Building Internet Applications with Delphi 2 (Que 1996)

Reference 27: Cantu, Mastering Delphi 3 (Sybex 1997)

What is claimed is:

1. A client computer that is operated by a user and is programmed to:

(a) display a first document in a web browser window on a display screen associated with the client computer, wherein the first document has a resource identifier associated with it and is retrieved over a network from a first web server using HTTP protocol, wherein the first document is a hypertext document that includes graphical display elements and also includes links to linked documents, and wherein the first document is published by a first online merchant and provides information about a first item that is available for purchase from the first online merchant;

(b) detect that a document providing information about the first item is being displayed on the display screen associated with the client computer;

(c) upon detecting that a document providing information about the first item is being displayed on the display screen associated with the client computer, automatically activate a competitive information display element on the display screen associated with the client computer, wherein the competitive information display element is not part of or embedded into the first document that is displayed in the web browser window, wherein the activation of the competitive information display element signifies that competitive information relating to the first item is likely available, and wherein the competitive information display element is activated in response to detecting that a document providing information about the first item is being displayed on the display screen;

(d) monitor the user's selection of the activated competitive information display element;

(e) detect that the user wishes to display a document from a second online merchant;

(f) display a second document in a web browser window on the display screen associated with the client computer, wherein the second document has a resource identifier associated with it and is retrieved over a network from a second web server using HTTP protocol, wherein the second document is a hypertext document that includes graphical display elements and also includes links to linked documents, and wherein the second document is published by the second online merchant and provides information about a second item that is available for purchase from the second online merchant;

(g) detect that a document providing information about the second item is being displayed on the display screen associated with the client computer;

(h) upon detecting that a document providing information about the second item is being displayed on the display screen associated with the client computer, automatically activate the competitive information display element on the display screen associated with the client computer, wherein the competitive information display element is not part of or embedded into the second document that is displayed in the web browser window, wherein the activation of the competitive information display element signifies that competitive information relating to the second item is likely available, and wherein the competitive information display element is activated in response to detecting that a document providing information about the second item is being displayed on the display screen;

(i) monitor the user's selection of the activated competitive information display element;

(j) detect that the user has selected the activated competitive information display element;

(k) upon detecting that the user has selected the activated competitive information display element, display a competitive information document, wherein the competitive information document is retrieved by the client computer over the network from a competitive information server that is not related to the first server or the second server, and wherein the competitive information document has at least one link to a linked document, wherein the competitive information document is targeted to users that may purchase the second item and is displayed in response to detecting that the user has selected the activated competitive information display element, wherein the competitive information document is published by an entity that is different than the second online merchant, and wherein the competitive information document includes price-competitive information from a third online merchant, wherein the third online merchant competes with the second online merchant, and wherein the price-competitive information included in the competitive information document comprises at least one price for the second item that is less expensive than the price offered by the second online merchant;

(l) monitor the user's selection of a link included within the competitive information document;

(m) detect that the user has selected the link included within the competitive information document;

(n) upon detecting that the user selected the link from the competitive information document, display a competitive merchant document, wherein the competitive merchant document is published by the third online merchant; and (o) allow the user to place an order for the second item from the third online merchant.

2. A method of displaying information for a user that is operating a client computer, the method comprising the acts of:

(a) displaying a first document in a web browser window on a display screen associated with the client computer, wherein the first document has a resource identifier associated with it and is retrieved over a network from a first web server using HTTP protocol, wherein the first document is a hypertext document that includes graphical display elements and also includes links to linked documents, and wherein the first document is published by a first online merchant and provides information about a first item that is available for purchase from the first online merchant;

(b) detecting that a document published by the first online merchant is being displayed on the display screen associated with the client computer;

(c) upon detecting that a document published by the first online merchant is being displayed on the display screen associated with the client computer, automatically activating a competitive information display element on the display screen associated with the client computer, wherein the competitive information display element is not part of or embedded into the first document that is displayed in the web browser window, wherein the activation of the competitive information display element signifies that competitive information relating to the first online merchant is likely available, and wherein the competitive information display element is activated in response to detecting that a document published by the first online merchant is being displayed on the display screen;

(d) monitoring the user's selection of the activated competitive information display element;

(e) detecting that the user wishes to display a document from a second online merchant;

(f) displaying a second document in a web browser window on the display screen associated with the client computer, wherein the second document has a resource identifier associated with it and is retrieved over a network from a second web server using HTTP protocol, wherein the second document is a hypertext document that includes graphical display elements and also includes links to linked documents, and wherein the second document is published by the second online merchant and provides information about a second item that is available for purchase from the second online merchant;

(g) detecting that a document published by the second online merchant is being displayed on the display screen associated with the client computer;

(h) upon detecting that a document published by the second online merchant is being displayed on the display screen associated with the client computer, automatically activating the competitive information display element on the display screen associated with the client computer, wherein the competitive information display element is not part of or embedded into the second document that is displayed in the web browser window, wherein the activation of the competitive information display element signifies that competitive information relating to the second online merchant is likely available, and wherein the competitive information display element is activated in response to detecting that a document published by the second online merchant is being displayed on the display screen;

(i) monitoring the user's selection of the activated competitive information display element;

(j) detecting that the user has selected the activated competitive information display element;

(k) upon detecting that the user has selected the activated competitive information display element, displaying a competitive information document, wherein the competitive information document is retrieved by the client computer over the network from a competitive information server that is not related to the first server or the second server, and wherein the competitive information document includes at least one link to a linked document, wherein the competitive information document is targeted to users that may purchase an item from the second online merchant and is displayed in response to detecting that the user has selected the activated competitive information display element, wherein the competitive information document is published by an entity that is different than the second online merchant, and wherein the competitive information document includes price-competitive information from a third online merchant, wherein the third online merchant competes with the second online merchant;

(l) monitoring the user's selection of a link included within the competitive information document;

(m) detecting that the user has selected the link included within the competitive information document;

(n) upon detecting that the user selected the link from the competitive information document, displaying a competitive merchant document, wherein the competitive merchant document is published by the third online merchant; and (o) allowing the user to place an order for an item from the third online merchant.

3. A method of interfacing a computer program with a web browser application that is executing on a client computer operated by a user, wherein the web browser application retrieves documents over a network and displays documents on a display screen associated with the client computer, the method of interfacing the computer program with the web browser application comprising the acts of:

(a) communicating with the web browser application through an OLE interface so that the web browser application provides a notification to the computer program when a document is being retrieved over the network and displayed on the display screen by the web browser application;

(b) receiving a notification from the web browser application when a first document is being retrieved over the network and displayed on the display screen, wherein the notification is received automatically by the computer program from the web browser application through an OLE interface, wherein the notification from the web browser application identifies the first document by providing a universal resource locator that is associated with the first document, and wherein the first document is retrieved over the network from a first web server and is displayed on the display screen as a hypertext document that includes graphical display elements;

(c) after receiving the notification from the web browser application when the first document is being retrieved over the network and displayed on the display screen, automatically sending a first message over the network to a supplemental information server, wherein the first message includes information about the first document;

(d) receiving a communication in response to sending the first message over the network to the supplemental information server, wherein the communication includes information that relates to the first document;

(e) after receiving the communication in response to sending the first message over the network to the supplemental information server, displaying first document supplemental information on the display screen, wherein the first document supplemental information includes information received in the communication that relates to the first document, wherein the first document supplemental information includes a link to a second document, wherein the second document is relevant to the first document, and wherein the first document supplemental information is published by an entity different than the publisher of the first document and is not part of the first document;

(f) monitoring the user's selection of the link to the second document;

(g) causing the second document to be retrieved over the network and displayed on the display screen when the user selects the link to the second document, wherein the web browser application retrieves the second document over the network from a second web server, wherein the second document is retrieved from the second web server using HTTP protocol, and wherein the second document has a universal resource locator associated with it;

(h) automatically sending a second message over the network to the supplemental information server, wherein the second message includes information about the second document;

(i) receiving a communication in response to sending the second message over the network to the supplemental information server, wherein the communication includes information that relates to the second document;

(j) after receiving the communication in response to sending the second message over the network to the supplemental information server, displaying second document supplemental information on the display screen, wherein the second document supplemental information includes information received in the communication in that relates to the second document, wherein the second document supplemental information includes a link to a document that relates to the second document and is relevant to the second document, and wherein the second document supplemental information is published by an entity different than the publisher of the second document and is not part of the second document;

(k) receiving a notification from the web browser application when a third document is being retrieved over the network and displayed on the display screen, wherein the notification is received automatically by the computer program from the web browser application through an OLE interface, wherein the notification from the web browser application identifies the third document by providing a universal resource locator that is associated with the third document, and wherein the third document is retrieved over the network from a third web server and is displayed on the display screen as a hypertext document that includes graphical display elements;

(l) after receiving the notification from the web browser application when the third document is being retrieved over the network and displayed on the display screen, automatically sending a third message over the network to the supplemental information server, wherein the third message includes information about the third document;

(m) receiving a communication in response to sending the third message over the network to the supplemental information server, wherein the communication includes information that relates to the third document; and (n) after receiving the communication in response to sending the third message over the network to the supplemental information server, displaying third document supplemental information on the display screen, wherein the third document supplemental information is published by an entity different than the publisher of the third document and is not part of the third document.

4. The method of claim 3, further comprising the acts of:

displaying a supplemental information display element on the display screen; and monitoring the user's interaction with the supplemental information display element;

wherein the act of displaying the first document supplemental information on the display screen is carried out in response to a first detection of the user's interaction with the supplemental information display element, wherein the act of displaying the second document supplemental information on the display screen is carried out in response to a second detection of the user's interaction with the supplemental information display element, and wherein the act of displaying the third document supplemental information on the display screen is carried out in response to a third detection of the user's interaction with the supplemental information display element.

5. The method of claim 4, wherein the user's interaction with the supplemental information display element comprises selection of the supplemental information display element.

6. The method of claim 4, wherein the act of automatically sending a first message over the network to the supplemental information server includes the act of:

sending information identifying the first web server by name in the information about the first document.

7. The method of claim 6, wherein the act of displaying first document supplemental information on the display screen includes the act of:

displaying an advertisement in the first document supplemental information, wherein the advertisement is targeted to viewers of a document retrieved from the first web server.

8. The method of claim 3, wherein the act of automatically sending a first message over the network to the supplemental information server includes the act of sending information identifying the first web server by name in the information about the first document; and wherein the act of displaying first document supplemental information on the display screen includes the act of displaying an advertisement in the first document supplemental information, wherein the advertisement is targeted to viewers of a document retrieved from the first web server.

\* \* \* \* \*